United States Patent
Mano

(10) Patent No.: US 11,373,030 B2
(45) Date of Patent: Jun. 28, 2022

(54) DISPLAY TERMINAL TO EDIT TEXT DATA CONVERTED FROM SOUND DATA

(71) Applicant: Ricoh Company, Ltd., Tokyo (JP)

(72) Inventor: Takuro Mano, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 16/851,170

(22) Filed: Apr. 17, 2020

(65) Prior Publication Data

US 2020/0356722 A1  Nov. 12, 2020

(30) Foreign Application Priority Data

May 10, 2019 (JP) .............................. JP2019-089489

(51) Int. Cl.
| | |
|---|---|
| *G06F 40/00* | (2020.01) |
| *G06F 40/166* | (2020.01) |
| *G10L 15/22* | (2006.01) |
| *G06F 3/16* | (2006.01) |
| *G10L 15/26* | (2006.01) |

(52) U.S. Cl.
CPC ............ *G06F 40/166* (2020.01); *G06F 3/167* (2013.01); *G10L 15/22* (2013.01); *G10L 15/26* (2013.01)

(58) Field of Classification Search
CPC ........ G06F 40/166; G10L 15/22; G10L 15/26
See application file for complete search history.

(56) References Cited

U.S. PATENT DOCUMENTS

| | | | | |
|---|---|---|---|---|
| 6,802,041 | B1* | 10/2004 | Rehm ................... | G06F 16/40 715/201 |
| 7,047,192 | B2* | 5/2006 | Poirier ................... | G10L 15/34 704/235 |
| 9,318,110 | B2* | 4/2016 | Roe ......................... | G10L 15/26 |
| 2002/0116399 | A1* | 8/2002 | Camps ................... | G06F 40/166 |
| 2007/0245305 | A1* | 10/2007 | Anderson ............... | G09B 7/00 717/110 |
| 2008/0319744 | A1* | 12/2008 | Goldberg ............... | G06F 40/18 704/235 |
| 2009/0043848 | A1* | 2/2009 | Kordun ............... | H04L 12/1831 709/205 |

(Continued)

FOREIGN PATENT DOCUMENTS

| | | |
|---|---|---|
| JP | 2016-105241 | 6/2016 |
| JP | 2017-129720 | 7/2017 |

*Primary Examiner* — Scott T Baderman
*Assistant Examiner* — Barbara M Level
(74) *Attorney, Agent, or Firm* — Xsensus LLP

(57) ABSTRACT

A display terminal is communicable with a management system that is configured to manage sound data based on content generated during a conducted event and manage text data converted from the sound data. The display terminal includes circuitry configured to: receive the sound data, the text data, and time information from the management system, the time information being information relating to generation time of the content; control a display to display the received text data in an order of the generation time based on the received time information; and accept editing of particular text data among the displayed text data. The circuitry is further configured to control the display to display the edited particular text data in place of the received particular text data.

7 Claims, 43 Drawing Sheets

(56) References Cited

U.S. PATENT DOCUMENTS

| | | | |
|---|---|---|---|
| 2010/0063815 A1* | 3/2010 | Cloran | G06Q 10/103 |
| | | | 704/235 |
| 2017/0220546 A1* | 8/2017 | Codrington | G06F 3/0484 |
| 2017/0249294 A1 | 8/2017 | Emori | |
| 2017/0263265 A1* | 9/2017 | Ashikawa | G06F 3/04817 |
| 2017/0277672 A1* | 9/2017 | Cho | G06F 40/279 |
| 2018/0053510 A1* | 2/2018 | Kofman | G10L 15/187 |
| 2018/0268822 A1 | 9/2018 | Mano | |
| 2018/0315428 A1* | 11/2018 | Johnson | G10L 15/01 |
| 2019/0114477 A1 | 4/2019 | Mano | |
| 2019/0272902 A1* | 9/2019 | Vozila | G16H 40/60 |
| 2019/0324963 A1 | 10/2019 | Mano | |
| 2020/0126559 A1* | 4/2020 | Ochshorn | G11B 27/3036 |
| 2020/0126583 A1* | 4/2020 | Pokharel | G10L 15/1822 |
| 2020/0175991 A1* | 6/2020 | Mano | G11B 27/28 |

\* cited by examiner

FIG. 9A

USER AUTHENTICATION MANAGEMENT TABLE

| USER ID | USER NAME | ORGANIZATION ID | PASSWORD |
|---|---|---|---|
| u0001 | TARO RIKO | o1001 | p9991 |
| u0002 | GORO KONDO | o1002 | p9992 |
| ... | ... | ... | ... |

FIG. 9B

ACCESS MANAGEMENT TABLE

| ORGANIZATION ID | ACCESS ID | ACCESS PASSWORD |
|---|---|---|
| o1001 | a1001 | p1001 |
| ... | ... | ... |

FIG. 9C

SCHEDULE MANAGEMENT TABLE

SCHEDULED EVENT ID: pe0001, CONDUCTED EVENT ID: ee0001

| ORGANIZATION ID | USER ID OF RESERVATION HOLDER | PARTICIPATE | NAME OF RESERVATION HOLDER | SCHEDULED START TIME | SCHEDULED END TIME | EVENT NAME | USER IDS OF OTHER PARTICIPANTS | PARTICIPATE | NAMES OF OTHER PARTICIPANTS | FILE DATA |
|---|---|---|---|---|---|---|---|---|---|---|
| o1001 | u0001 | ✓ | TARO RIKO | 9:00 | 10:00 | POLICY DECISION MEETING | u0000 | ✓ | ELECTRONIC WHITEBOARD | • XXX.ppt<br>• YYY.xsl |
| | | | | | | | u0002 | ✓ | GORO KONDO | |
| | | | | | | | u0003 | ✓ | YOSHIO YAMASHITA | |

FIG. 10

CONTENT MANAGEMENT TABLE

CONDUCTED EVENT ID: ee0001

| CONTENT PROCESS-ING ID | TYPE OF CONTENT PROCESSING | CONTENT DATA | START DATE AND TIME | END DATE AND TIME |
|---|---|---|---|---|
| c0001 | RECORDING | · URL OF SOUND DATA: c://··· | 2018/1/15 9:00:00 | 2018/1/15 9:00:30 |
| c0002 | SCREENSHOTTING | · URL OF IMAGE DATA: c://··· | 2018/1/15 9:00:30 | 2018/1/15 9:00:30 |
| c0003 | SOUND-TO-TEXT CONVERSION | · URL OF TEXT DATA: c://··· | 2018/1/15 9:00:00 | 2018/1/15 9:00:30 |
| ··· | ··· | ··· | ··· | ··· |
| c0201 | GENERATION OF ACTION ITEM | · USER ID OF USER RESPONSIBLE FOR ACTION ITEM: u0003<br>· DUE DATE: 2018/1/30<br>· URL OF IMAGE DATA: c://··· | 2018/1/15 9:44:47 | 2018/1/15 9:44:47 |
| c0202 | RECORDING | · URL OF SOUND DATA: c://··· | 2018/1/15 9:45:00 | 2018/1/15 9:45:30 |
| c0203 | SCREENSHOTTING | · URL OF IMAGE DATA: c://··· | 2018/1/15 9:45:30 | 2018/1/15 9:45:30 |
| c0204 | SOUND-TO-TEXT CONVERSION | · URL OF TEXT DATA: c://··· | 2018/1/15 9:45:00 | 2018/1/15 9:45:30 |
| ··· | ··· | ··· | ··· | ··· |
| c0301 | TRANSMISSION OF MATERIAL | · URL OF MATERIAL DATA: c://··· | 2018/1/15 10:00:00 | 2018/1/15 10:00:00 |

FIG. 11A

USER AUTHENTICATION MANAGEMENT TABLE

| USER ID | ORGANIZATION ID | PASSWORD |
|---------|-----------------|----------|
| u0001   | o1001           | p9991    |
| u0002   | o1002           | p9992    |
| ...     | ...             | ...      |

FIG. 11B

USER MANAGEMENT TABLE

ORGANIZATION ID

| USER ID | USER NAME |
|---------|-----------|
| u0001   | TARO RIKO |
| u0002   | GORO KONDO |
| u0003   | YOSHIO YAMASHITA |
| u0004   | Jim Berger |
| ...     | ...       |

FIG. 11C

RESOURCE MANAGEMENT TABLE

ORGANIZATION ID: o1001

| RESOURCE ID | RESOURCE NAME |
|-------------|---------------|
| s1001       | CONFERENCE ROOM X |
| s1002       | CONFERENCE ROOM Y |
| ...         | ...           |

FIG. 12A

RESOURCE RESERVATION MANAGEMENT TABLE

ORGANIZATION ID: o1001

| RE-SOURCE ID | RESOURCE NAME | USER ID OF COMMUNICATION TERMINAL | USER ID OF RESERVATION HOLDER | SCHEDULED USE START DATE AND TIME | SCHEDULED USE END DATE AND TIME | EVENT NAME |
|---|---|---|---|---|---|---|
| s1001 | CONFERENCE ROOM X | u0000 | u0001 | 2018/1/15 9:00 | 2018/1/15 10:00 | POLICY DECISION MEETING |
| s1001 | CONFERENCE ROOM X | u0000 | u0004 | 2018/1/15 10:00 | 2018/1/15 11:30 | REGULAR MEETING |
| s1001 | CONFERENCE ROOM X | u0000 | u0002 | 2018/1/15 10:11 | 2018/1/15 15:00 | MANAGEMENT MEETING |
| s1002 | CONFERENCE ROOM Y | u1000 | u0005 | 2018/1/15 9:00 | 2018/1/15 10:00 | NEW PRODUCT DEVELOPMENT PLAN MEETING |
| ... | ... | ... | ... | ... | ... | ... |

FIG. 12B

EVENT MANAGEMENT TABLE

SCHEDULED EVENT ID: pe0001

| ORGANIZATION ID | USER ID | USER NAME | SCHEDULED EVENT START DATE AND TIME | SCHEDULED EVENT END DATE AND TIME | EVENT NAME | MEMO | FILE DATA |
|---|---|---|---|---|---|---|---|
| o1001 | u0000 | ELECTRONIC WHITEBOARD | 2018/1/15 9:00 | 2018/1/15 10:00 | POLICY DECISION MEETING | ... | · XXX.ppt<br>· YYY.xsl |
| o1001 | u0001 | TARO RIKO | 2018/1/15 9:00 | 2018/1/15 10:00 | POLICY DECISION MEETING | ... | ·· |
| o1001 | u0002 | GORO KONDO | 2018/1/15 9:00 | 2018/1/15 10:00 | POLICY DECISION MEETING | ... | |
| o1001 | u0003 | YOSHIO YAMASHITA | 2018/1/15 9:00 | 2018/1/15 10:00 | POLICY DECISION MEETING | ... | |

FIG. 13A

SERVER AUTHENTICATION
MANAGEMENT TABLE

| ACCESS ID | ACCESS PASSWORD |
|---|---|
| a1001 | p1001 |
| a1002 | p1002 |
| ... | ... |

FIG. 13B

CONDUCTED EVENT RECORD
MANAGEMENT TABLE

CONDUCTED EVENT ID: ee0001

| CONTENT PROCESSING ID | TYPE OF CONTENT PROCESSING | CONTENT DATA | START DATE AND TIME | END DATE AND TIME |
|---|---|---|---|---|
| c0001 | RECORDING | · URL OF SOUND DATA: http://··· | 2018/1/15 9:00:00 | 2018/1/15 9:00:30 |
| c0002 | SOUND-TO-TEXT CONVERSION | · URL OF TEXT DATA: http://··· | 2018/1/15 9:00:00 | 2018/1/15 9:00:30 |
| c0003 | SCREENSHOTTING | · URL OF IMAGE DATA: http://··· | 2018/1/15 9:00:30 | 2018/1/15 9:00:30 |
| ... | ... | ... | ... | ... |
| c0201 | GENERATION OF ACTION ITEM | · USER ID OF USER RESPONSIBLE FOR ACTION ITEM: u0003<br>· DUE DATE: 2018/1/30<br>· URL OF IMAGE DATA: http://··· | 2018/1/15 9:44:47 | 2018/1/15 9:44:47 |
| c0202 | RECORDING | · URL OF SOUND DATA: http://··· | 2018/1/15 9:45:00 | 2018/1/15 9:45:30 |
| c0203 | SOUND-TO-TEXT CONVERSION | · URL OF TEXT DATA: http://··· | 2018/1/15 9:45:00 | 2018/1/15 9:45:30 |
| c0204 | SCREENSHOTTING | · URL OF IMAGE DATA: http://··· | 2018/1/15 9:45:30 | 2018/1/15 9:45:30 |
| ... | ... | ... | ... | ... |
| c0301 | TRANSMISSION OF MATERIAL | · URL OF MATERIAL DATA: http://··· | 2018/1/15 10:00:00 | 2018/1/15 10:00:00 |

FIG. 14A

CONDUCTED EVENT MANAGEMENT TABLE

| CONDUCTED EVENT ID | EVENT NAME | START DATE AND TIME | END DATE AND TIME |
|---|---|---|---|
| ee0001 | POLICY DECISION MEETING | 2018/1/15 9:00 | 2018/1/15 10:00 |
| ee0002 | REGULAR MEETING | 2018/1/15 10:00 | 2018/1/15 11:00 |
| ... | ... | ... | ... |

FIG. 14B

RELATED INFORMATION MANAGEMENT TABLE

CONDUCTED EVENT ID: ee0001

| CONTENT GENERATION TIME | SOUND DATA | | SOUND-BASED TEXT DATA | | SCREEN DATA | |
|---|---|---|---|---|---|---|
| | CONTENT PROCESSING ID | TYPE OF CONTENT PROCESSING | CONTENT PROCESSING ID | TYPE OF CONTENT PROCESSING | SEQUENCE NO. | CONTENT PROCESSING ID | TYPE OF CONTENT PROCESSING | SEQUENCE NO. |

| CONTENT GENERATION TIME | CONTENT PROCESSING ID | TYPE OF CONTENT PROCESSING | CONTENT PROCESSING ID | TYPE OF CONTENT PROCESSING | SEQUENCE NO. | CONTENT PROCESSING ID | TYPE OF CONTENT PROCESSING | SEQUENCE NO. |
|---|---|---|---|---|---|---|---|---|
| 00:00 | c0001 | RECORDING | c0002 | SOUND-TO-TEXT CONVERSION | 1 | — | — | — |
| 00:30 | c0004 | RECORDING | c0005 | SOUND-TO-TEXT CONVERSION | 2 | c0003 | SCREENSHOTTING | 1 |
| 01:00 | c0007 | RECORDING | c0008 | SOUND-TO-TEXT CONVERSION | 3 | c0006 | SCREENSHOTTING | 2 |
| ... | ... | ... | ... | ... | ... | ... | ... | ... |
| 24:30 | c2002 | RECORDING | c0203 | SOUND-TO-TEXT CONVERSION | 61 | c0199 | SCREENSHOTTING | 60 |
| ... | ... | ... | ... | ... | ... | ... | ... | ... |
| 59:30 | c0298 | RECORDING | c0299 | SOUND-TO-TEXT CONVERSION | 93 | c0297 | SCREENSHOTTING | 92 |

FIG. 15

TEXT INFORMATION MANAGEMENT TABLE

| CONDUCTED EVENT ID: ee0001 | | | |
|---|---|---|---|
| CONTENT PROCESSING ID | TEXT ID | TRANSCRIPT (TEXT DATA) | STATE IN-FORMATION |
| ... | ... | ... | ... |
| c0267 | text11 | In this fiscal year, more than twice the results of last year. | Original |
| c0269 | text12 | This pie chart shows our organization's last year and activity results. | Original |
| c0272 | text13 | As you can see from this graph, ···. | Original |
| ... | ... | ... | ... |

FIG. 22

Reservation List

Resource Name: Conference Room X

Today: 1/15/2018

| Scheduled Use Start/End Time | Event Name | Name of Reservation Holder | |
|---|---|---|---|
| 9:00 – 10:00 | Policy Decision Meeting | Taro Riko | Start |
| 10:00 – 11:00 | Regular Meeting | Jim Berger | Start |
| 11:00 – 12:00 | Management Meeting | Yoshio Yamashita | Start |

• • •

- 230
- 231
- 232
- EVENT INFORMATION 235 / 235s
- EVENT INFORMATION 236 / 236s
- EVENT INFORMATION 237 / 237s

FIG. 42

TEXT INFORMATION MANAGEMENT TABLE

| CONDUCTED EVENT ID: ee0001 | | | |
|---|---|---|---|
| CONTENT PROCESSING ID | TEXT ID | TRANSCRIPT (TEXT DATA) | STATE INFORMATION |
| ... | ... | ... | ... |
| c0267 | text11 | In this fiscal year, more than twice the results of last year. | Original |
| c0269 | text12 | This pie chart shows our organization's last year and activity results. | Original |
| c0272 | text13 | As you can see from this graph, ... . | Original |
| ... | ... | ... | ... |
| c0269 | text12.1 | This pie chart shows the results of our activities last year in our organization. | EDITING PERSON: SABURO REIWA EDITING DATE AND TIME: 2019/4/21 14:34 |

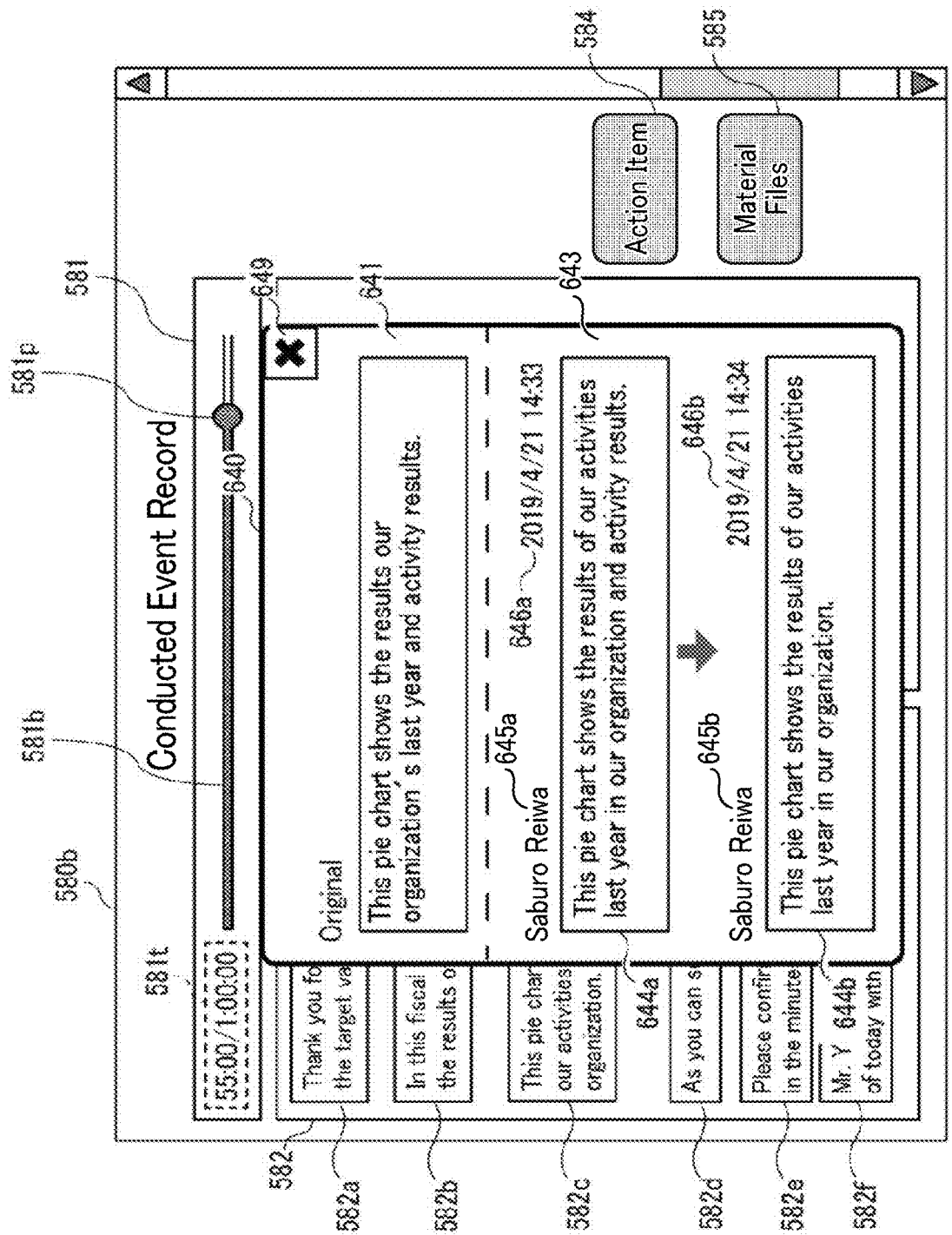

DISPLAY TERMINAL TO EDIT TEXT DATA CONVERTED FROM SOUND DATA

CROSS-REFERENCE TO RELATED APPLICATION

This patent application is based on and claims priority pursuant to 35 U.S.C. § 119(a) to Japanese Patent Application No. 2019-089489, filed on May 10, 2019, in the Japan Patent Office, the entire disclosure of which is hereby incorporated by reference herein.

BACKGROUND

Technical Field

The present disclosure relates to a display terminal, a sharing system, a display control method, and a non-transitory recording medium.

Description of the Related Art

Electronic whiteboards display a background image on a display and allow users to draw stroke images such as text, numbers, and figures on the background image. Nowadays, such electronic whiteboards are used in events such as meetings at companies, educational facilities, and administrative bodies, for example.

In addition, there is known a technique for automatically creating the minutes when an event such as a meeting is conducted. According to this technique, a server converts sound data recorded during the event into text data, and a terminal displays an image based on the text data.

SUMMARY

According to an embodiment, a display terminal is communicable with a management system that is configured to manage sound data based on content generated during a conducted event and manage text data converted from the sound data. The display terminal includes circuitry configured to: receive the sound data, the text data, and time information from the management system, the time information being information relating to generation time of the content; control a display to display the received text data in an order of the generation time based on the received time information; and accept editing of particular text data among the displayed text data. The circuitry is further configured to control the display to display the edited particular text data in place of the received particular text data.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein:

FIG. 9A is an illustration of a user authentication management table, according to an embodiment of the present disclosure;

FIG. 9B is an illustration of an access management table, according to an embodiment of the present disclosure;

FIG. 9C is an illustration of a schedule management table, according to an embodiment of the present disclosure;

FIG. 10 is an illustration of a content management table, according to an embodiment of the present disclosure;

FIG. 11A is an illustration of a user authentication management table, according to an embodiment of the present disclosure;

FIG. 11B is an illustration of a user management table, according to an embodiment of the present disclosure;

FIG. 11C is an illustration of a resource management table, according to an embodiment of the present disclosure;

FIG. 12A is an illustration of a resource reservation management table, according to an embodiment of the present disclosure;

FIG. 12B is an illustration of an event management table, according to an embodiment of the present disclosure;

FIG. 13A is an illustration of a server authentication management table, according to an embodiment of the present disclosure;

FIG. 13B is an illustration of a conducted event record management table, according to an embodiment of the present disclosure;

FIG. 14A is an illustration of a conducted event management table, according to an embodiment of the present disclosure;

FIG. 14B is an illustration of a related information management table, according to an embodiment of the present disclosure;

FIG. 15 is an illustration of a text information management table, according to an embodiment of the present disclosure;

FIG. 22 is an illustration of an example of a resource reservation list screen, according to an embodiment of the present disclosure;

FIG. 42 is an illustration of an updated text information management table, according to an embodiment of the present disclosure;

FIG. 45 is an illustration of an example of an editing log screen, according to an embodiment of the present disclosure.

Figure 1:
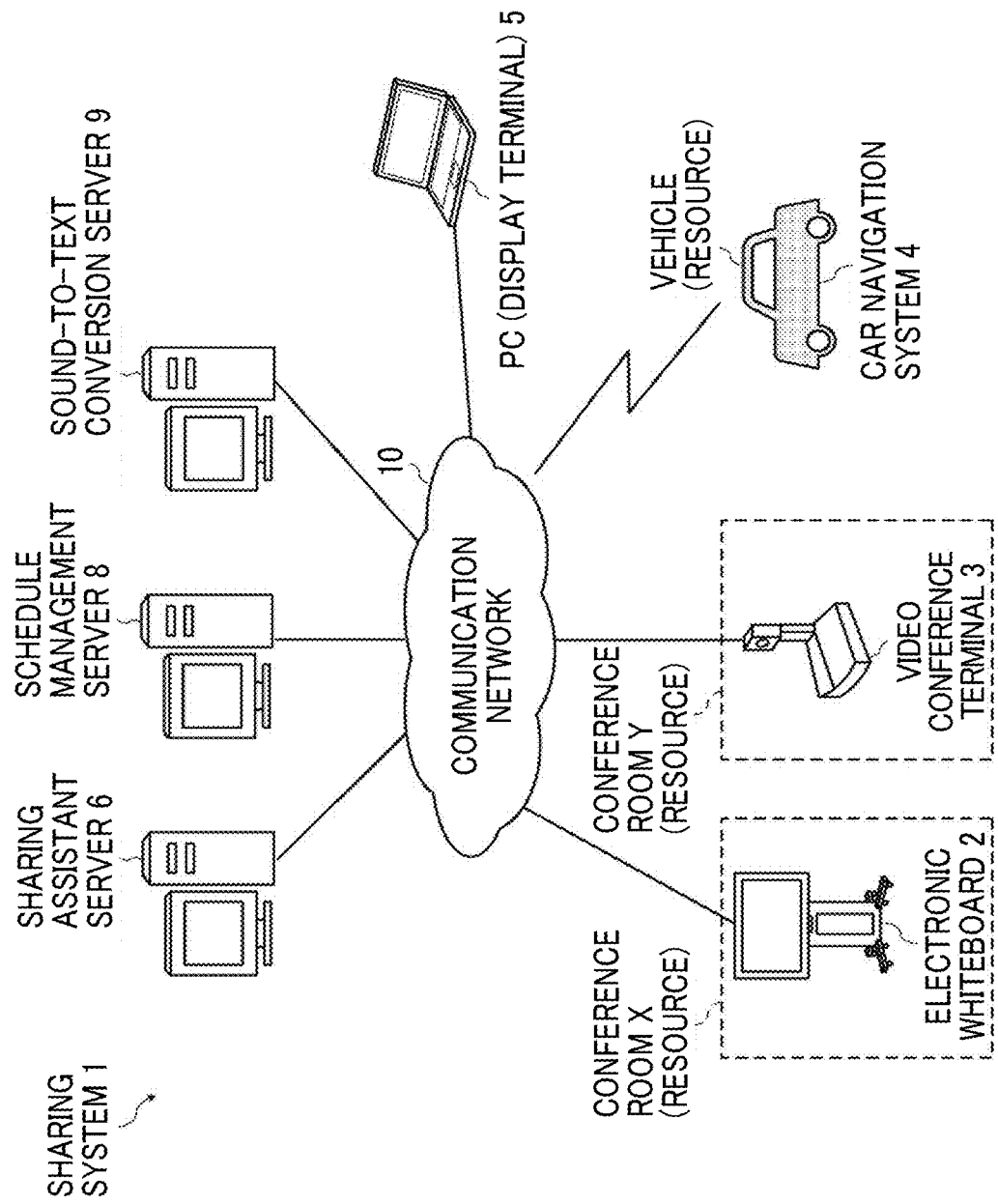
FIG. 1 is a schematic view of a sharing system, according to an embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present disclosure. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring to the drawings, a system for sharing one or more resources (which is referred to as a "sharing system 1") according to one or more embodiments is described. In one or more embodiments of this disclosure, an "electronic file" may be referred to as a "file".

Overview of System Configuration:

First, an overview of a configuration of the sharing system 1 is described. FIG. 1 is a schematic view of the sharing system 1 according to an embodiment.

As illustrated in FIG. 1, the sharing system 1 according to the embodiment includes an electronic whiteboard 2, a videoconference terminal 3, a car navigation system 4, a PC 5, a sharing assistant server 6, a schedule management server 8, and a sound-to-text conversion server 9.

The electronic whiteboard 2, the videoconference terminal 3, the car navigation system 4, the PC 5, the sharing assistant server 6, the schedule management server 8, and the sound-to-text conversion server 9 are communicable with one another via a communication network 10. The communication network 10 is implemented by the Internet, a mobile communication network, a local area network (LAN), etc. The communication network 10 may include, in addition to a wired communication network, a wireless communication network that is compliant with 3rd Generation (3G), Worldwide Interoperability for Microwave Access (WiMAX), Long Term Evolution (LTE), or the like.

In this example, the electronic whiteboard 2 is used in a conference room X. The videoconference terminal 3 is used in a conference room Y. Further, in this disclosure, a resource may be shared among a plurality of users, such that any user is able to reserve any resource. Accordingly, the resource can be a target for reservation by each user. The car navigation system 4 is used in a vehicle a. In this case, the vehicle a is a vehicle shared among a plurality of users, such as a vehicle used for car sharing. Further, the vehicle could be any machine capable of transporting the occupant from one location to another location. Examples of the vehicle a include, but not limited to, a car, a motorcycle, a bicycle, and a wheelchair.

Examples of a "resource" include, but not limited to, any object, service, space or place (room, or a part of room), information (data), which can be shared among a plurality of users. Further, the user may be an individual person, a group of persons, or an organization such as a company. The conference room X, the conference room Y, and the vehicle a are examples of a resource shared among a plurality of users. Examples of information serving as a resource include, but not limited to, information on an account assigned to the user, with the user being one or more individual persons. For example, an organization may be assigned one account that allows any user in the organization to use a specific service provided on the Internet. In such a case, information on such an account, such as a user name and a password, is assumed to be a resource that can be shared among a plurality of users in that organization. In one example, the teleconference or videoconference service may be provided via the Internet, which may be provided to a user who has logged in with a specific account.

Each of the electronic whiteboard 2, the videoconference terminal 3, and the car navigation system 4 is an example of a communication terminal. The communication terminal is any device capable of communicating with servers such as the sharing assistant server 6, the schedule management server 8, and the sound-to-text conversion server 9 and providing information obtained from the servers to the user of the resource. For example, as described below referring to step S32 in FIG. 20, the "communication terminal" is any terminal that the user uses to sign in to use services provided by the sharing system 1. Further, in the case where the resource is any conference room, the communication terminal may be any device provided in the conference room, such that information on the communication terminal may be associated with the conference room as a resource. Examples of the communication terminal used in the vehicle a may include not only the car navigation system 4 but also a smartphone or smartwatch installed with an application such as a car navigation application.

The PC 5 is an example a display terminal. The PC 5 is also an example of a registration apparatus that registers, to the schedule management server 8, a reservation made by each user to use each resource and any event scheduled to be conducted by each user. Examples of the event include, but not limited to, a conference, a meeting, a gathering, an assembly, a counseling session, a discussion, driving, a ride, and a movement.

The sharing assistant server 6, which is implemented by one or more computers, remotely assists in sharing of a resource among the users, for example, via a corresponding communication terminal.

The schedule management server 8, which is implemented by one or more computers, manages reservations made for individual resources and schedules of individual users.

The sound-to-text conversion server 9, which is implemented by one or more computers, converts sound (voice) data received from an external computer (for example, the sharing assistant server 6) into text data.

The sharing assistant server 6, the schedule management server 8, and the sound-to-text conversion server 9 may be collectively referred to as a management system. The management system may be, for example, a computer that implements all or a part of functions of the sharing assistant server 6, the schedule management server 8, and the sound-to-text conversion server 9. In another example, the sharing assistant server 6, the schedule management server 8, and the sound-to-text conversion server 9 can be implemented by a plurality of computers to which divided functions are arbitrary allocated. The description is given on the assumption that the sharing assistant server 6, the schedule management server 8, and the sound-to-text conversion server 9 are server computers provided in a cloud environment. Alternatively, the sharing assistant server 6 and the sound-to-text conversion server 9 may be servers that operate on a communication terminal such as the electronic whiteboard 2 or may be servers that are provided in an on-premises environment. The schedule management server 8 may be a server that is provided in an on-premises environment.

Hardware Configuration:

Referring to FIGS. 2 to 5, hardware configurations of the apparatuses and terminals of the sharing system 1 are described.

Figure 2:
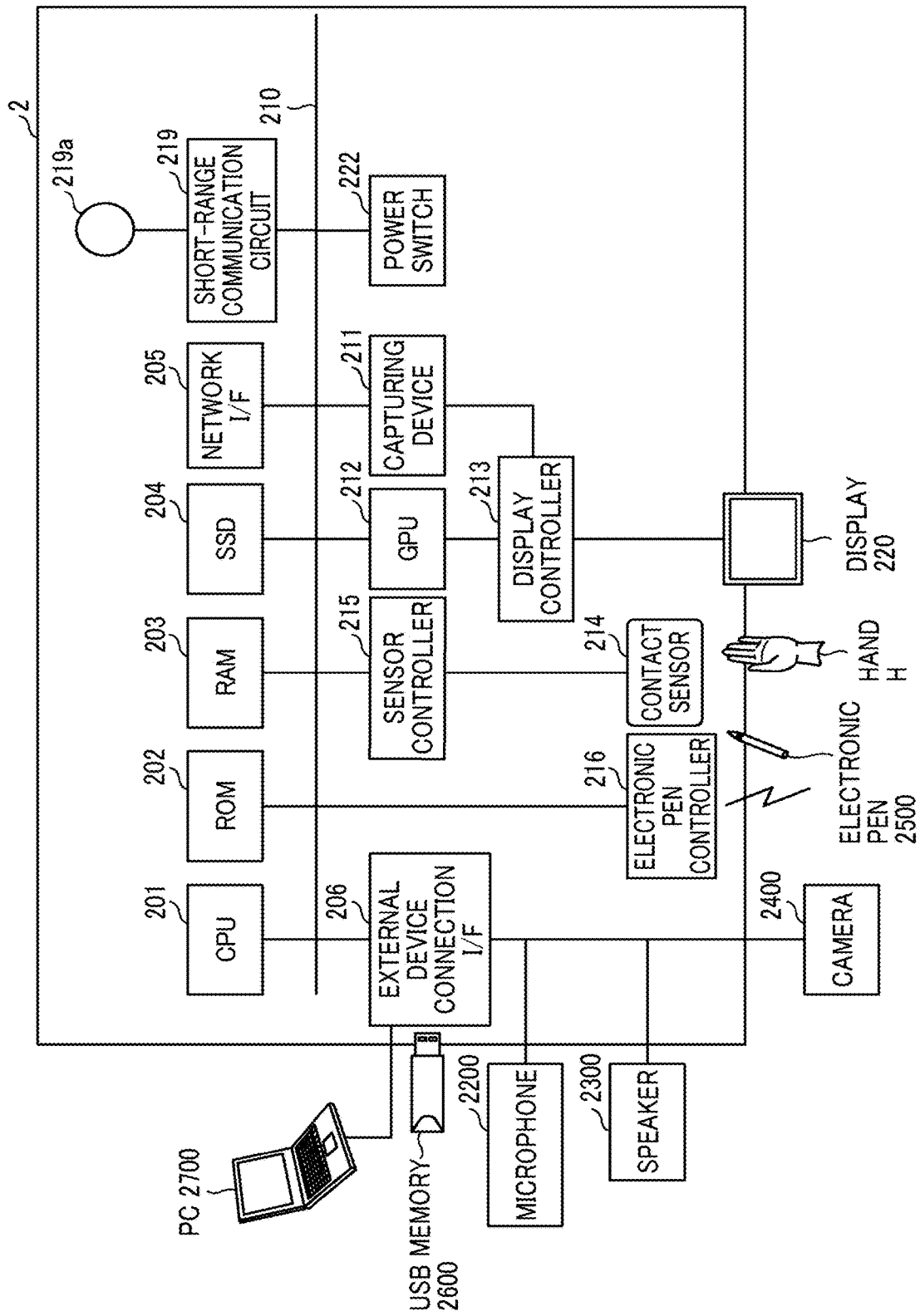
FIG. 2 is a schematic block diagram illustrating a hardware configuration of an electronic whiteboard, according to an embodiment of the present disclosure.

Hardware Configuration of Electronic Whiteboard:

FIG. 2 is a schematic block diagram illustrating a hardware configuration of the electronic whiteboard 2. As illustrated in FIG. 2, the electronic whiteboard 2 includes a central processing unit (CPU) 201, a read-only memory (ROM) 202, a random access memory (RAM) 203, a solid state drive (SSD) 204, a network interface (I/F) 205, and an external device connection I/F 206.

The CPU 201 controls entire operation of the electronic whiteboard 2. The ROM 202 stores a program such as an Initial Program Loader (IPL) used for booting the CPU 201. The RAM 203 is used as a work area for the CPU 201. The SSD 204 stores various kinds of data such as a program for the electronic whiteboard 2. The network I/F 205 controls communication with an external device via the communication network 10. The external device connection I/F 206 controls communication with a universal serial bus (USB) memory 2600, a PC 2700, and external devices (such as a microphone 2200, a speaker 2300, and a camera 2400).

The electronic whiteboard 2 further includes a capturing device 211, a graphics processing unit (GPU) 212, a display controller 213, a contact sensor 214, a sensor controller 215, an electronic pen controller 216, a short-range communication circuit 219, an antenna 219a for the short-range communication circuit 219, and a power switch 222.

The capturing device 211 acquires image data of an image displayed on a display 220 under control of the display controller 213, and stores the image data in the RAM 203 or the like. The display 220 is an example of a display (display device). The GPU 212 is a semiconductor chip dedicated to processing of graphical images. The display controller 213 controls and manages image display to display an image output from the capturing device 211 or the GPU 212 on the display 220 or the like. The contact sensor 214 detects a touch of an electronic pen 2500 or a user's hand H onto the display 220. The sensor controller 215 controls processing performed by the contact sensor 214. The contact sensor 214 senses a contact to coordinates on the display 220 using the infrared blocking system and detects the coordinates. More specifically, the display 220 is provided with two light emitting/receiving devices disposed on respective upper side ends of the display 220, and a reflector frame surrounding the sides of the display 220. The light emitting/receiving devices emit a plurality of infrared rays in parallel to a surface of the display 220, and the plurality of infrared rays are reflected by the reflector frame. Light receiving elements of the light emitting/receiving devices receive the infrared rays returning along an optical path that is the same as an optical path of the emitted infrared rays. The contact sensor 214 outputs identifiers (IDs) of one or more infrared rays that are emitted from the light emitting/receiving devices and are blocked by an object (such as the user's hand H), to the sensor controller 215. Based on the IDs of the infrared rays, the sensor controller 215 detects coordinates of a position touched by the object. The electronic pen controller 216 communicates with the electronic pen 2500 to detect a touch of the tip or bottom of the electronic pen 2500 onto the display 220. The short-range communication circuit 219 is a communication circuit that is compliant with near-field communication (NFC), Bluetooth (registered trademark), or the like. The power switch 222 is used for powering on or off the electronic whiteboard 2.

The electronic whiteboard 2 further includes a bus line 210. The bus line 210 is an address bus or a data bus that electrically couples the constituents such as the CPU 201 illustrated in FIG. 2 to one another.

The contact sensor 214 is not limited to a sensor of the infrared blocking system type, and may be a sensor of a different type such as a capacitive touch panel that detects a change in capacitance to identify the contact position, a resistive film touch panel that detects a change in voltage across two opposed resistive films to identify the contact position, or an electromagnetic induction touch panel that detects electromagnetic induction caused by contact of an object onto a display to identify the contact position. The electronic pen controller 216 may also detect a touch of another part of the electronic pen 2500 such as a part held by the user with the hand H as well as the tip or bottom of the electronic pen 2500.

Figure 3:
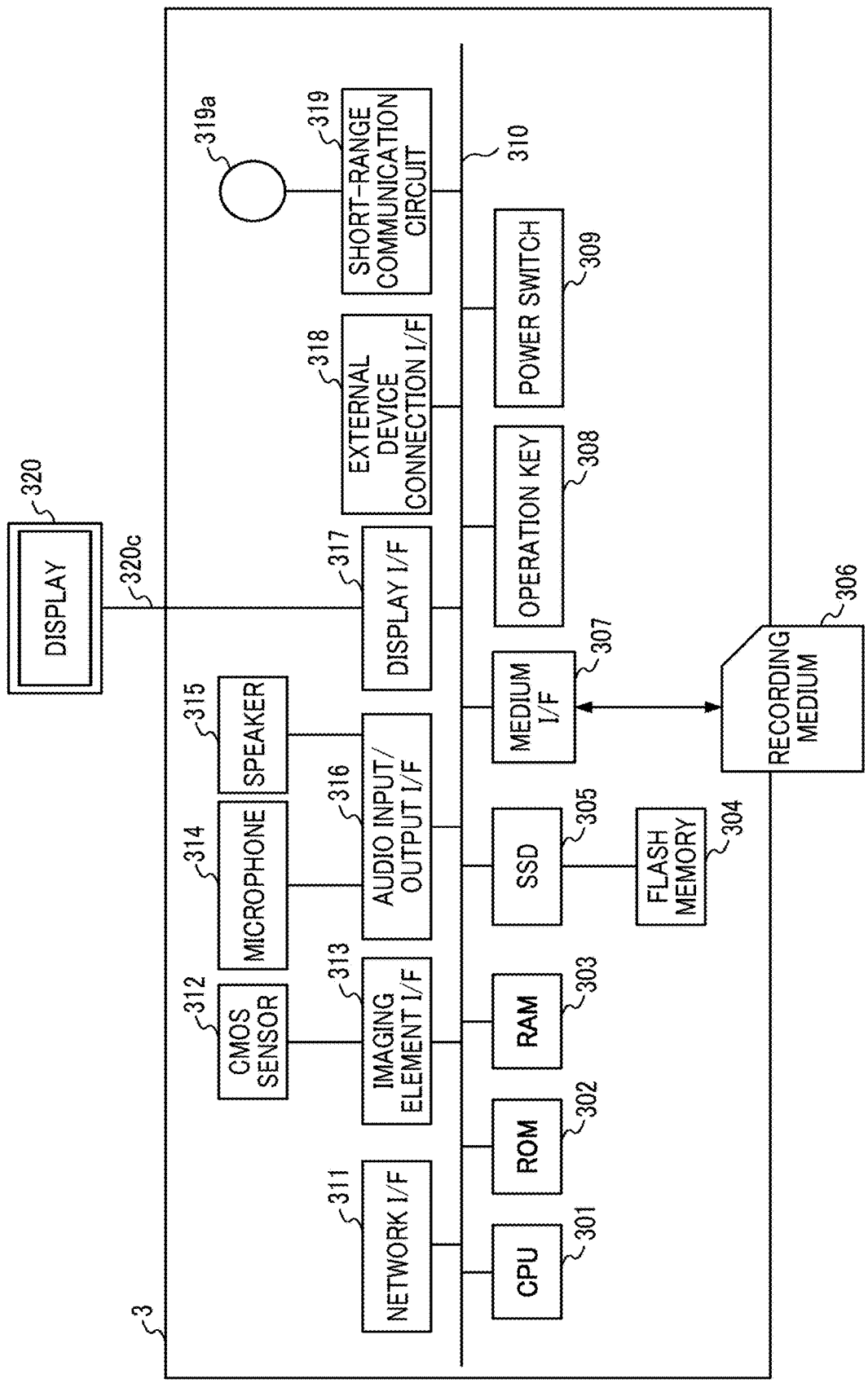
FIG. 3 is a schematic block diagram illustrating a hardware configuration of a videoconference terminal, according to an embodiment of the present disclosure.

Hardware Configuration of Videoconference Terminal:

FIG. 3 is a schematic block diagram illustrating a hardware configuration of the videoconference terminal 3. As illustrated in FIG. 3, the videoconference terminal 3 includes a CPU 301, a ROM 302, a RAM 303, a flash memory 304, an SSD 305, a medium I/F 307, an operation key 308, a power switch 309, a bus line 310, a network I/F 311, a complementary metal oxide semiconductor (CMOS) sensor 312, an imaging element I/F 313, a microphone 314, a speaker 315, an audio input/output I/F 316, a display I/F 317, an external device connection I/F 318, a short-range communication circuit 319, and an antenna 319a for the short-range communication circuit 319. The CPU 301 controls entire operation of the videoconference terminal 3. The ROM 302 stores a program such as an IPL used for booting the CPU 301. The RAM 303 is used as a work area for the CPU 301. The flash memory 304 stores various kinds of data such as a communication program, image data, and sound data. The SSD 305 controls reading of various kinds of data from or writing of various kinds of data to the flash memory 304 under control of the CPU 301. Instead of the SSD 305, a hard disk drive (HDD) may be used. The medium I/F 307 controls reading of data from or writing of data to a recording medium 306 such as a flash memory. The operation key 308 is operated by a user to input a user instruction such as user selection of a communication destination of the videoconference terminal 3. The power switch 309 is used for powering on or off the videoconference terminal 3.

The network I/F 311 is an interface that enables communication of data via the communication network 10 such as the Internet. The CMOS sensor 312 is an example of a built-in imaging device that captures an image of a subject under control of the CPU 301 to obtain image data. The imaging element I/F 313 is a circuit that controls driving of the CMOS sensor 312. The microphone 314 is an example of a built-in sound collecting device that inputs an audio signal. The audio input/output I/F 316 is a circuit that inputs an audio signal to the speaker 315 or outputs an audio signal fed from the microphone 314 under control of the CPU 301. The display I/F 317 is a circuit that transmits image data to an external display 320 under control of the CPU 301. The external device connection I/F 318 is an interface that connects the videoconference terminal 3 to various external devices. The short-range communication circuit 319 is a communication circuit that is compliant with NFC, Bluetooth, or the like.

The bus line 310 is an address bus or a data bus that electrically couples the constituents such as the CPU 301 illustrated in FIG. 3 to one another.

The external display 320 is an example of a display (display device) such as a liquid crystal or organic electroluminescence (EL) display that displays an image of a subject, an operation icon, or the like. The external display 320 is coupled to the display I/F 317 by a cable 320c. The cable 320c may be an analog red green blue (RGB) (Video Graphic Array (VGA)) signal cable, a component video cable, a DisplayPort signal cable, a High-Definition Multimedia Interface (HDMI) (registered trademark) signal cable, or a Digital Video Interactive (DVI) signal cable.

Instead of the CMOS sensor 312, an imaging element such as a charge coupled device (CCD) sensor may be used. The external device connection I/F 318 is an interface to which an external device such as an external camera, an external microphone, or an external speaker is connectable by a USB cable or the like. When an external camera is connected, the external camera is driven in preference to the built-in CMOS sensor 312 under control of the CPU 301. Similarly, when an external microphone is connected, the external microphone is driven in preference to the built-in microphone 314 under control of the CPU 301. When an external speaker is connected, the external speaker is driven in preference to the built-in speaker 315 under control of the CPU 301.

The recording medium 306 is removable from the videoconference terminal 3. Instead of the flash memory 304, any nonvolatile memory that reads or writes data, such as an electrically erasable programmable read-only memory, under control of the CPU 301 may be used.

Figure 4:
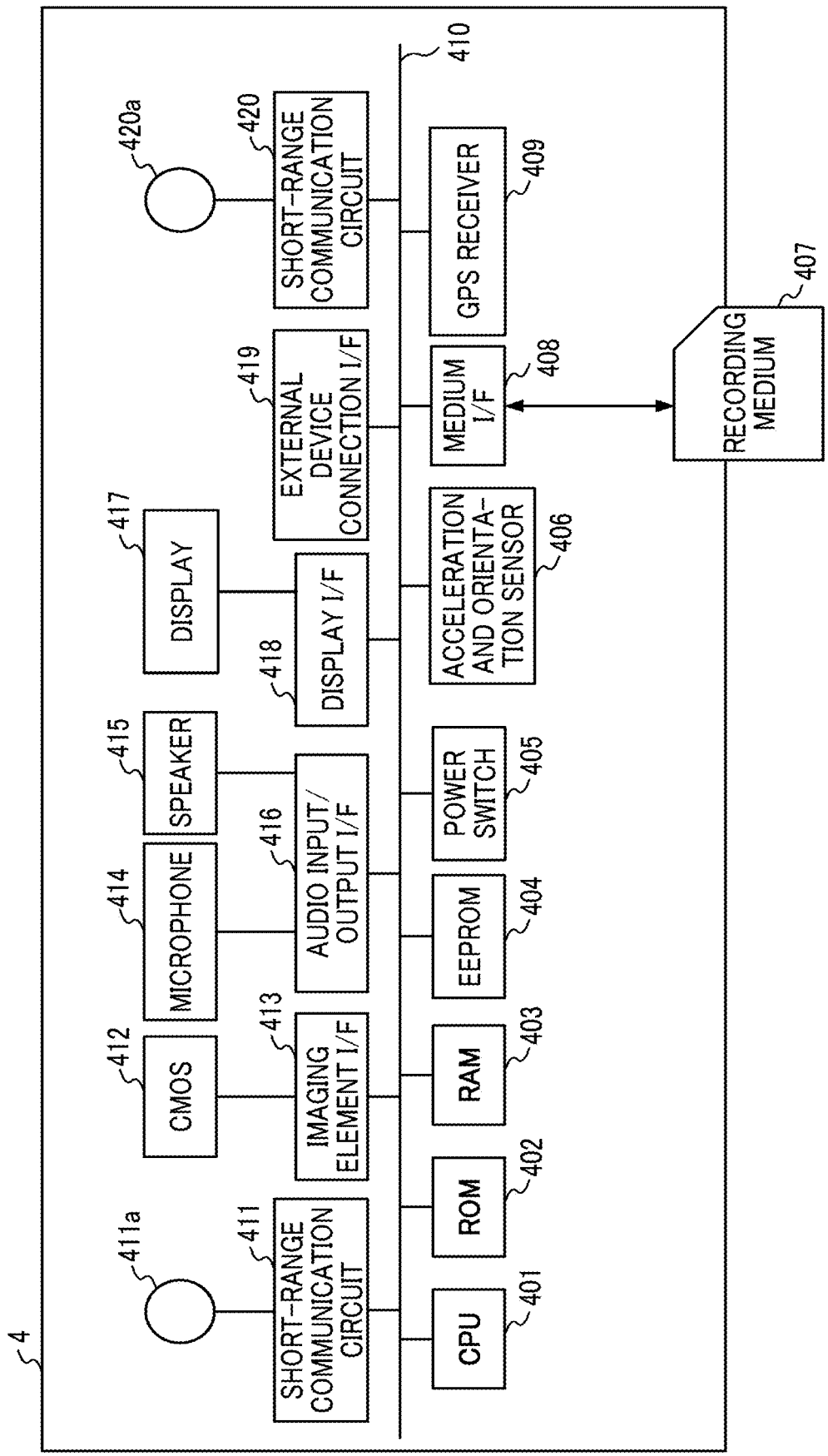
FIG. 4 is a schematic block diagram illustrating a hardware configuration of a car navigation system, according to an embodiment of the present disclosure.

Hardware Configuration of Car Navigation System:

FIG. 4 is a schematic block diagram illustrating a hardware configuration of the car navigation system 4. As illustrated in FIG. 4, the car navigation system 4 includes a CPU 401, a ROM 402, a RAM 403, an EEPROM 404, a power switch 405, an acceleration and orientation sensor 406, a medium I/F 408, and a Global Positioning System (GPS) receiver 409.

The CPU 401 controls entire operation of the car navigation system 4. The ROM 402 stores a program such as an IPL used for booting the CPU 401. The RAM 403 is used as a work area for the CPU 401. The EEPROM 404 reads or writes various kinds of data such as a program for the car navigation system 4 under control of the CPU 401. The power switch 405 is used for powering on or off the car navigation system 4. The acceleration and orientation sensor 406 includes various sensors such as an electromagnetic compass that detects geomagnetism or a gyrocompass, and an acceleration sensor. The medium I/F 408 controls reading of data from or writing of data to a recording medium 407 such as a flash memory. The GPS receiver 409 receives a GPS signal from a GPS satellite.

The car navigation system 4 further includes a long-range communication circuit 411, an antenna 411a for the long-range communication circuit 411, a CMOS sensor 412, an imaging element I/F 413, a microphone 414, a speaker 415, an audio input/output I/F 416, a display 417, a display I/F 418, an external device connection I/F 419, a short-range communication circuit 420, and an antenna 420a for the short-range communication circuit 420.

The long-range communication circuit 411 is a circuit that receives traffic jam information, road construction information, traffic accident information, and the like provided from an infrastructure system external to the vehicle, and transmits information such as vehicle location information and a life-saving signal at emergency to an external system. Examples of the infrastructure system include, but not limited to, a road information guidance system such as a Vehicle Information and Communication System (VICS) (registered trademark). The CMOS sensor 412 is an example of a built-in imaging device that captures an image of a subject under control of the CPU 401 to obtain image data. The imaging element I/F 413 is a circuit that controls driving of the CMOS sensor 412. The microphone 414 is an example of a built-in sound collecting device that inputs an audio signal. The audio input/output I/F 416 is a circuit that inputs an audio signal to the speaker 415 or outputs an audio signal fed from the microphone 414 under control of the CPU 401. The display 417 is an example of a display (display device) such as a liquid crystal or organic EL display that displays an image of a subject, various icons, or the like. The display 417 has a function of a touch panel. The touch panel is an example of an input device used by the user to operate the car navigation system 4. The display I/F 418 is a circuit that enables the display 417 to display an image. The external device connection I/F 419 is an interface circuit that connects the car navigation system 4 to various external devices. The short-range communication circuit 420 is a communication circuit that is compliant with NFC, Bluetooth, or the like. The car navigation system 4 further includes a bus line 410. The bus line 410 is an address bus or a data bus that electrically couples the constituents such as the CPU 401 illustrated in FIG. 4 to one another.

Figure 5:
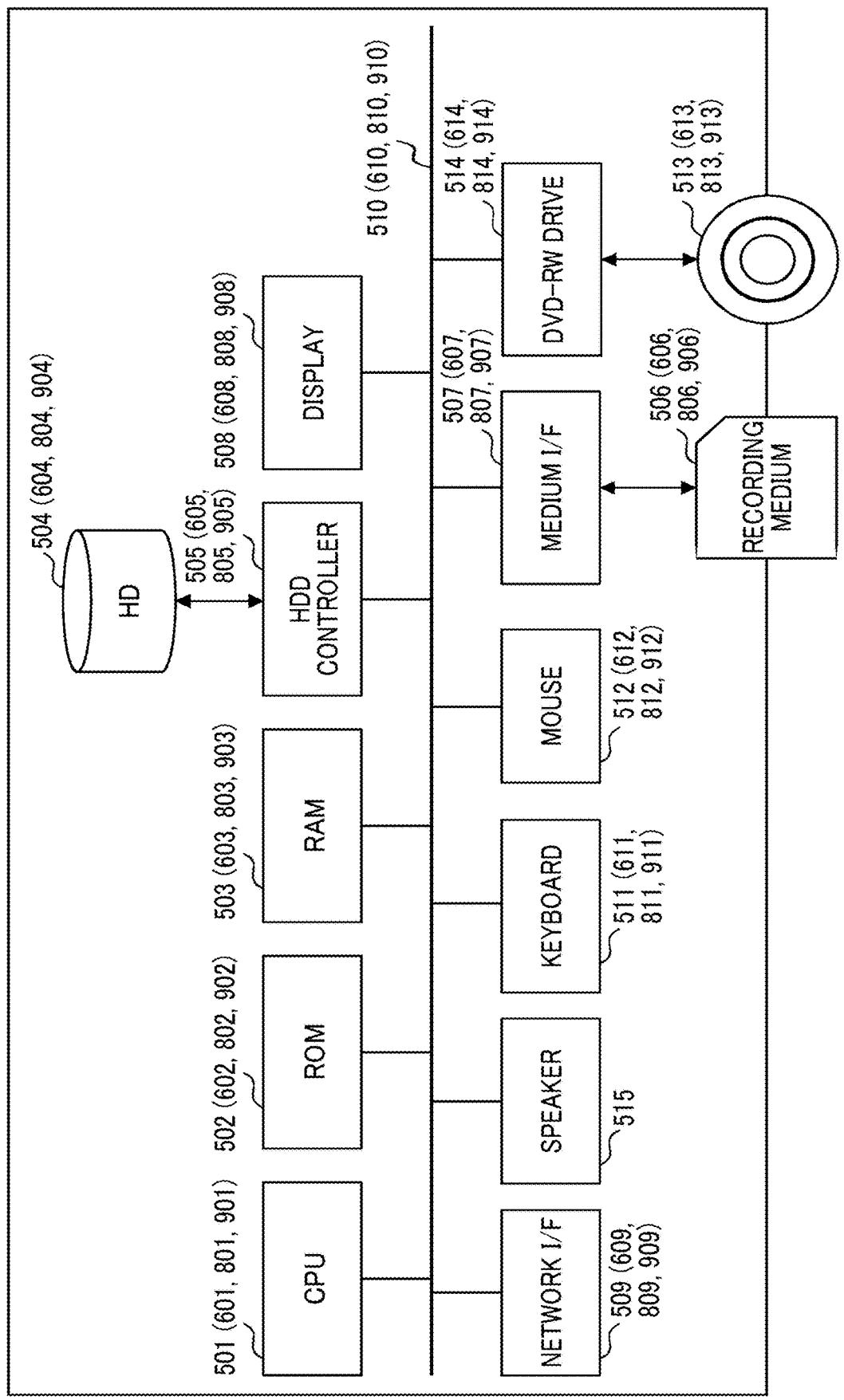
FIG. 5 is a schematic block diagram illustrating a hardware configuration of a computer such as a personal computer (PC) or a server, according to an embodiment of the present disclosure.

Hardware Configurations of Servers and PC:

FIG. 5 is a schematic block diagram illustrating hardware configurations of the PC 5 and the servers such as the sharing assistant server 6, the schedule management server 8, and the sound-to-text conversion server 9. The PC 5 is implemented by a general-purpose computer. As illustrated in FIG. 5, the PC 5 includes a CPU 501, a ROM 502, a RAM 503, a hard disk (HD) 504, an HDD controller 505, a medium I/F 507, a display 508, a network I/F 509, a keyboard 511, a mouse 512, a compact disc rewritable (CD-RW) drive 514, a speaker 515, and a bus line 510.

The CPU 501 controls entire operation of the PC 5. The ROM 502 stores a program such as an IPL used for booting the CPU 501. The RAM 503 is used as a work area for the CPU 501. The HD 504 stores various kinds of data such as a program. The HDD controller 505 controls reading of various kinds from or writing of various kinds of data to the HD 504 under control of the CPU 501. The medium I/F 507 controls reading of data from or writing (storing) of data to a recording medium 506 such as a flash memory. The display 508 displays various kinds of information such as a cursor, menu, window, characters, or image. The display 508 is an example of a display (display device). The network I/F 509 is an interface that enables communication of data via the communication network 10. The keyboard 511 is one example of an input device provided with a plurality of keys that enable a user to input characters, numerals, or various instructions. The mouse 512 is one example of an input device that enables the user to select or execute any of various instructions, select a target of processing, or move a cursor, for example. The CD-RW drive 514 controls reading of various kinds of data from or writing of various kinds of data to a CD-RW 513, which is one example of a removable recording medium. The speaker 515 outputs a sound signal under control of the CPU 501.

The PC 5 further includes the bus line 510. The bus line 510 is an address bus or a data bus that electrically couples constituents such as the CPU 501 illustrated in FIG. 5 to one another.

As illustrated in FIG. 5, the sharing assistant server 6, which is implemented by a general-purpose computer, includes a CPU 601, a ROM 602, a RAM 603, an HD 604, an HDD controller 605, a medium I/F 607, a display 608, a network I/F 609, a keyboard 611, a mouse 612, a CD-RW drive 614, and a bus line 610. The sharing assistant server 6 may be provided with a recording medium 606 and a CD-RW 613. Since these constituents have substantially the same configurations as the CPU 501, the ROM 502, the RAM 503, the HD 504, the HDD controller 505, the recording medium 506, the medium I/F 507, the display 508, the network I/F 509, the keyboard 511, the mouse 512, the CD-RW drive 514, and the bus line 510 of the PC 5, redundant description thereof is omitted.

As illustrated in FIG. 5, the schedule management server 8, which is implemented by a general-purpose computer, includes a CPU 801, a ROM 802, a RAM 803, an HD 804, an HDD controller 805, a medium I/F 807, a display 808, a network I/F 809, a keyboard 811, a mouse 812, a CD-RW drive 814, and a bus line 810. The schedule management server 8 may be provided with a recording medium 806 and a CD-RW 813. Since these constituents have substantially the same configurations as the CPU 501, the ROM 502, the RAM 503, the HD 504, the HDD controller 505, the recording medium 506, the medium I/F 507, the display 508, the network I/F 509, the keyboard 511, the mouse 512, the CD-RW drive 514, and the bus line 510 of the PC 5, redundant description thereof is omitted.

As illustrated in FIG. 5, the sound-to-text conversion server 9, which is implemented by a general-purpose computer, includes a CPU 901, a ROM 902, a RAM 903, an HD 904, an HDD controller 905, a medium I/F 907, a display 908, a network I/F 909, a keyboard 911, a mouse 912, a CD-RW drive 914, and a bus line 910. The sound-to-text conversion server 9 may be provided with a recording medium 906 and a CD-RW 913. Since these constituents have substantially the same configurations as the CPU 501, the ROM 502, the RAM 503, the HD 504, the HDD controller 505, the recording medium 506, the medium I/F 507, the display 508, the network I/F 509, the keyboard 511, the mouse 512, the CD-RW drive 514, and the bus line 510 of the PC 5, redundant description thereof is omitted.

Further, any one of the above-described programs may be recorded as a file of an installable or executable format on a computer-readable recording medium for distribution. Examples of the recording medium include, but not limited to, a Compact Disc Recordable (CD-R), a Digital Versatile Disc (DVD), a Blu-ray disc, and an SD card. In addition, such a recording medium may be provided in the form of a program product within a certain country or outside that country. For example, the PC 5 executes the program according to the embodiment of the present disclosure to implement a display control method according to the embodiment of the present disclosure.

The sharing assistant server 6 may be implemented by a single computer, or a plurality of computers to which divided portions (functions, units, or storages) are arbitrarily allocated. The same applies also to the schedule management server 8 and the sound-to-text conversion server 9.

Figure 6:
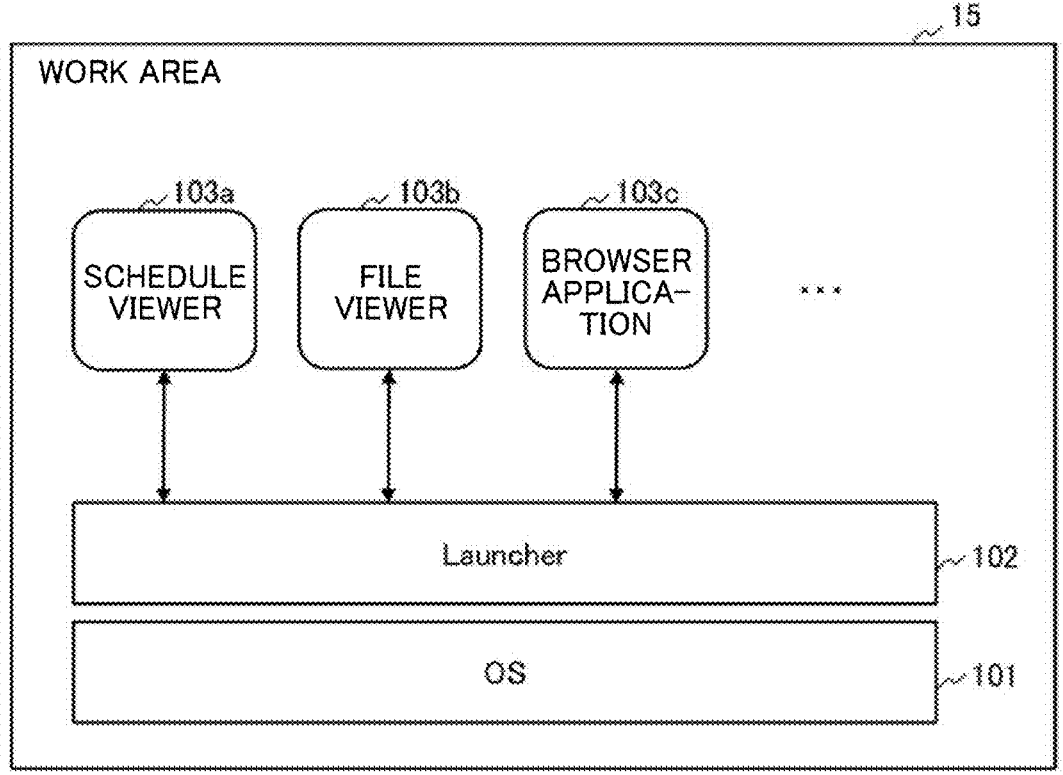
FIG. 6 is a schematic block diagram illustrating a software configuration of the electronic whiteboard, according to an embodiment of the present disclosure.

Software Configuration of Electronic Whiteboard:

Referring next to FIG. 6, computer software to be installed on the electronic whiteboard 2 is described. In this disclosure, computer software (hereinafter simply referred to as software) is a program relating to operation to be performed by a computer or any information that is used in processing performed by a computer and that is equivalent to the program. The program is a set of instructions for causing the computer to perform processing to achieve a certain result. The information that is equivalent to the program is not a program itself since the information is not instructions directly given to a computer but has a property that is common to a program in terms of its property of defining the processing to be performed by the computer. For example, a data structure, which is a logical structure of data represented by an interrelation between data elements, corresponds to the information that is equivalent to the program.

An application program, which may be simply referred to as an "application", is a general term for any software used for performing certain processing among the categories of software. The operating system (hereinafter abbreviated as "OS") is software that controls a computer to make computer resources available to an application or the like. The OS performs basic control and management of a computer, such as control of input/output, management of hardware such as a memory and a hard disk, and management of processes. The application operates using functions provided by the OS.

FIG. 6 is a schematic block diagram illustrating a software configuration of the electronic whiteboard 2. As illustrated in FIG. 6, the electronic whiteboard 2 is installed with an OS 101, a launcher 102, a schedule viewer 103a, a file viewer 103b, and a browser application 103c, which operate on a work area 15 of the RAM 203. The OS 101 is basic software that provides basic functions of the electronic whiteboard 2 and controls entire operation of the electronic whiteboard 2.

The launcher 102 is a launcher application that operates on the OS 101. The launcher 102 manages, for example, the start and end of an event such as a meeting conducted using the electronic whiteboard 2, or manages external applications such as the schedule viewer 103a, the file viewer 103b, and the browser application 103c, which may be used during the event.

In this example, the schedule viewer 103a, the file viewer 103b, and the browser application 103c are external applications that operate on the launcher 102 and are collectively referred to as "external applications" 103 when they are not distinguished from one another in particular. The external applications 103 are each executed independently of the launcher 102 to implement a service or a function provided on the OS 101. Although FIG. 6 illustrates an example in which three external applications 103 including the schedule viewer 103a, the file viewer 103b, and the browser application 103c are installed on the electronic whiteboard 2, the number of external applications 103 is not limited to three.

Figure 7:
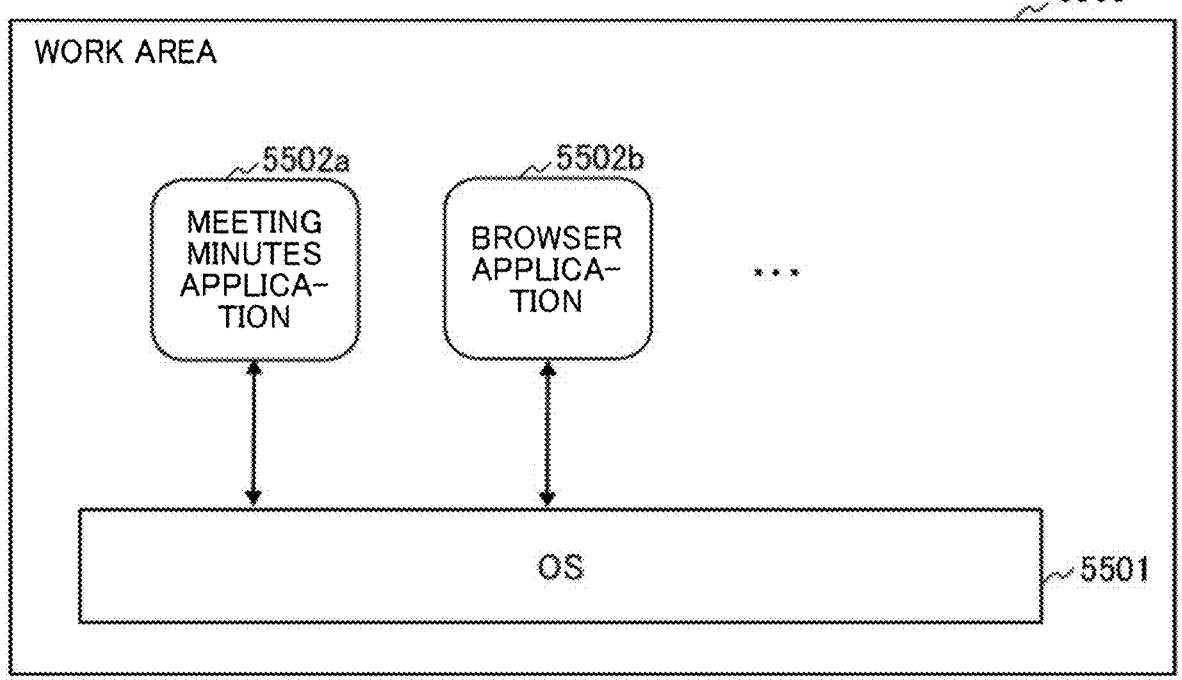
FIG. 7 is a schematic block diagram illustrating a software configuration of the PC, according to an embodiment of the present disclosure.

Software Configuration of PC:

Referring next to FIG. 7, computer software to be installed on the PC 5 is described. FIG. 7 is a schematic block diagram illustrating a software configuration of the PC 5. As illustrated in FIG. 7, the PC 5 is installed with an OS 5501, a meeting minutes application 5502a, and a browser application 5502b, which operate on a working area 5500 of the RAM 503. The OS 5501 is basic software that provides basic functions of the PC 5 and controls entire operation of the PC 5.

The meeting minutes application 5502a and the browser application 5502b are applications that use various kinds of data transmitted from the schedule management server 8 to generate and display a conducted event record screen which includes the minutes of an event having been conducted using the electronic whiteboard 2. Although FIG. 7 illustrates an example in which two external applications, that is, the meeting minutes application 5502a and the browser application 5502b, are installed on the PC 5, the number of external applications is not limited to two.

Figure 8A:
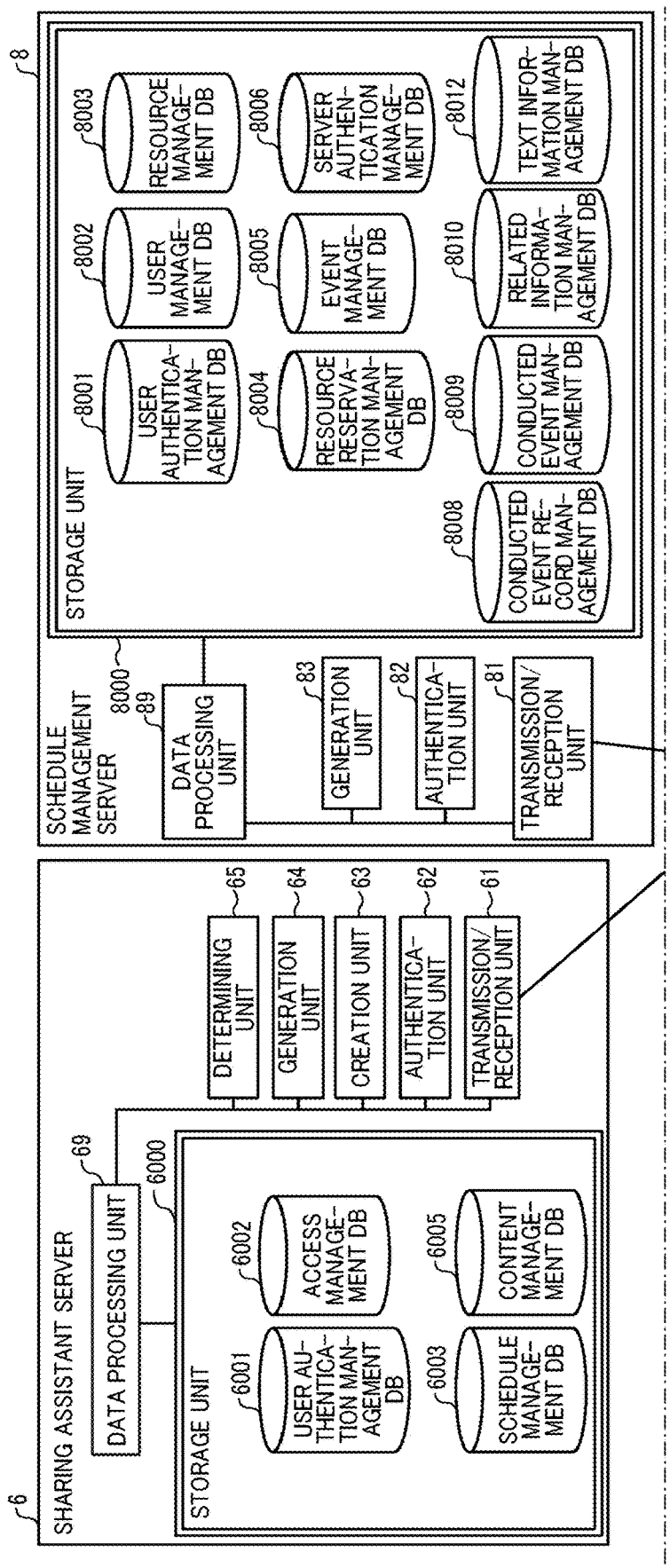
FIG. 8A and FIG. 8B are schematic block diagrams illustrating a functional configuration of the sharing system.
Figure 8B:
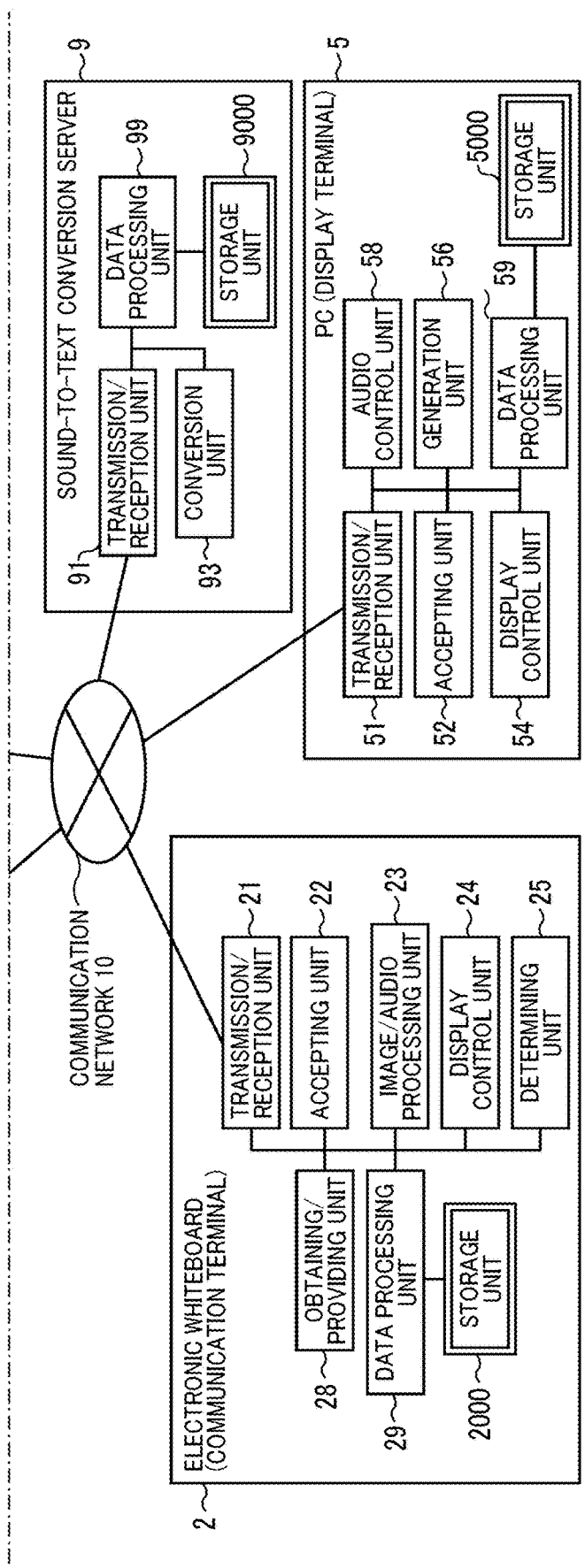

Functional Configuration of Sharing System:

Referring next to FIGS. 8A and 8B to FIG. 15, a functional configuration of the sharing system 1 according to the embodiment is described. FIG. 8A and FIG. 8B are a schematic block diagram illustrating a functional configuration of a part of the sharing system 1. FIG. 8A and FIG. 8B illustrate terminals, apparatuses, and servers that relate to processes or operations to be described below among the terminals, apparatuses, and servers illustrated in FIG. 1.

Functional Configuration of Electronic Whiteboard:

As illustrated in FIG. 8B, the electronic whiteboard 2 includes a transmission/reception unit 21, an accepting unit 22, an image/audio processing unit 23, a display control unit 24, a determining unit 25, an obtaining/providing unit 28, and a data processing unit 29. These units are functions that are implemented by or units that are caused to function by any of the constituents illustrated in FIG. 2 operating in accordance with instructions of the CPU 201 based on a program loaded from the SSD 204 to the RAM 203. The electronic whiteboard 2 further includes a storage unit 2000, which is implemented by the RAM 203, the SSD 204, or the USB memory 2600 illustrated in FIG. 2.

Functional Units of Electronic Whiteboard:

Next, individual functional units of the electronic whiteboard 2 are described. The transmission/reception unit 21 is implemented by instructions of the CPU 201, by the network I/F 205, and by the external device connection I/F 206 which are illustrated in FIG. 2. The transmission/reception unit 21 transmits or receives various kinds of data (or information) to or from another terminal, apparatus, or system via the communication network 10.

The accepting unit 22 is implemented mainly by the instructions of the CPU 201, by the contact sensor 214, and by the electronic pen controller 216 which are illustrated in FIG. 2. The accepting unit 22 accepts various inputs from the user.

The image/audio processing unit 23 is implemented by instructions of the CPU 201 and by the capturing device 211 which are illustrated in FIG. 2, and stores image data of an image displayed on the display 220. The image/audio processing unit 23 is also implemented by instructions of the CPU 201 and by the GPU 212 which are illustrated in FIG. 2, and performs image processing to display an image on the display 220. The image/audio processing unit 23 also performs image processing on image data obtained by capturing an image of a subject with the camera 2400. After voice of a user is converted to an audio signal by the microphone 2200, the image/audio processing unit 23 performs audio processing on sound data corresponding to this audio signal. The image/audio processing unit 23 also outputs an audio signal based on sound data to the speaker 2300 to cause the speaker 2300 to output sound. The image/audio processing unit 23 obtains drawn image data of an image drawn by the user with the electronic pen 2500 or the user's hand H on the display 220, and converts the drawn image data into coordinate data. For example, when an electronic whiteboard 2a installed at a certain site transmits the coordinate data to an electronic whiteboard 2b at another site, the electronic whiteboard 2b at the other site controls the display 220 of the electronic whiteboard 2b to display a drawn image of the same content on the basis of the received coordinate data.

The display control unit 24 is implemented by instructions of the CPU 201 and by the display controller 213 which are illustrated in FIG. 2. The display control unit 24 controls the display 220 to display a drawn image. The display control unit 24 also accesses the sharing assistant server 6 using the web browser to obtain display data and controls the display 220 to display various screens based on the obtained display data. Specifically, the display control unit 24 starts and executes the launcher 102, which operates on the OS 101 illustrated in FIG. 6, and the external applications 103 to cause the display 220 to display various screens drawn in accordance with an application programming interface (API) provided by the OS 101.

The determining unit 25 is implemented by instructions of the CPU 201 illustrated in FIG. 2, and makes various determinations.

The obtaining/providing unit 28 is implemented by instructions of the CPU 201, by the short-range communication circuit 219, and by the antenna 219a which are illustrated in FIG. 2. The obtaining/providing unit 28 performs short-range communication with a dedicated terminal such as an IC card or a smartphone to obtain data from or provide data to the dedicated terminal.

The data processing unit 29 is implemented by instructions of the CPU 201 and by the SSD 204 which are illustrated in FIG. 2. The data processing unit 29 stores various kinds of data in the storage unit 2000 or reads various kinds of data stored in the storage unit 2000. Further, each time image data and sound data are received in communication with another electronic whiteboard or videoconference terminal, the storage unit 2000 overwrites the image data and sound data. The display 220 displays an image based on original image data to be overwritten, and the speaker 2300 outputs sound based on original sound data to be overwritten.

Since the videoconference terminal 3 and the car navigation system 4 each have substantially the same functions as those of the electronic whiteboard 2, redundant descriptions thereof are omitted here.

Functional Configuration of PC:

As illustrated in FIG. 8B, the PC 5 includes a transmission/reception unit 51, an accepting unit 52, a display control unit 54, a generation unit 56, an audio control unit 58, and a data processing unit 59. These units are functions that are implemented by or units that are caused to function by any of the constituents illustrated in FIG. 5 operating in accordance with instructions of the CPU 501 based on a program loaded to the RAM 503 from the HD 504. The PC 5 further includes a storage unit 5000 implemented by the HD 504 illustrated in FIG. 5.

Functional Units of PC:

Next, individual functional units of the PC 5 are described. The transmission/reception unit 51 is implemented by instructions of the CPU 501 and by the network OF 509 which are illustrated in FIG. 5. The transmission/reception unit 51 transmits various kinds of data (or information) to or receives various kinds of data (or information) from another terminal, apparatus, or system via the communication network 10. The transmission/reception unit 51 is an example of a reception unit. The transmission/reception unit 51 is an example of a transmission unit.

The accepting unit 52 is implemented mainly by instructions of the CPU 501, by the keyboard 511, and by the mouse 512 which are illustrated in FIG. 5. The accepting unit 52 accepts various inputs from the user. The accepting unit 52 is an example of an editing accepting unit. The accepting unit 52 is an example of an editing request accepting unit. The accepting unit 52 is an example of a selection accepting unit.

The display control unit 54 is implemented by instructions of the CPU 501 illustrated in FIG. 5. The display control unit 54 controls the display 508 to display an image. The display control unit 54 also accesses the sharing assistant server 6 using the web browser to obtain display data and controls the display 220 to display various screens based on the obtained display data. Specifically, the display control unit 54 starts and executes the meeting minutes application 5502a or the browser application 5502b, which operates on the OS 5501 illustrated in FIG. 7, to access the sharing assistant server 6 or the schedule management server 8. The display control unit 54 downloads, for example, a web application (web app), which includes at least Hyper Text Markup Language (HTML) and may further include Cascading Style Sheets (CSS) or JavaScript (registered trademark). The display control unit 54 controls the display 508 to display images based on various kinds of image data generated using the web app. For example, the display control unit 54 controls the display 508 to display images based on image data generated using HTML5, which includes data in an Extensible Markup Language (XML), JavaScript Object Notation (JSON), or Simple Object Access Protocol (SOAP) format. The display control unit 54 is an example of a display control unit.

The generation unit 56 is implemented by instructions of the CPU 501 illustrated in FIG. 5, and generates various kinds of image data based on which images are displayed on the display 508. The generation unit 56 generates various kinds of image data using content data received by the transmission/reception unit 51. For example, the generation unit 56 renders text data which is content data, and generates image data of the text data which is content image data to display an image of the rendered data. Rendering refers to processing of interpreting data written in a description language for web pages (such as HTML, CSS, or XML) and computing the arrangement of characters and images to be actually displayed on a screen. The generation unit 56 is an example of a generation unit.

The audio control unit 58 is implemented by instructions of the CPU 501 illustrated in FIG. 5, and controls the speaker 515 to output sound based on an audio signal. The audio control unit 58 sets sound data of sound to be output from the speaker 515, and controls the speaker 515 to output sound based on an audio signal of the set sound data. In this manner, the audio control unit 58 plays the sound of the sound data. The audio control unit 58 is an example of a playback unit.

The data processing unit 59 is implemented by instructions of the CPU 501 and by the HDD controller 505 which are illustrated in FIG. 5. The data processing unit 59 stores various kinds of data in the storage unit 5000 or reads various kinds of data from the storage unit 5000.

Functional Configuration of Sharing Assistant Server:

The sharing assistant server 6 includes a transmission/reception unit 61, an authentication unit 62, a creation unit 63, a generation unit 64, a determining unit 65, and a data processing unit 69. These units are functions that are implemented by or units that are caused to function by any of the constituents illustrated in FIG. 5 operating in accordance with instructions of the CPU 601 based on a sharing assistant program loaded to the RAM 603 from the HD 604. The sharing assistant server 6 includes a storage unit 6000 implemented by the HID 604 or the like illustrated in FIG. 5.

User Authentication Management Table:

FIG. 9A is an illustration of an example of a user authentication management table. The storage unit 6000 stores a user authentication management database (DB) 6001 configured in accordance with the user authentication management table illustrated in FIG. 9A. In the user authentication management table, a user ID for identifying a user, a user name of the user, an organization ID for identifying an organization to which the user belongs, and a password are managed in association with one another. Examples of the organization ID include a domain name representing a group or an organization that manages a plurality of computers on the communication network.

Access Management Table:

FIG. 9B is an illustration of an example of an access management table. The storage unit 6000 stores an access management DB 6002 configured in accordance with the access management table illustrated in FIG. 9B. In the access management table, an organization ID, and an access ID and an access password that are used in authentication performed to access the schedule management server 8 are managed in association with one another. The access ID and the access password are used when the sharing assistant server 6 uses a service (function) provided by the schedule management server 8 via a web API or the like, using a protocol such as Hypertext Transfer Protocol (HTTP) or Hypertext Transfer Protocol Secure (HTTPS). The schedule management server 8 manages a plurality of schedulers. Since different organizations may use different schedulers, the access management table is used to manage these schedulers.

Schedule Management Table:

FIG. 9C is an illustration of an example of a schedule management table. The storage unit 6000 stores a schedule management DB 6003 configured in accordance with the schedule management table illustrated in FIG. 9C. In the schedule management table, for each set of a scheduled event ID and a conducted event ID of an event, an organization ID, a user ID of a user who is a reservation holder, information on whether this reservation holder participates in the event, a name of the reservation holder, a scheduled start time of the event, a scheduled end time of the event, a name of the event, user IDs of one or more other participants of the event, information on whether the individual other participants participate in the event, names of the other participants, and file data are managed in association with one another.

The scheduled event ID is identification information for identifying an event for which a resource is reserved. The scheduled event ID is an example of scheduled event identification information for identifying an event scheduled to be conducted. The conducted event ID is identification information for identifying an event that has been conducted or an event being conducted, from among one or more events for which the resource is reserved. The conducted event ID is an example of conducted event identification information for identifying an event that has been conducted or that is being conducted. The name of the reservation holder is a name of the user who has reserved a resource. For example, when the resource is a conference room, the name of the reservation holder is a name of an organizer who is organizing a meeting (an example of event). When the resource is a vehicle, the name of the reservation holder is a name of a driver of the vehicle. The scheduled start time indicates a time when the user schedules to start using the reserved resource. The scheduled end time indicates a time when the user schedules to end using the reserved resource. The event name is a name of the event scheduled to be conducted by the reservation holder. The user IDs of other participants are identification information for identifying the respective participants other than the reservation holder. The names of the other participants are names of participants other than the reservation holder. Examples of the names of the other participants include names of resources. In other words, the user scheduled to attend the event, managed by the schedule management table, includes a user as a reservation holder, other user as a participant of the event, and the resource reserved by the reservation holder. The file data is file data of a material file that is registered by the user A using a schedule input screen 550 (see FIG. 19) described later and that is used in the event corresponding to the scheduled event ID. In this example, the file data is data in a predetermined format created using various applications. Examples of the file data in a predetermined format include, but not limited to, a PowerPoint file and an Excel file.

Content Management Table:

FIG. 10 is an illustration of an example of a content management table. The storage unit 6000 stores a content management DB 6005 configured in accordance with the content management table illustrated in FIG. 10. In the content management table, for each conducted event ID, a content processing ID, a type of the content processing, content data, a start date and time of the content processing, and an end date and time of the content processing are managed in association one another. The content refers to content generated for a conducted event such as a meeting during the event, a material used in the event, or the like. Examples of the type of content processing include sound recording ("recording"), taking screenshots ("screenshotting"), conversion of sound data to text data ("sound-to-text conversion"), generation of an action item ("generation of action item"), and transmission of a material ("transmission of material"). The content processing ID is identification information for identifying processing performed on the content generated in the corresponding event.

Examples of the content include information ("record information") that indicates details of the conducted event and include an action item generated in the conducted event. For example, in the case where the event is a meeting, the record information may include recorded sound data, screenshots, sound-based text data, and meeting materials. Screenshotting refers to processing of capturing an image of a display screen at any time during the event to obtain image data of the display screen. Screenshotting is also referred to as capturing or image recognition, for example.

When the type of content processing is "recording", the "content data" field includes a Uniform Resource Locator (URL) of a storage location of recorded sound data. When the type of the content processing is "screenshotting", the "content data" field includes a URL of a storage location of image data generated by capturing a screen image. The term "capturing" refers to storing, as image data, an image (still image or moving image) being displayed on the display 220 of the electronic whiteboard 2. When the type of the content processing is "sound-to-text conversion", the "content data" field includes a URL of a storage location of received text data of sound-based text.

An action item is generated during an event such as a meeting, and indicates an action to be taken by a person relating to the event. When the type of the content processing is "generation of action item", the "content data" field includes a user ID of a user responsible for the action item, a due date on which the action item is to be completed, and a URL of a storage location of image data representing the action item.

Functional Units of Sharing Assistant Server:

Next, individual functional units of the sharing assistant server 6 are described in detail. In the following description of the functional units of the sharing assistant server 6, a relationship between each functional unit of the sharing assistant server 6 and one or more constituents illustrated in FIG. 5 are also be described.

The transmission/reception unit 61 of the sharing assistant server 6 illustrated in FIG. 8A is implemented by instructions of the CPU 601 and by the network I/F 609 which are illustrated in FIG. 5. The transmission/reception unit 61 transmits or receives various kinds of data (or information) to or from another terminal, device, or system via the communication network 10.

The authentication unit 62 is implemented by instructions of the CPU 601 illustrated in FIG. 5. The authentication unit 62 determines whether information (the user ID, the organization ID, and the password) transmitted from the communication terminal matches any information previously registered in the user authentication management DB 6001. In this manner, the authentication unit 62 performs authentication.

The creation unit 63 is implemented by instructions of the CPU 601 illustrated in FIG. 5. The creation unit 63 creates a reservation list screen 230 such as a screen illustrated in FIG. 22 described below, based on reservation information and schedule information that are transmitted from the schedule management server 8.

The generation unit 64 is implemented by instructions of the CPU 601 illustrated in FIG. 5. The generation unit 64 generates a conducted event ID, a content processing ID, and a URL of a storage location of content.

The determining unit 65 is implemented by instructions of the CPU 601 illustrated in FIG. 5, and makes various determinations. A detailed description is given later of the determinations by the determining unit 65.

The data processing unit 69 is implemented by instructions of the CPU 601 and by the HDD controller 605 that are illustrated in FIG. 5. The data processing unit 69 stores various kinds of data in the storage unit 6000 or reads various kinds of data stored in the storage unit 6000.

Functional Configuration of Schedule Management Server:

The schedule management server 8 includes a transmission/reception unit 81, an authentication unit 82, a generation unit 83, and a data processing unit 89. These units are functions that are implemented by or units that are caused to function by any of the constituents illustrated in FIG. 5 operating in accordance with the instructions of the CPU 801 based on a schedule management program loaded to the RAM 803 from the HD 804. The schedule management server 8 includes a storage unit 8000 implemented by the HD 804 illustrated in FIG. 5.

User Authentication Management Table:

FIG. 11A is an illustration of an example of a user authentication management table. The storage unit 8000 stores a user authentication management DB 8001 configured in accordance with the user authentication management table illustrated in FIG. 11A. In the user authentication management table, a user ID for identifying each user is managed in association with an organization ID for identifying an organization to which the user belongs and a password.

User Management Table:

FIG. 11B is an illustration of an example of a user management table. The storage unit 8000 stores a user management DB 8002 configured in accordance with the user management table illustrated in FIG. 11B. In the user management table, for each organization ID, one or more user IDs each identifying a corresponding user belonging to that organization and names of the one or more users are managed in association with one another.

Resource Management Table:

FIG. 11C is an illustration of an example of a resource management table. The storage unit 8000 stores a resource management DB 8003 configured in accordance with the resource management table illustrated in FIG. 11C. In the resource management table, for each organization ID, one or more resource IDs each for identifying a resource managed by that organization and names of the one or more resources are managed in association with one another.

Resource Reservation Management Table:

FIG. 12A is an illustration of an example of a resource reservation management table. The storage unit 8000 stores a resource reservation management DB 8004 configured in accordance with the resource reservation management table illustrated in FIG. 12A. The resource reservation management table manages, for each organization, reservation information in which various kinds of information are associated with one another. The reservation information includes, for each organization ID, a resource ID, a resource name, a user ID of a communication terminal, a user ID of a reservation holder, a scheduled use start date and time, a scheduled use end date and time, and an event name. The scheduled use start date and time indicates a date and time when the user schedules to start using the resource. The scheduled end date and time indicates a date and time when the user schedules to end using the resource. While the date and time is expressed in terms of year, month, date, hour, minute, second, and time zone, FIG. 12A illustrates year, month, date, hour, and minute for simplicity.

Event Management Table:

FIG. 12B is an illustration of an example of an event management table. The storage unit 8000 stores an event management DB 8005 configured in accordance with the event management table illustrated in FIG. 12B. The event management table manages, for each event, event schedule information in which various kinds of information are associated with one another. Specifically, the event management table stores, for each scheduled event ID, an organization ID, a user ID, and a user name, a scheduled start date and time of the event, a scheduled end date and time of the event, and a name of the event, in association. The scheduled event start date and time indicates a scheduled start date and time of the event to be conducted. The scheduled event end date and time indicates a scheduled date and time of the event to be conducted. While the date and time is represented in terms of year, month, date, hour, minute, second, and time zone, FIG. 12B illustrates year, month, date, hour, and minute for simplicity. The event management table further manages, in association with each scheduled event ID, file data of a material file used in the event indicated by the schedule information.

Server Authentication Management Table:

FIG. 13A is an illustration of an example of a server authentication management table. The storage unit 8000 stores a server authentication management DB 8006 configured in accordance with the server authentication management table illustrated in FIG. 13A. The server authentication management table manages an access ID and an access password in association with each other. The access ID and the access password are the concepts that are the same as the access ID and the access password managed in the access management DB 6002 of the sharing assistant server 6.

Conducted Event Record Management Table:

FIG. 13B is an illustration of an example of a conducted event record management table. The storage unit 8000 stores a conducted event record management DB 8008 configured in accordance with the conducted event record management table illustrated in FIG. 13B. The conducted event record management table manages, for each conducted event ID, a content processing ID, a type of the content processing, content data, a start date and time of the content processing, and an end date and time of the content processing in association with one another. The conducted event record management DB 8008 manages data that is partially identical to data managed by the content management DB 6005. That is, the identical data includes the conducted event ID, the content processing ID, the type of content processing, the start date and time of the content processing, and the end date and time of the content processing. The content data has the same storage location although notations of the storage location of the content data differ (http:// or c://). Specifically, the storage location is written as c:// (local drive) in the content management table (FIG. 10B), and as http:// in the conducted event record management table (FIG. 13B).

Conducted Event Management Table:

FIG. 14A is an illustration of an example of a conducted event management table. The storage unit 8000 stores a conducted event management DB 8009 configured in accordance with the conducted event management table illustrated in FIG. 14A. The conducted event management table manages, for each conducted event ID, an event name, an event start date and time, and an event end date and time in association with one another. Out of the schedule information stored in the event management DB 8005, information relating to one or more events that have been actually conducted (called "conducted event") are managed in the conducted event management DB 8009.

Related Information Management Table:

FIG. 14B is an illustration of an example of a related information management table. The storage unit 8000 stores a related information management DB 8010 configured in accordance with the related information management table illustrated in FIG. 14B. The related information management table manages, for each conducted event ID, related information in which various kinds of information (data) are associated with one another. The related information includes a time when content is generated ("content generation time"), sound data, sound-based text data, and screen data, which are managed in association with one another. The content generation time indicates an elapsed time when content is generated during the event, counted from the event start date and time. The content generation time is generated by the generation unit 83, on the basis of the event start date and time stored in the event management DB 8005, the start date and time and the end date and time of the content processing that are stored in the conducted event record management DB 8008. The content generation time is an example of time information. The "sound data" field includes the content processing ID and the type of content processing. The "sound-based text data" field and the "screen data" field each include the content processing ID, the type of content processing, and the sequence number. The sequence number indicates a temporal order in which content processing is performed on the sound-based text data or the screen data.

Text Information Management Table:

FIG. 15 is an illustration of an example of a text information management table. The storage unit 8000 stores a text information management DB 8012 configured in accordance with the text information management table illustrated in FIG. 15. The text information management table manages, for each conducted event ID, text information including sound-based text data generated in the corresponding conducted event. In the text information, a content processing ID, a text ID for identifying text data, transcript indicating the content of the text data, and state information indicating the state of the text data are associated with one another. The content processing ID is an ID for identifying content processing assigned the type "sound-to-text conversion". The transcript (text data) is text data indicating data of the content associated in the conducted event record management DB 8008 with the content processing ID that is the same as the content processing ID associated as the text information. The state information is information indicating whether the text data has been edited. When the associated text data has not been edited from text data generated by the sound-to-text conversion server 9, the state information is "Original" which indicates that the text data has not been edited.

Functional Units of Schedule Management Server:

Next, functional units of the schedule management server 8 are described in detail. In the following description of the functional units of the schedule management server 8, a relationship between each functional unit of the schedule management server 8 and one or more constituents illustrated in FIG. 5 is also be described.

The transmission/reception unit 81 of the schedule management server 8 illustrated in FIG. 8A is implemented by instructions of the CPU 801 and by the network I/F 809 that are illustrated in FIG. 5. The transmission/reception unit 81 transmits or receives various kinds of data (or information) to or from another terminal, device, or system via the communication network 10.

The authentication unit 82 is implemented by instructions of the CPU 801 illustrated in FIG. 5. The authentication unit 82 determines whether information (the user ID, the organization ID, and the password) transmitted from the resource matches any information previously registered in the user authentication management DB 8001 to perform authentication. The authentication unit 82 also determines whether information (the access ID and the access password) transmitted from the sharing assistant server 6 matches any information previously registered in the server authentication management DB 8006 to perform authentication.

The generation unit 83 is implemented by instructions of the CPU 801 illustrated in FIG. 5. The generation unit 83 generates related information to be registered in the related information management DB 8010.

The data processing unit 89 is implemented by instructions of the CPU 801 illustrated in FIG. 5 and by the HDD controller 805 illustrated in FIG. 5. The data processing unit 89 stores various kinds of data in the storage unit 8000 or reads various kinds of data stored in the storage unit 8000. The data processing unit 89 is an example of a storage control unit.

Functional Configuration of Sound-to-Text Conversion Server:

The sound-to-text conversion server 9 includes a transmission/reception unit 91, a conversion unit 93, and a data processing unit 99. These units are functions that are implemented by or units that are caused to function by any of the constituents illustrated in FIG. 5 operating in accordance with the instructions of the CPU 901 based on a program loaded to the RAM 903 from the HD 904. The sound-to-text conversion server 9 includes a storage unit 9000 implemented by the HD 904 illustrated in FIG. 5.

Functional Units of Sound-to-Text Conversion Server:

Next, functional units of the sound-to-text conversion server 9 are described in detail. In the following description of the functional units of the sound-to-text conversion server 9, a relationship between each functional unit of the sound-to-text conversion server 9 and one or more constituents illustrated in FIG. 5 is also be described.

The transmission/reception unit 91 of the sound-to-text conversion server 9 illustrated in FIG. 8B is implemented by instructions of the CPU 901 illustrated in FIG. 5 and by the network I/F 909 illustrated in FIG. 5. The transmission/reception unit 91 transmits or receives various kinds of data (or information) to or from another terminal, device, or system via the communication network 10.

The conversion unit 93 is implemented by instructions of the CPU 901 illustrated in FIG. 5. The conversion unit 93 converts sound data received by the transmission/reception unit 91 via the communication network 10, into text data.

The data processing unit 99 is implemented by instructions of the CPU 901 illustrated in FIG. 5 and by the HDD controller 905 illustrated in FIG. 5. The data processing unit 99 stores various kinds of data in the storage unit 9000 or reads various kinds of data stored in the storage unit 9000.

Any one of the IDs described above is an example of identification information. Examples of the organization ID include, but not limited to, a name of a company, a name of a business unit, a name of a department, and a name of a region. Examples of the user ID include, but not limited to, an employee number, a driver license number, and an individual number called "My Number" under the Japan's Social Security and Tax Number System.

Processes and Operations According to Embodiments:

The following describes one or more processes and operations to be performed by the sharing system 1, according to one or more embodiments.

Figure 16:
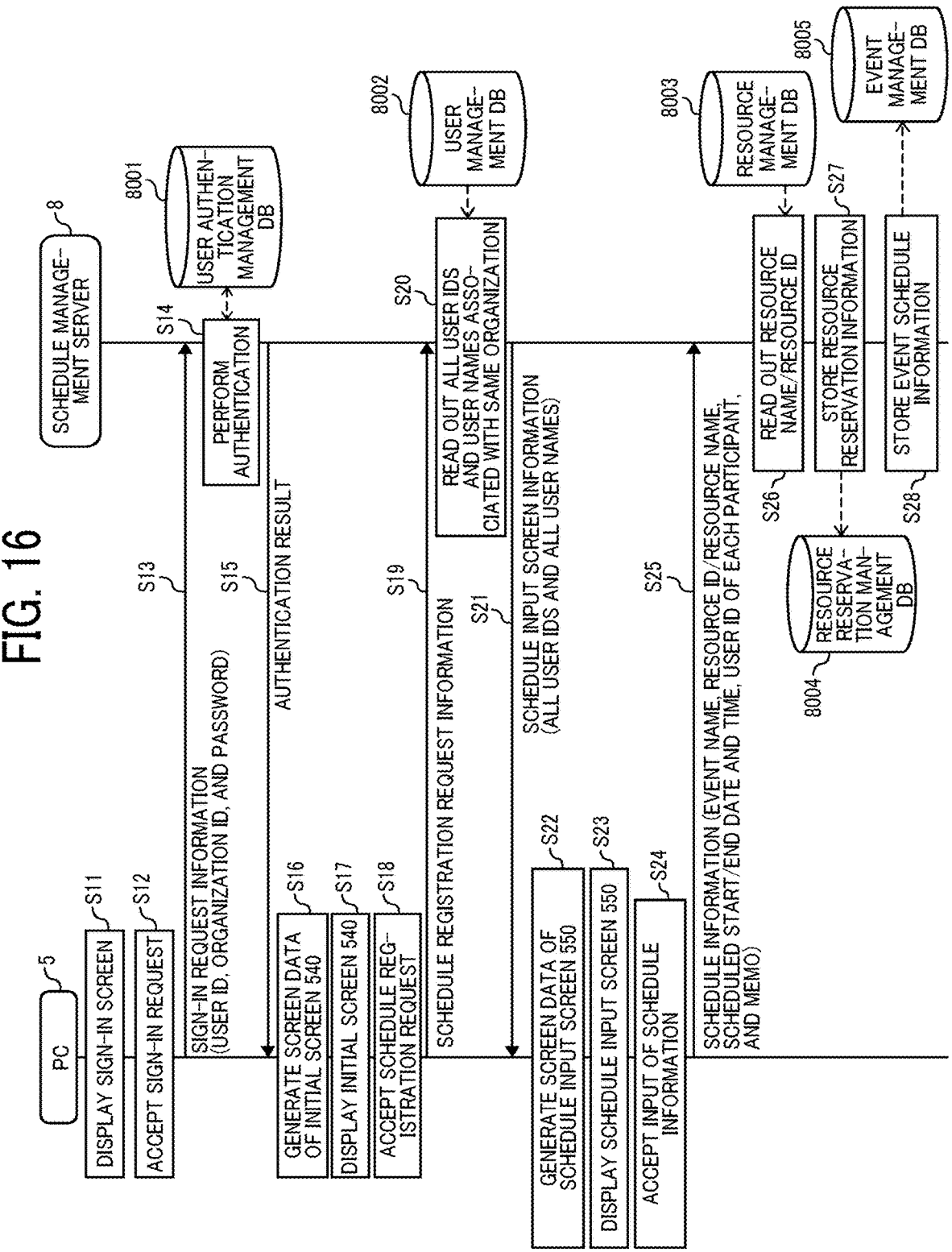
FIG. 16 is a sequence diagram illustrating a schedule registration process, according to an embodiment of the present disclosure.
Figure 17:
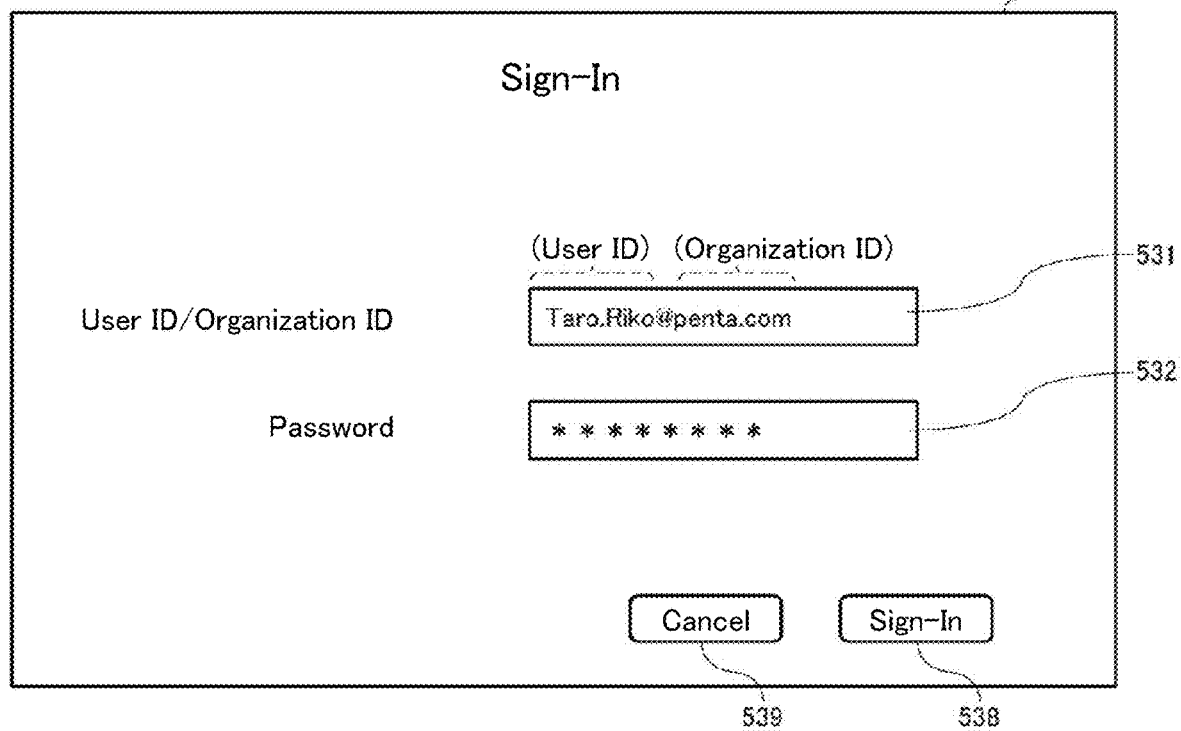
FIG. 17 is an illustration of an example of a sign-in screen.
Figure 18:
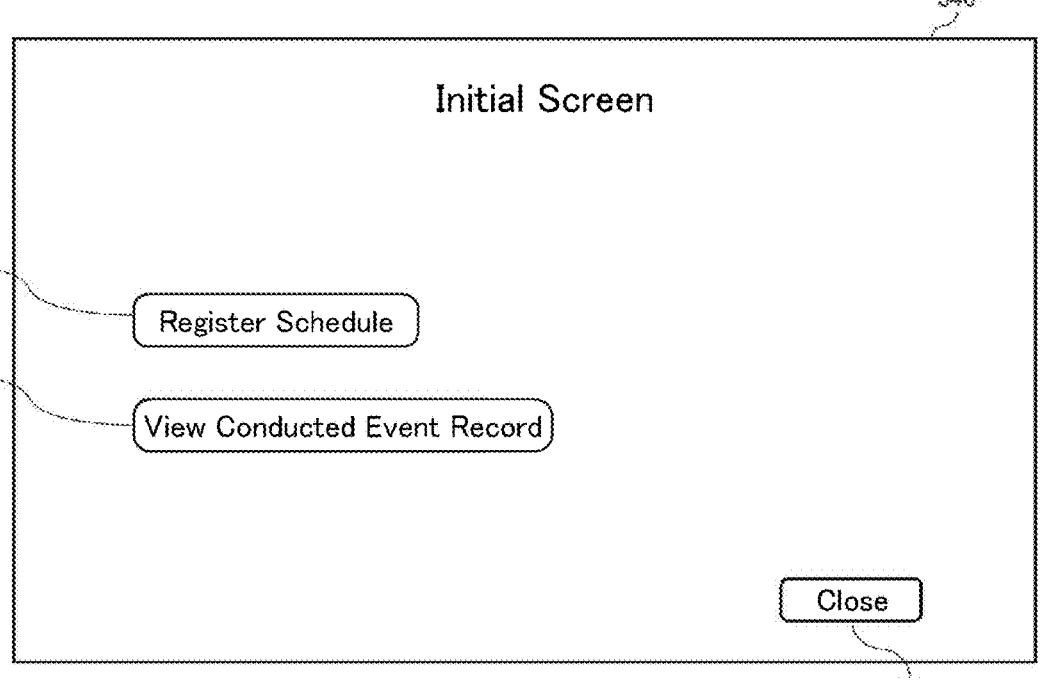
FIG. 18 is an example of an initial screen displayed by the PC, according to an embodiment of the present disclosure.
Figure 19:
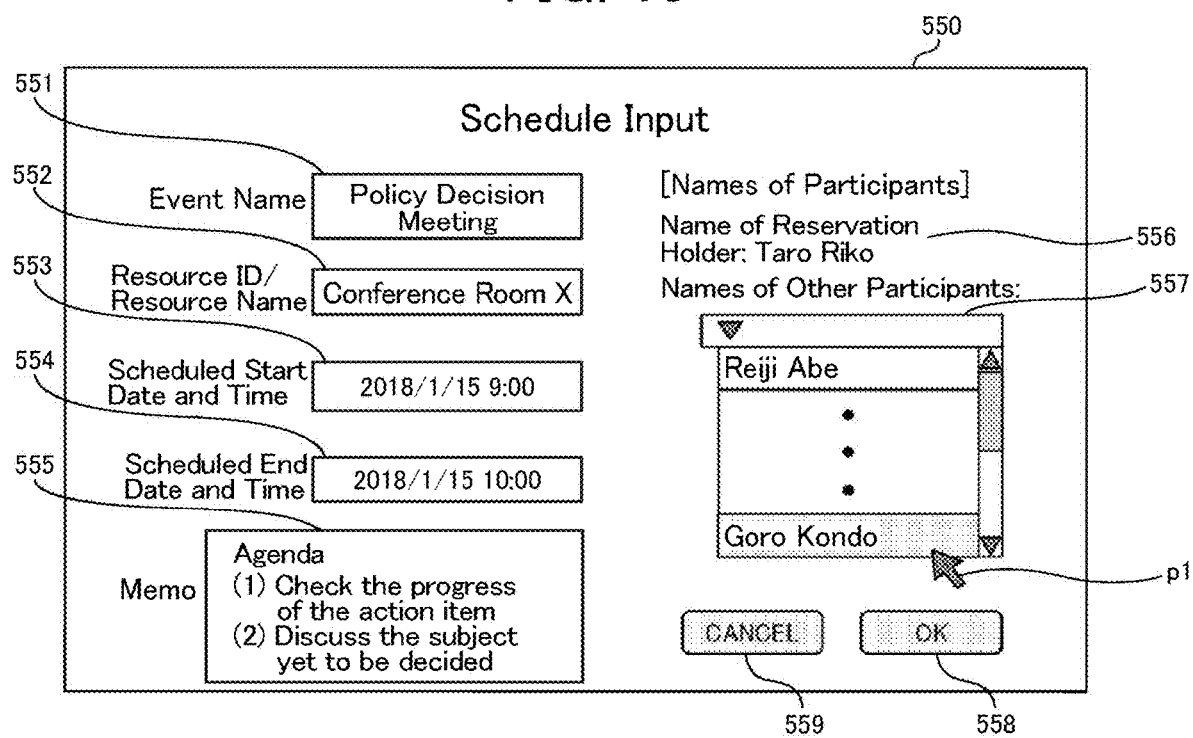
FIG. 19 is an illustration of an example of a schedule input screen, according to an embodiment of the present disclosure.

Schedule Registration Process:

Referring now to FIGS. 16 to 19, a process of registering a schedule of a user A (Taro Riko) to the schedule management server 8 using the PC 5 is described. FIG. 16 is a sequence diagram illustrating a schedule registration process. FIG. 17 is an illustration of an example of a sign-in screen. FIG. 18 is an example of an initial screen displayed by the PC 5. FIG. 19 is an illustration of an example of a schedule input screen.

In response to an operation on the keyboard 511 of the PC 5 by the user A, the display control unit 54 of the PC 5 controls the display 508 to display a sign-in screen 530 as illustrated in FIG. 17 (step S11). The sign-in screen 530 allows the user to sign into the schedule management server 8. The sign-in screen 530 includes an entry field 531 in which a user ID and an organization ID of a user are entered, an entry field 532 in which a password is entered, a sign-in button 538 to be pressed when the user starts sign-in processing, and a cancel button 539 to be pressed when the user cancels the sign-in processing. In this case, the user ID and the organization ID are included in an email address of the user A. Specifically, a user name of the email address represents the user ID, and a domain name of the email address represents the organization ID. In the entry field 531, the user ID and the organization ID are separately entered instead of the email address.

Through the sign-in screen 530, the user A enters the user ID and the organization ID in the entry field 531, enters the password in the entry field 532, and presses the sign-in button 538. In response to such a user operation, the accepting unit 52 accepts a sign-in request (step S12). The transmission/reception unit 51 of the PC 5 then transmits sign-in request information indicating the sign-in request to the schedule management server 8 (step S13). The sign-in request information includes pieces of information such as the user ID, the organization ID, and the password, which are accepted in step S12. Consequently, the transmission/reception unit 81 of the schedule management server 8 receives the sign-in request information.

The authentication unit 82 of the schedule management server 8 then performs authentication of the user A using the user ID, the organization ID, and the password (step S14). Specifically, the data processing unit 89 searches the user authentication management DB 8001 (see FIG. 11A) for a set of the user ID, the organization ID, and the password that matches the set of the user ID, the organization ID, and the password received in step S13. If the matching set of the user ID, the organization ID, and the password is found in the user authentication management DB 8001, the authentication unit 82 determines that the user A who has sent the sign-in request is an authorized user. If the matching set of the user ID, the organization ID, and the password is not found in the user authentication management DB 8001, the authentication unit 82 determines that the user A is an unauthorized (illegitimate) user. When the authentication unit 82 determines that the user A is an illegitimate user, the transmission/reception unit 81 transmits to the PC 5 a notification indicating that the user A is the illegitimate user. In the following, description is continued of the case where the user A is an authorized user.

The transmission/reception unit 81 transmits an authentication result to the PC 5 (step S15). Consequently, the transmission/reception unit 51 of the PC 5 receives the authentication result.

If the authentication result indicating successful authentication is received in step S15, the generation unit 56 of the PC 5 generates screen data of an initial screen 540 illustrated in FIG. 18 (step S16). The display control unit 54 of the PC 5 then controls the display 508 to display the initial screen 540 illustrated in FIG. 18 (step S17). In this example, the initial screen 540 includes a "Register Schedule" button 541 to be pressed when the user registers a schedule, and an "View Conducted Event Record" button 543 to be pressed when the user views a record of a conducted event. In response to the user pressing the "Register Schedule" button 541, the accepting unit 52 accepts a schedule registration request (step S18). The transmission/reception unit 51 then transmits the schedule registration request to the schedule management server 8 (step S19). Consequently, the transmission/reception unit 81 of the schedule management server 8 receives the schedule registration request.

Then, the data processing unit 89 of the schedule management server 8 searches the user management DB 8002 (see FIG. 11B), using the organization ID received in step S13 as a search key, to read out all user IDs and all user names that are associated with the received organization ID (step S20). The transmission/reception unit 81 then transmits schedule input screen information to the PC 5 (step S21). The schedule input screen information includes all the user IDs and all the user names read out in step S20. All the user names include the name of a reservation holder that is the user A who has entered various kinds of information for use in sign-in in step S12. Consequently, the transmission/reception unit 51 of the PC 5 receives the schedule input screen information.

The generation unit 56 of the PC 5 then generates screen data of the schedule input screen 550, using the schedule input screen information received in step S21 (step S22). The display control unit 54 of the PC 5 controls the display 508 to display the schedule input screen 550 illustrated in FIG. 19 (step S23).

The schedule input screen 550 includes an entry field 551 for an event name, an entry field 552 for a resource ID or a resource name, an entry field 553 for a scheduled start date and time of the event (the use of the resource), an entry field 554 for a scheduled end date and time of the event (the use of the resource), an entry field 555 for entering a memo such as an agenda, a display field 556 for displaying a name of a reservation holder (in this example, the user A) who is making a reservation, a selection menu 557 for selecting one or more participants other than the reservation holder by name, an "OK" button 558 to be pressed when registration of the reservation is requested, and a "CANCEL" button 559 to be pressed when content being entered or has been entered is cancelled. The name of the reservation holder is a name of the user who has entered various kinds of information using the PC 5 to request for sing-in processing in step S12. FIG. 19 also illustrates a mouse pointer p1.

The user may enter an email address of the resource in the entry field 552. The selection menu 557 may allow the reservation holder to select one or more resources by name. When a name of a particular resource is selected in the selection menu 557, the selected resource is added as one of the other participants in the event.

The user A enters corresponding pieces of information in the entry fields 551 to 555, selects the name of each user who is to participate in the event from the selection menu 557 by moving the pointer p1 with the mouse 512, and presses the "OK" button 558. In response to such a user operation, the accepting unit 52 of the PC 5 accepts input of schedule information (step S24). The transmission/reception unit 51 then transmits the schedule information to the schedule management server 8 (step S25). The schedule information includes an event name, a resource ID (or a resource name), a scheduled start date and time, a scheduled end date and time, a user ID of each participant, and information such as a memo. When a resource ID is entered in the entry field 552 of the schedule input screen 550, the entered resource ID is transmitted as part of the schedule information. When a resource name is entered in the entry field 552, the entered resource name is transmitted as part of the schedule information. The user name is selected from the selection menu 557 of the schedule input screen 550. Since the user IDs are received in step S21, the user ID corresponding to the selected user name is transmitted as part of the schedule information. Consequently, the transmission/reception unit 81 of the schedule management server 8 receives the schedule information.

Next, the data processing unit 89 of the schedule management server 8 searches the resource management DB 8003 (see FIG. 11C) using the resource ID (or resource name) received in step S25 as a search key, to read out the corresponding resource name (or resource ID) (step S26).

The data processing unit 89 then stores the reservation information in the resource reservation management DB 8004 (see FIG. 12A) (step S27). In this case, the data processing unit 89 adds one record of reservation information to the resource reservation management table in the resource reservation management DB 8004 managed by a scheduler previously registered. The reservation information is generated based on the schedule information received in step S25 and the resource name (or resource ID) read out in step S26. The scheduled use start date and time in the resource reservation management DB 8004 corresponds to the scheduled start date and time in the schedule information. The scheduled use end date and time in the resource reservation management DB 8004 corresponds to the scheduled end date and time in the schedule information.

The data processing unit 89 stores the schedule information in the event management DB 8005 (see FIG. 12B) (step S28). In this case, the data processing unit 89 adds one record of schedule information to the event management table in the event management DB 8005 managed by the scheduler that is previously registered. The schedule information is generated based on the schedule information received in step S25. The scheduled event start date and time in the event management DB 8005 corresponds to the scheduled start date and time in the schedule information. The scheduled event end date and time in the event management DB 8005 corresponds to the scheduled end date and time in the schedule information.

In a manner as described above, the user A registers his or her schedule to the schedule management server 8. The process of registering a schedule using the PC 5 is described with reference to FIGS. 16 to 19. In substantially the same manner, schedules may be registered using any other device such as the electronic whiteboard 2, the videoconference terminal 3, or the car navigation system 4.

Figure 20:
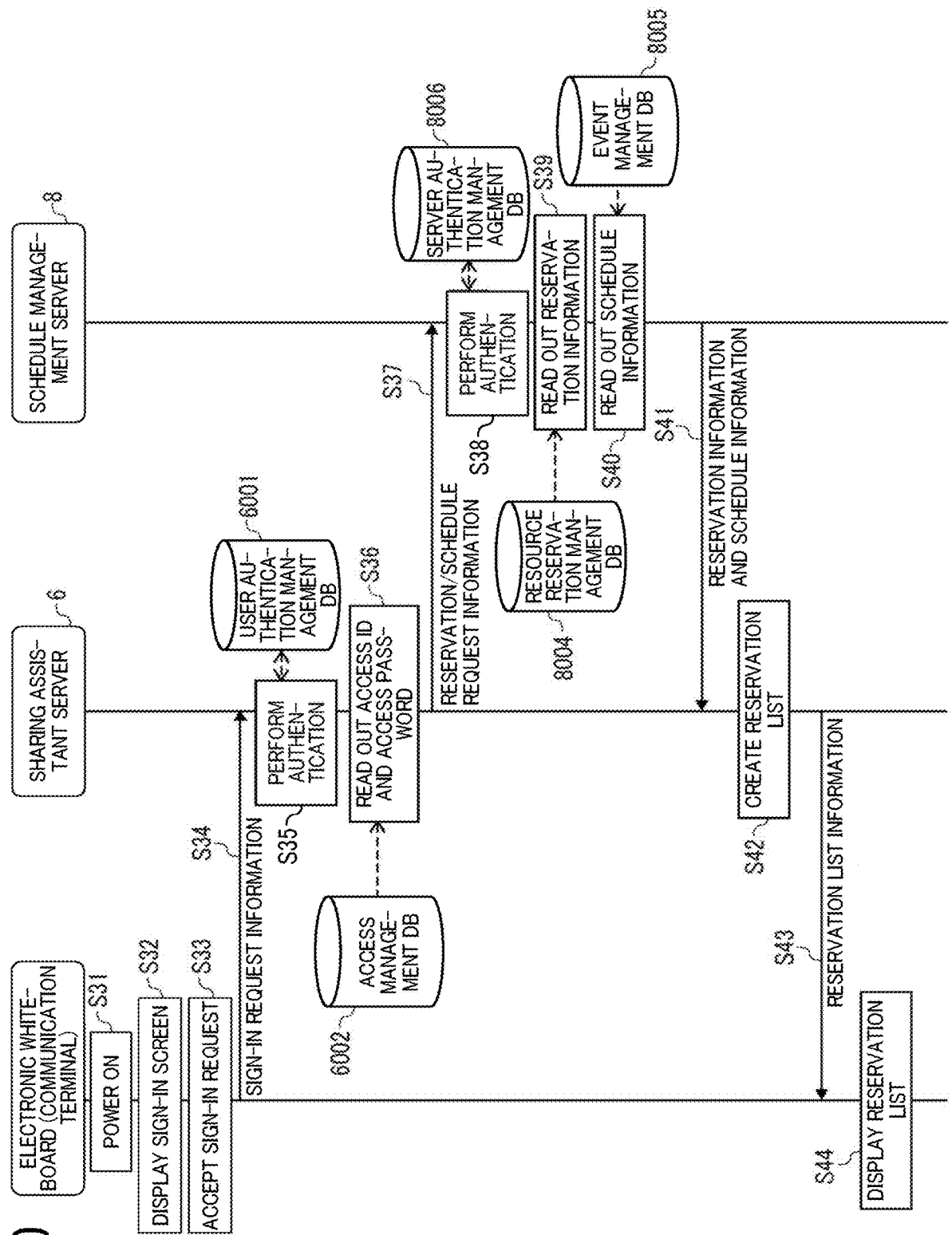
FIG. 20 is a sequence diagram illustrating an event starting process, according to an embodiment of the present disclosure.
Figure 21:
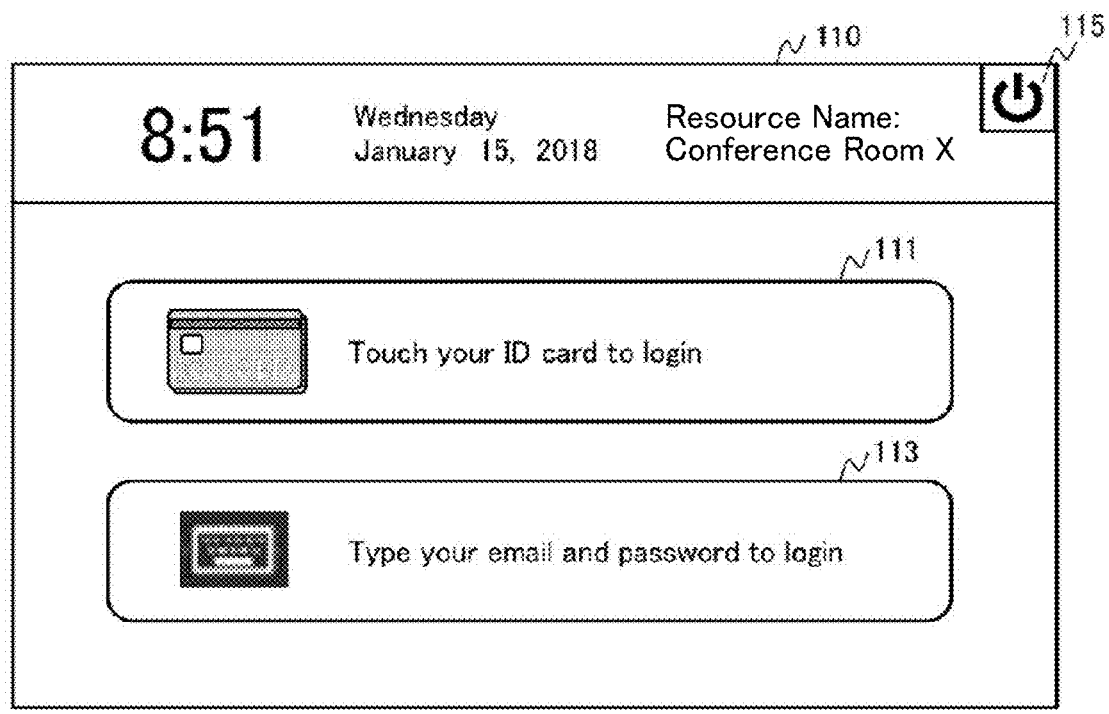
FIG. 21 is an illustration of an example of a sign-in screen displayed on the electronic whiteboard, according to an embodiment of the present disclosure.
Figure 23:
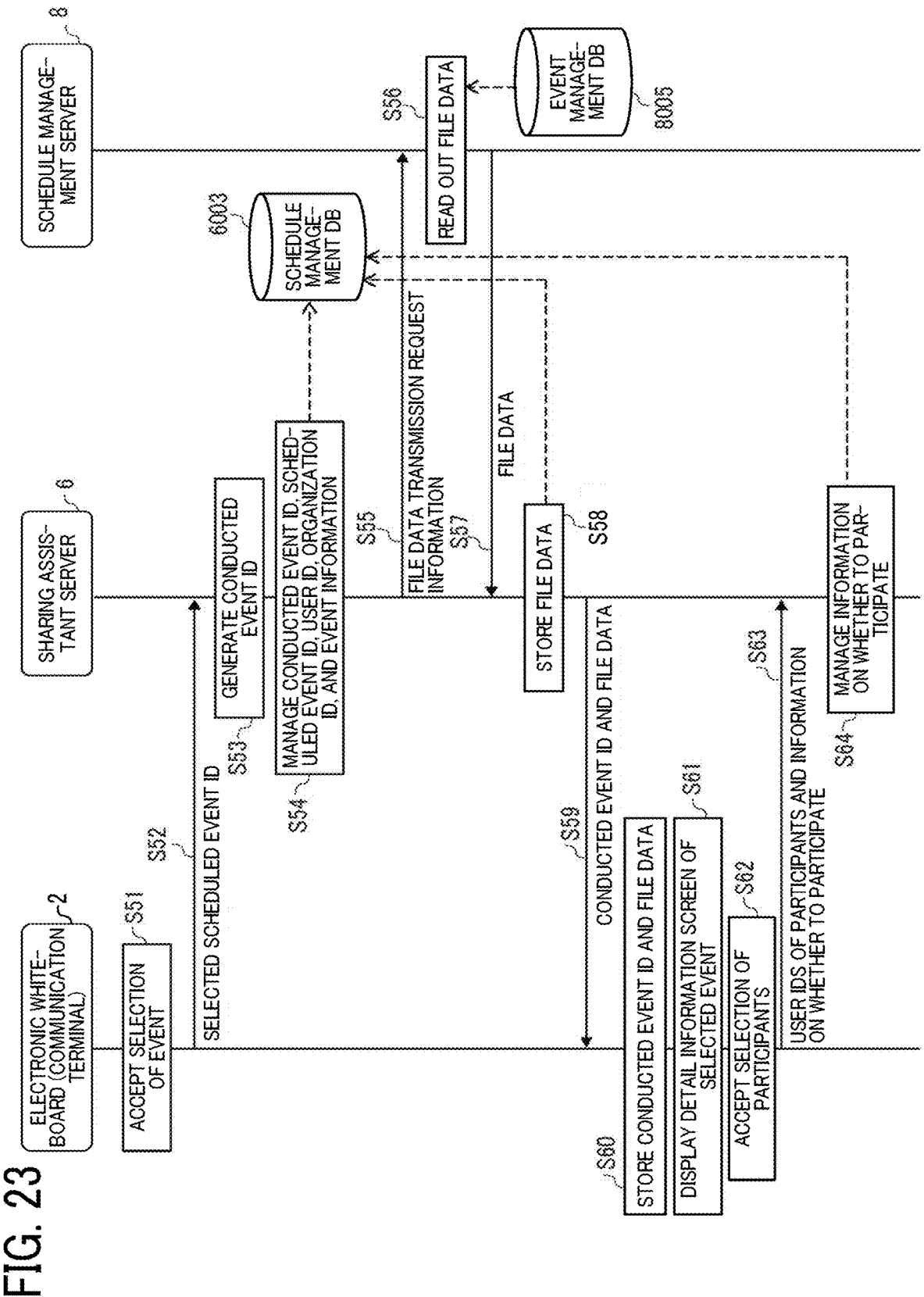
FIG. 23 is a sequence diagram illustrating the event starting process, according to an embodiment of the present disclosure.
Figure 24:
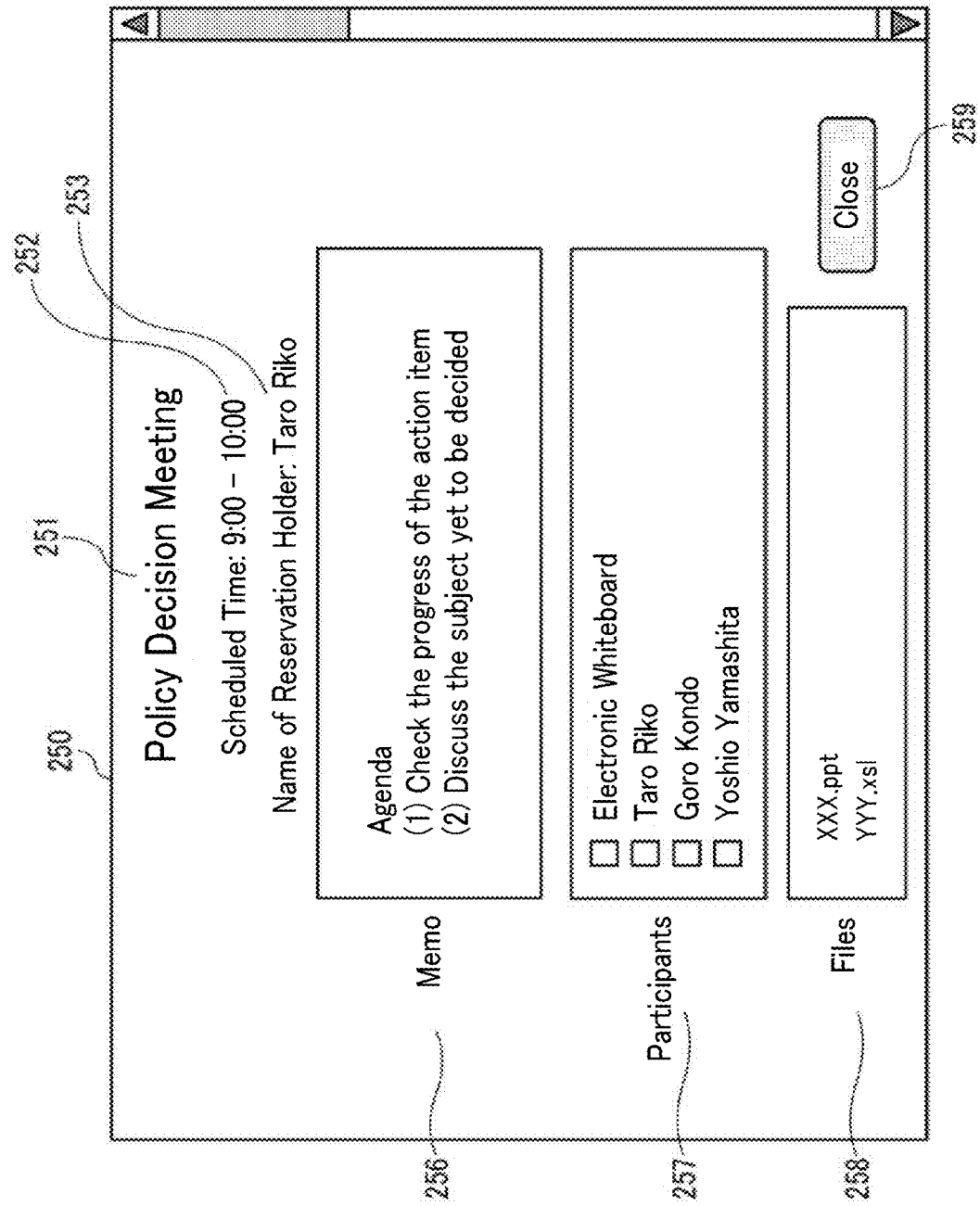
FIG. 24 is an illustration of an example of an event detail information screen, according to an embodiment of the present disclosure.
Figure 25:
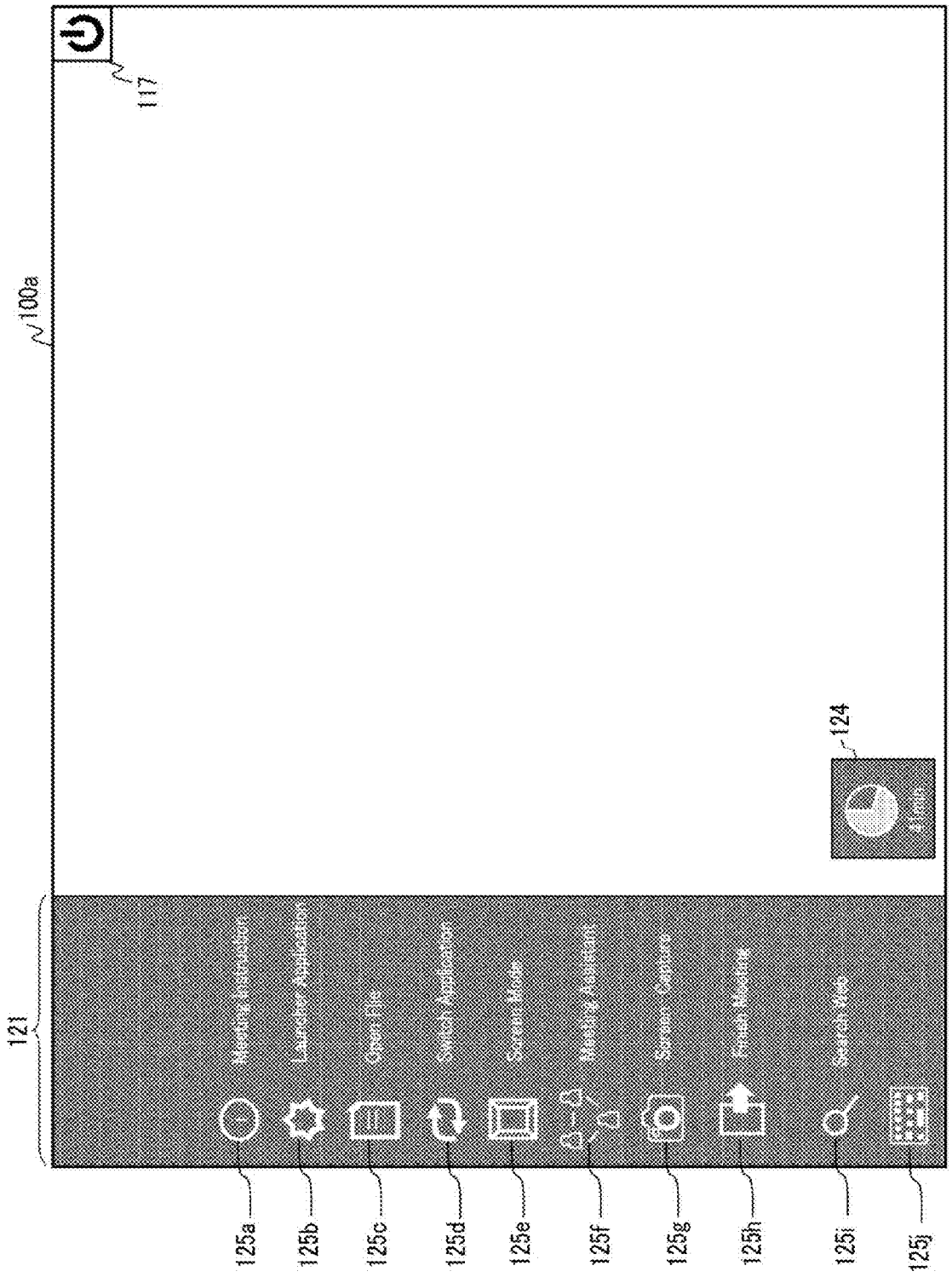
FIG. 25 is an illustration of an example of a screen displayed on the electronic whiteboard at the start of an event, according to an embodiment of the present disclosure.
Figure 26:
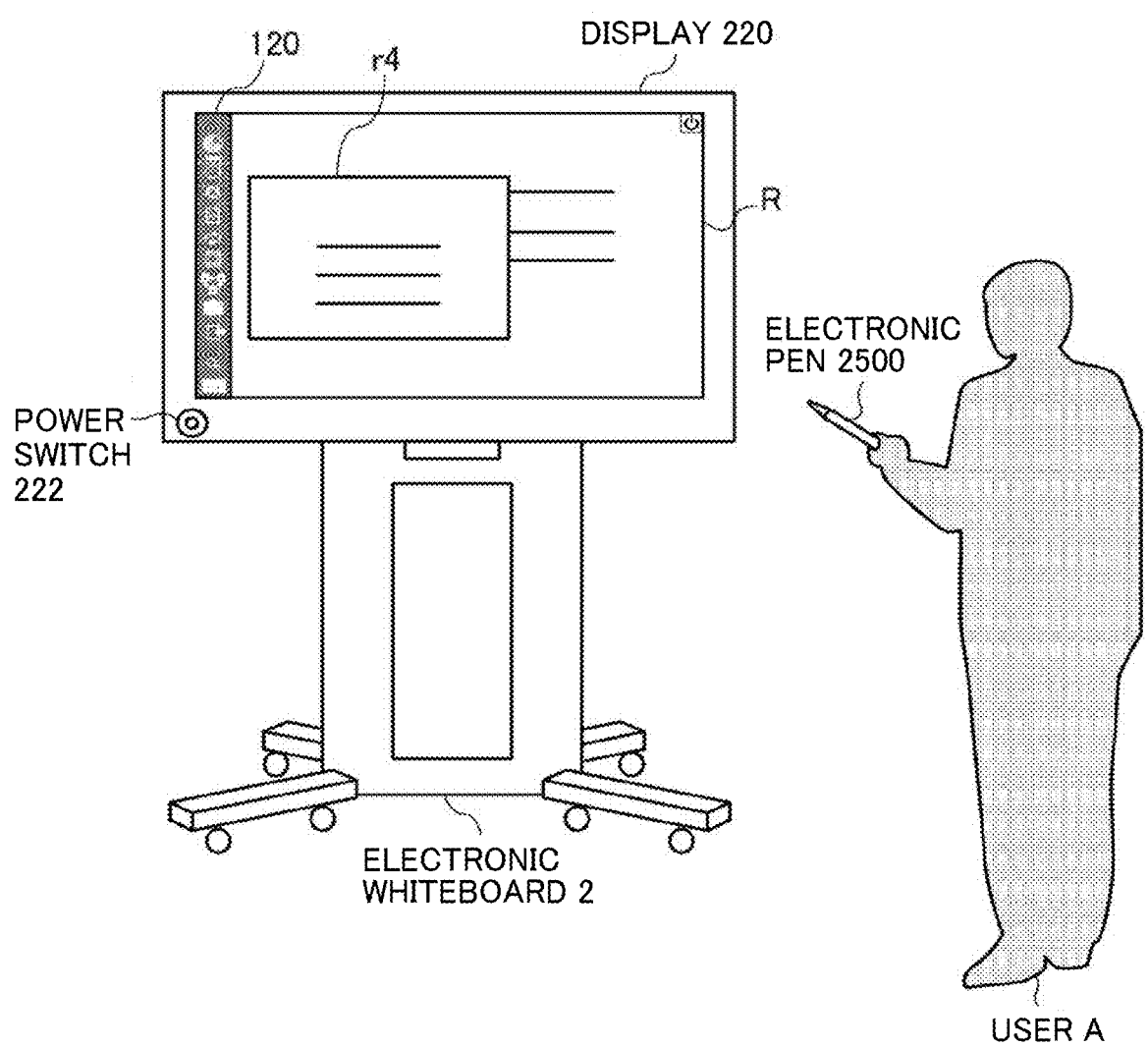
FIG. 26 is an illustration of a use scenario of the electronic whiteboard by the user.

Event Starting Process:

Referring now to FIGS. 20 to 26, a process of conducting a meeting with other participants using the electronic whiteboard 2, in the conference room X that has been reserved by the user A (Taro Riko), is described. FIGS. 20 and 23 are sequence diagrams illustrating a process of starting an event such as a meeting. FIG. 21 is an illustration of an example of a sign-in screen displayed on the electronic whiteboard 2. FIG. 22 is an illustration of an example of a resource reservation list screen. FIG. 24 is an illustration of an example of an event detail information screen. FIG. 25 is an illustration of an example of a screen displayed on the electronic whiteboard 2 after the sign-in. FIG. 26 is an illustration of a use scenario of the electronic whiteboard 2 by the user A.

In response to the user A pressing the power switch 222 of the electronic whiteboard 2, the accepting unit 22 of the electronic whiteboard 2 accepts a power-on operation from the user A (step S31). In response to the accepting unit 22 accepting the power-on request, the launcher 102 illustrated in FIG. 6 is started. The display control unit 24 of the electronic whiteboard 2 controls the display 220 to display a sign-in screen 110 for sign-in as illustrated in FIG. 21 (step S32). The sign-in screen 110 includes a selection icon 111, a selection icon 113, and a power icon 115. In this example, the selection icon 111 is pressed by the user A to request for sign-in using an IC card of the user A. The selection icon 113 is pressed by the user A to request for sign-in using an email address (including the user ID and the organization ID) and a password of the user A. The power icon 115 is pressed to power off the electronic whiteboard 2 without performing the sign-in operation.

The user A presses the selection icon 111 to perform communication with the short-range communication circuit 219 such as the IC card reader, or the user A presses the selection icon 113 to enter the email address and the password of the user A. In response to such an operation, the accepting unit 22 accepts a sign-in request (step S33). The transmission/reception unit 21 then transmits sign-in request information indicating the sign-in request to the sharing assistant server 6 (step S34). The sign-in request information includes the information (such as the user ID, the organization ID, and the password) accepted in step S33, information on a time zone of a country or a region where the electronic whiteboard 2 is located, and a set of the user ID, the organization ID, and the password of the communication terminal (the electronic whiteboard 2 in this example). Consequently, the transmission/reception unit 61 of the sharing assistant server 6 receives the sign-in request information.

Then, the authentication unit 62 of the sharing assistant server 6 performs authentication of the user A using the user ID, the organization ID, and the password of the user A which are received in step S34 (step S35). Specifically, the data processing unit 69 searches the user authentication management DB 6001 (see FIG. 9A) using the set of the user ID, the organization ID, and the password of the user A received in step S34 as a search key for a set of the user ID, the organization ID, and the password that matches the received set of the user ID, the organization ID, and the password if the matching set of the user ID, the organization ID, and the password is found, the authentication unit 62 determines that the user A who has made the sign-in request is an authorized user. If no such a set is found, the authentication unit 62 determines that the user A who has made the sign-in request is an unauthorized (illegitimate) user. When the authentication unit 62 determines that the user A is illegitimate, the transmission/reception unit 61 transmits to the electronic whiteboard 2 a notification indicating the illegitimate user. In the following, description is continued of the case where the user A is an authorized user.

Then, the data processing unit 69 of the sharing assistant server 6 searches the access management DB 6002 (see FIG. 9B) using the organization ID of the user A received in step S34 as a search key, to read out the access ID and the access password associated with the received organization ID (step S36).

The transmission/reception unit 61 then transmits, to the schedule management server 8, reservation request information indicating a request for reservation information of the resource, and schedule request information indicating a request for schedule information of the user (step S37). The reservation request information and the schedule request information each include the time zone information, and the user ID and the organization ID of the communication terminal that are received in step S34, and the access ID and the password that are read out in step S36. Consequently, the transmission/reception unit 81 of the schedule management server 8 receives the reservation request information and the schedule request information.

Then, the authentication unit 82 of the schedule management server 8 performs authentication of the sharing assistant server 6 using the access ID and the access password (step S38). Specifically, the data processing unit 89 searches the server authentication management DB 8006 (see FIG. 13A) using a set of the access ID and the password that are received in step S37 as a search key, for a set of the access ID and the access password that matches the received set of the access ID and the access password. If the matching set is found, the authentication unit 82 determines that the sharing assistant server 6 that has made the request is an authorized accessing entity. If no such a set is found, the authentication unit 82 determines that the sharing assistant server 6 that has made the request is an unauthorized (illegitimate) accessing entity. If the authentication unit 82 determines that the sharing assistant server 6 is illegitimate, the transmission/reception unit 81 transmits, to the sharing assistant server 6, a notification indicating the illegitimate accessing entity. In the following, description is continued of the case where the sharing assistant server 6 is an authorized accessing entity.

The data processing unit 89 of the schedule management server 8 searches the resource reservation management DB 8004 (see FIG. 12A) managed by the corresponding scheduler, using the user ID of the communication terminal received in step S37 as a search key, to read out the corresponding reservation information (step S39). In this case, the data processing unit 89 reads the reservation information including the scheduled use start date and time indicating the today's date.

Further, the data processing unit 89 searches the event management DB 8005 (see FIG. 12B) managed by the corresponding scheduler, using the user ID of the communication terminal (the electronic whiteboard 2 in this case) received in step S37 as a search key, to read out the corresponding schedule information (step S40). In this case, the data processing unit 89 reads the schedule information whose scheduled start date and time of the event is today. When the schedule management server 8 is located in a country or region having a time zone that differs from the time zone applied to the communication terminal such as the electronic whiteboard 2, the time zone is adjusted based on the time zone information to match the time zone of the country or region in which the communication terminal is provided.

The transmission/reception unit 81 then transmits the reservation information read out in step S39 and the schedule information read out in step S40, to the sharing assistant server 6 (step S41). Consequently, the transmission/reception unit 61 of the sharing assistant server 6 receives the reservation information and the schedule information.

Then, the creation unit 63 of the sharing assistant server 6 creates a reservation list based on the reservation information and the schedule information received in step S41 (step S42). The transmission/reception unit 61 transmits reservation list information representing the content of the reservation list to the electronic whiteboard 2 (step S43). Consequently, the transmission/reception unit 21 of the electronic whiteboard 2 receives the reservation list information.

Then, the display control unit 24 of the electronic whiteboard 2 controls the display 220 to display the reservation list screen 230 illustrated in FIG. 22 (step S44). The reservation list screen 230 includes a display area 231 for displaying a resource name (a name of a place in this example) and a display area 232 for displaying the current (today's) date and time. The reservation list screen 230 further includes pieces of event information 235, 236, 237, and so on each indicating an event in which the target resource (the conference room X in this example) is used. Each piece of event information includes a scheduled use start time and a scheduled use end time of the target resource in an event, an event name, and a name of a user who has reserved the target resource (a name of a reservation holder). Along with the pieces of event information 235, 236, and 237, respective start buttons 235s, 236s, and 237s are displayed, each of which is pressed when the user designates an event to be started.

Referring next to FIG. 23, in response to the user A pressing the start button 235s with the electronic pen 2500, for example, the accepting unit 22 accepts selection of the event indicated by the event information 235 (step S51). The transmission/reception unit 21 of the electronic whiteboard 2 then transmits, to the sharing assistant server 6, the scheduled event ID indicating the scheduled event selected in step S51 (step S52). Processing of step S52 corresponds to processing of requesting transmission of conducted event identification information. Consequently, the transmission/reception unit 61 of the sharing assistant server 6 receives the selected scheduled event ID.

Then, the generation unit 64 of the sharing assistant server 6 generates a unique conducted event ID (step S53). Then, the data processing unit 69 stores the conducted event ID generated in step S53, the scheduled event ID received in step S52, the user ID and the organization ID of the reservation holder, and the event information in association with one another (step S54). The user ID and the organization ID of the reservation holder and the event information are IDs and information based on the reservation information and the schedule information that are received in step S41. At this point, there is no entry in the "participate" field of the schedule management table (see FIG. 9C).

The transmission/reception unit 61 of the sharing assistant server 6 then transmits, to the schedule management server 8, file data transmission request information indicating a request for transmitting file data that has been registered in the schedule management server 8 (step S55). The file data transmission request information includes the scheduled event ID received in step S52, the user ID and the organization ID of the communication terminal that are received in step S34, and the access ID and the access password that are read out in step S36. Consequently, the transmission/reception unit 81 of the schedule management server 8 receives the file data transmission request information.

Then, the data processing unit 89 of the schedule management server 8 searches the event management DB 8005 (see FIG. 12B), using the scheduled event ID received in step S55 as a search key, to read out file data associated with the scheduled event ID (step S56). The transmission/reception unit 81 then transmits the file data read out in step S56 to the sharing assistant server 6 (step S57). Consequently, the transmission/reception unit 61 of the sharing assistant server 6 receives the file data.

Then, the data processing unit 69 of the sharing assistant server 6 stores for management the file data received in step S57 in the schedule management DB 6003 (see FIG. 9C) in association with the scheduled event ID received in step S52 and the conducted event ID generated in step S53 (step S58).

The transmission/reception unit 61 transmits the conducted event ID generated in step S53 and the file data received in step S57, to the electronic whiteboard 2 (step S59). Consequently, the transmission/reception unit 21 of the electronic whiteboard 2 receives the conducted event ID and the file data.

Then, the data processing unit 29 of the electronic whiteboard 2 stores the conducted event ID and the file data in the storage unit 2000 (step S60). The file data transmitted from the sharing assistant server 6 is stored in a specific storage area of the storage unit 2000. The display control unit 24 of the electronic whiteboard 2 accesses the specific storage area to read the data file, and controls the display 220 to display an image based on the data file stored in the specific storage area during the event identified by the conducted event ID. The specific storage area is a temporary storage area of data provided for each event being conducted. The specific storage area may be described using an arbitrary path (character string) indicating a location in the storage unit 2000. The specific storage area is not limited to an area provided in an internal memory of the electronic whiteboard 2. The specific storage area may be in an external storage device connectable to the electronic whiteboard 2 or may be in a server such as a local server that is in an on-premises environment and that is communicable with the electronic whiteboard 2.

Then, the display control unit 24 controls the display 220 to display an event detail information screen 250 for the selected event as illustrated in FIG. 24 (step S61). The event detail information screen 250 includes a display area 251 for an event name, a display area 252 for a scheduled event time period (scheduled start time and scheduled end time), and a display area 253 for a reservation holder name. The event detail information screen 250 further includes a display area 256 for a memo, a display area 257 for names of scheduled participants, and a display area 258 for displaying identification information (for example, a file name) for identifying file data stored in the specific storage area of the storage unit 2000. The display area 257 displays the name of the reservation holder and the names of other participants selected through the screen of FIG. 19. The display area 257 also displays, for the name of each scheduled participant, a checkbox for use in checking a person who is actually participating in the event (meeting). The display area 258 displays a name of file data stored in the specific storage area of the storage unit 2000, that is, the name of the file data downloaded from the sharing assistant server 6. The display area 258 also displays a name of file data that is being downloaded from the sharing assistant server 6. The event detail information screen 250 further includes a "Close" button 259 to be pressed to close the event detail information screen 250, at a lower right portion thereof.

The user checks the checkboxes for the users who are actually participating in the event among the scheduled participants and presses the "Close" button 259. In this response to this action, the accepting unit 22 accepts selection of the participants (step S62). The transmission/reception unit 21 then transmits, to the sharing assistant server 6, the user ID of each scheduled participant and information on whether the scheduled participant is actually participating (step S63). Consequently, the transmission/reception unit 61 of the sharing assistant server 6 receives the user ID of each scheduled participant and the information on whether the scheduled participant is actually participating.

The data processing unit 69 of the sharing assistant server 6 stores the information on whether each scheduled participant is actually participating in the "participate" field, in which no information has been entered, of the schedule management table (see FIG. 9C) in the schedule management DB 6003 (step S64).

In a manner described above, the user A starts an event (a policy deciding meeting) using the resource (the conference room X in this example) and the communication terminal (the electronic whiteboard 2 in this example). In response to the start of the event, the display control unit 24 of the electronic whiteboard 2 controls the display 220 to display a display screen 100a illustrated in FIG. 25. FIG. 25 is an illustration of an example of a screen displayed on the electronic whiteboard 2 at the start of an event. The display screen 100a illustrated in FIG. 25 includes a menu bar 121, time information 124 indicating the elapsed time since the start of the event and the remaining time up to the end of the event, and a power icon 117 to be pressed when the electronic whiteboard 2 is powered off. The menu bar 121 is an example of an operation/display screen (window) for the launcher 102. The menu bar 121 includes a plurality of operation icons 125 (125a to 125j) to be selected (pressed) to perform various kinds of processing during the event. The operation icon 125a is selected (pressed) to view detailed information of the event being conducted. The operation icon 125b is selected (pressed) to start the various external applications 103. The operation icon 125c is selected (pressed) to view file data stored in the specific storage area of the storage unit 2000. The operation icon 125d is selected (pressed) to switch the application display screen of the external application 103 that is running. The operation icon 125e is selected (pressed) to change a screen size of the application display screen of the external application 103. The operation icon 125f is selected (pressed) to perform various operations relating to the event being conducted. The operation icon 125g is selected (pressed) to capture the display screen 100a displayed on the display 220. The operation icon 125h is selected (pressed) to end the event being conducted. The operation icon 125i is selected (pressed) to start the browser application 103c for performing a browser search. The operation icon 125j is selected (pressed) to enter text, numerals, and so on.

The various icons included in the display screen 100a displayed on the electronic whiteboard 2 is an example of "accepting areas". The accepting areas may be not only images such as icons or buttons but also characters (letters) such as "change", or combinations of the image and the characters. The images may be not only symbols or figures, but also any images that can be visually recognized by a user such as illustrations or patterns. In addition, selecting (pressing) of the various icons is an example of operations performed on the various icons. Examples of the operations performed on the various icons include an input operation performed on the display 220 with the electronic pen 2500, a double clicking or single clicking operation with a mouse, which is an example of the input device of the PC 2700, and an input operation using a keyboard, which is an example of the input device of the PC 2700.

In this manner, as illustrated in FIG. 26, the user A can have a meeting using the electronic whiteboard 2 in the conference room X. The display control unit 24 of the electronic whiteboard 2 controls the display 220 to display an event screen R including a menu bar 120 and file data r4 of a material file. The menu bar 120 is a reduced size image of the menu bar 121 included in the display screen 100a. For example, the user A of the electronic whiteboard 2 presses the operation icon 125c. In response to this action, the accepting unit 22 receives selection of the operation icon 125c. The display control unit 24 then controls the display 220 to display the file data r4 of the material file stored in the specific storage area of the storage unit 2000. The display control unit 24 of the electronic whiteboard 2 may control the display 220 to display not only the file data received in step S59 but also file data stored in the storage unit 2000 in advance or new file data generated during the event that has been started. In this case, the data processing unit 29 of the electronic whiteboard 2 stores the file data generated or updated during the event that has been started, in the specific storage area of the storage unit 2000.

Figure 27:
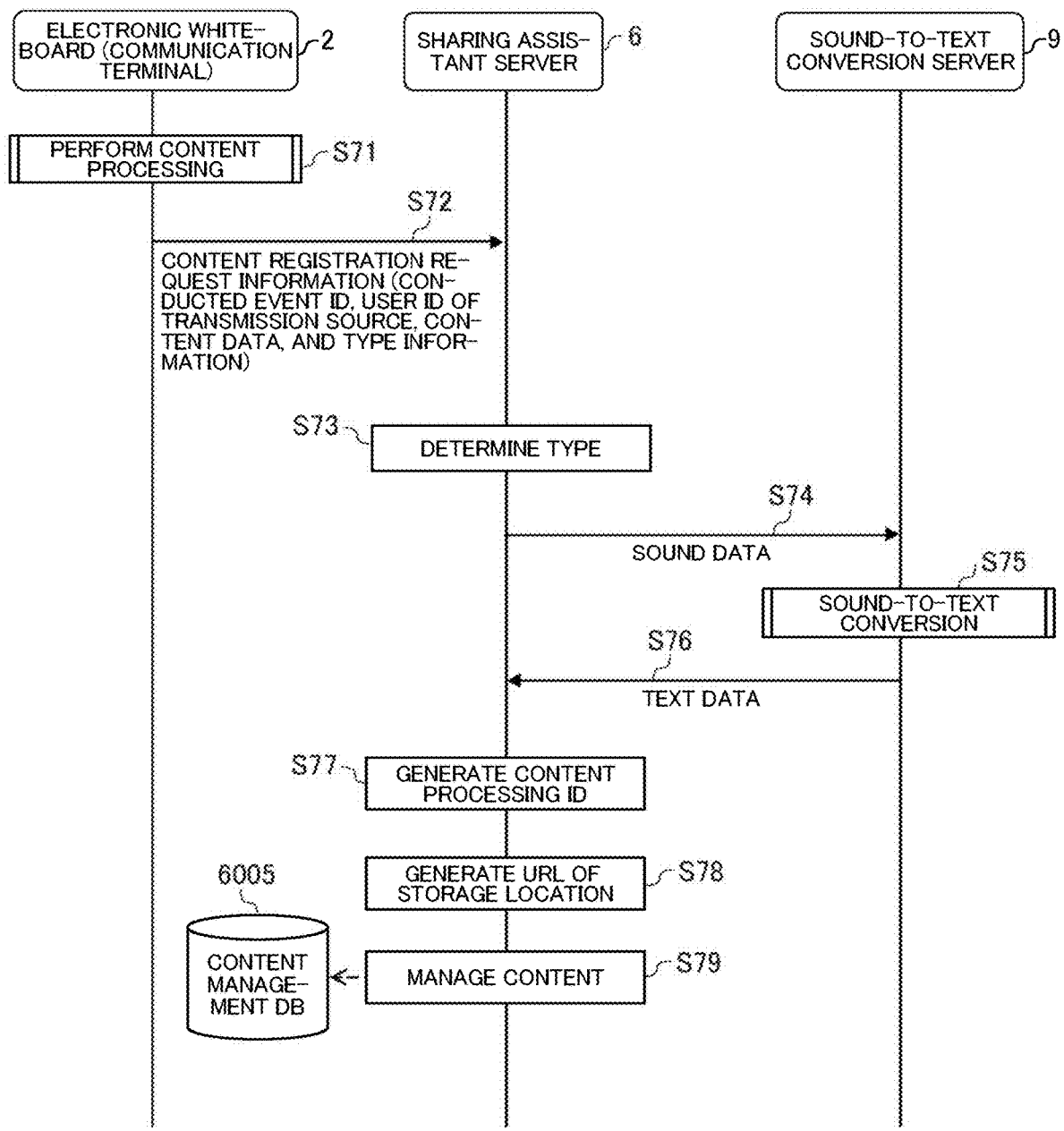
FIG. 27 is a sequence diagram illustrating a conducted event record registration process, according to an embodiment of the present disclosure.
Figure 28:
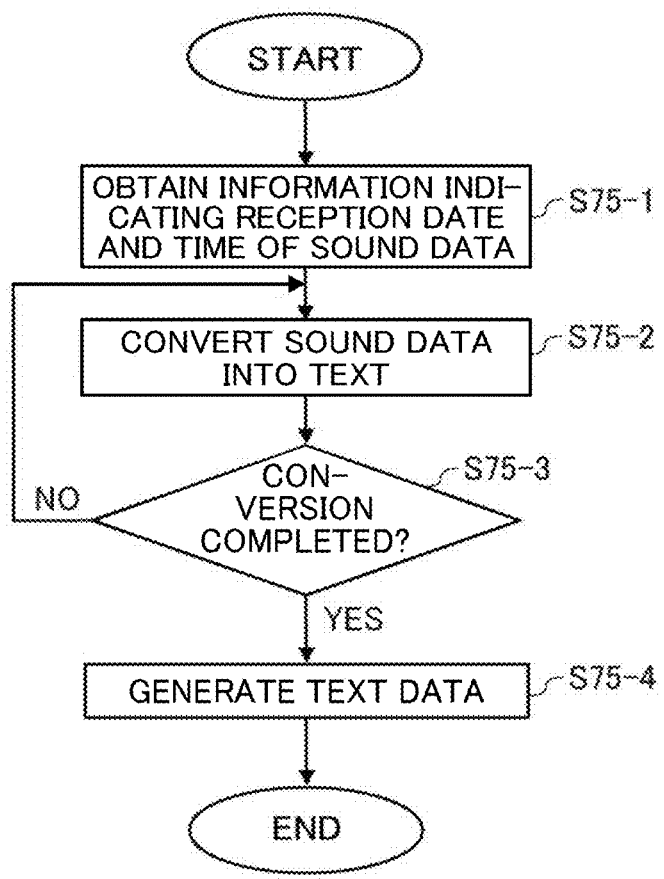
FIG. 28 is a flowchart illustrating a sound-to-text conversion process, according to an embodiment of the present disclosure.
Figure 29:
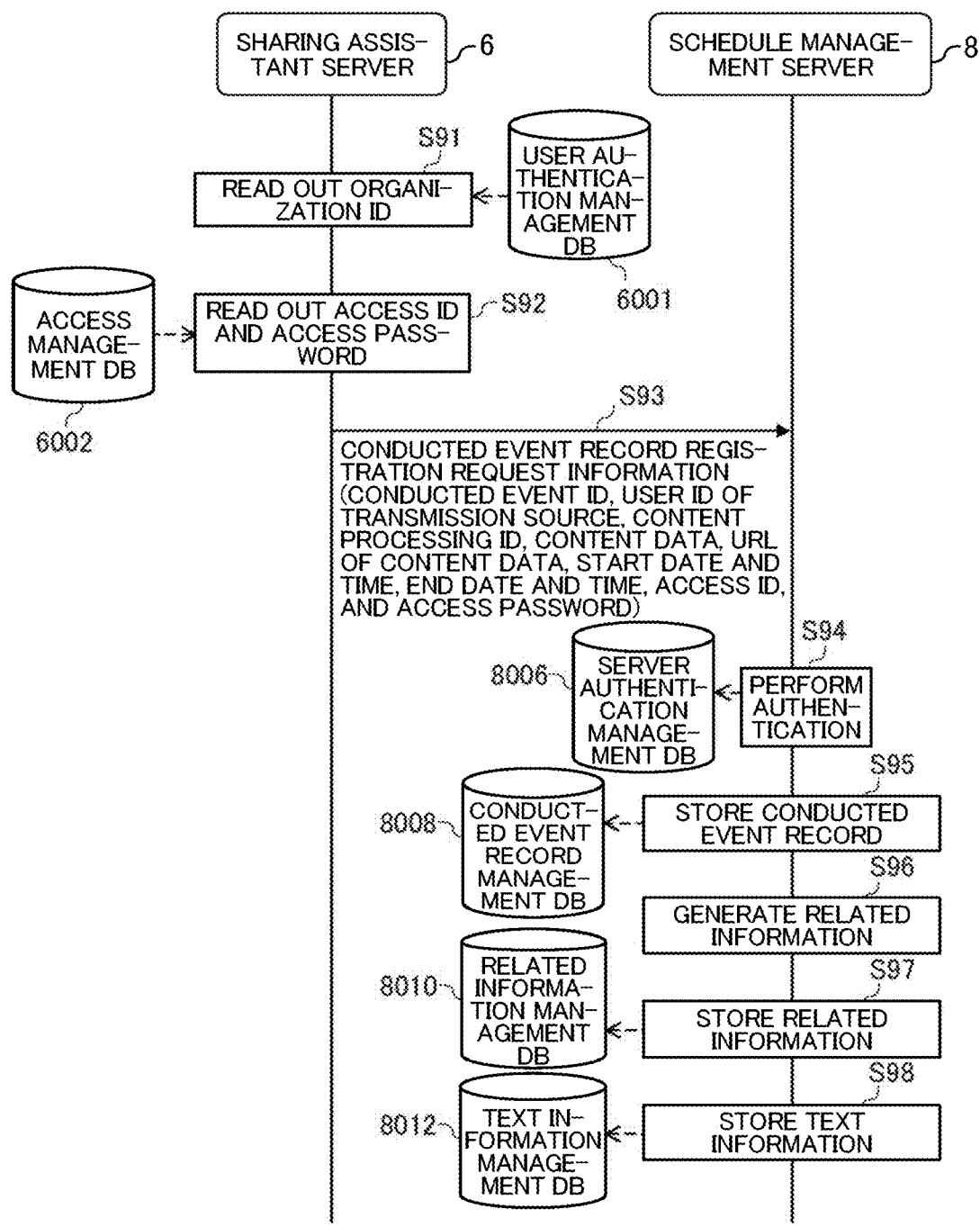
FIG. 29 is a sequence diagram illustrating the conducted event record registration process, according to an embodiment of the present disclosure.

Conducted Event Record Registration Process:

Referring next to FIGS. 27 to 29, a process of registering a conducted event record is described. FIGS. 27 and 29 are sequence diagrams illustrating the conducted event record registration process. FIG. 28 is a flowchart illustrating a sound-to-text conversion process.

The determining unit 25 of the electronic whiteboard 2 first detects the type of content processing performed during the event that has been started (step S71). Specifically, when the content is sound data generated through recording by the image/audio processing unit 23, the determining unit 25 determines that the type of content processing is "recording". When the content is image data obtained through screenshotting (capturing) by the image/audio processing unit 23, the determining unit 25 determines that the type of content processing is "screenshotting". When the content is material file data (such as data of meeting materials) transmitted by the transmission/reception unit 21, the determining unit 25 determines that the type of content processing is "transmission of material".

The transmission/reception unit 21 then transmits content registration request information indicating a request for registering the generated content, to the sharing assistant server 6 (step S72). In this case, the transmission/reception unit 21 automatically transmits the content registration request information each time content is generated. The content registration request information includes the conducted event ID, the user ID of a transmission source of the content, the content data, and the type of content processing (type information). Consequently, the transmission/reception unit 61 of the sharing assistant server 6 receives the content registration request information.

The determining unit 65 of the sharing assistant server 6 determines the type of content processing, based on the type information included in the content registration request information received by the transmission/reception unit 61 (step S73). When the determining unit 65 determines that the type of content processing is "recording", the transmission/reception unit 61 of the sharing assistant server 6 transmits the sound data, which is the content data, to the sound-to-text conversion server 9 (step S74). Consequently, the transmission/reception unit 91 of the sound-to-text conversion server 9 receives the sound data. When the type of content processing is other than "recording", the sharing assistant server 6 skips the processing of steps S74 to S76, and the process proceeds to step S77.

The conversion unit 93 of the sound-to-text conversion server 9 converts the sound data received by the transmission/reception unit 91 into text data (step S75). Referring now to FIG. 28, a sound-to-text conversion process performed by the sound-to-text conversion server 9 is described. The conversion unit 93 first obtains information indicating the date and time at which the sound data has been received by the transmission/reception unit 91 (step S75-1). The information obtained in step S75-1 may indicate the date and time when the sharing assistant server 6 has received the sound data in step S72, or the date and time when the sharing assistant server 6 has transmitted the sound data in step S74. In this case, the transmission/reception unit 91 of the sound-to-text conversion server 9 receives the sound data and information on the date and time that are transmitted from the sharing assistant server 6 in step S74.

Then, the conversion unit 93 converts the sound data received by the transmission/reception unit 91 into text (step S75-2). If the conversion of the sound data into text performed by the conversion unit 93 is completed ("YES" in step S75-3), the process proceeds to step S75-4. The conversion unit 93 repeats the processing of step S75-2 until the conversion of the sound data into text is completed. In step S75-3, the conversion unit 93 determines that the conversion of the sound data into text is completed if a predetermined size of sound data received by the transmission/reception unit 91 has been converted into text. For example, if sound data for one sentence has been converted to text, the conversion unit 93 determines that the conversion of sound data into text is completed. The conversion unit 93 then generates text data resulting from sound-to-text conversion (step S75-4). In this manner, the sound-to-text conversion server 9 converts the sound data transmitted from the sharing assistant server 6 into text data. The sound-to-text conversion server 9 repeatedly performs the process illustrated in FIG. 28 since the sound-to-text conversion server 9 receives sound data transmitted from the sharing assistant server 6 at any time.

Referring back to FIG. 27, description of the conducted event record registration process is continued. The transmission/reception unit 91 transmits the text data resulting from the conversion performed by the conversion unit 93, to the sharing assistant server 6 (step S76). The transmission/reception unit 91 transmits, along with the text data, information indicating the date and time obtained in step S75-1, to the sharing assistant server 6.

The generation unit 64 then generates a unique content processing ID for identifying the content processing that has occurred in relation to the event (step S77). The generation unit 64 also generates a URL of the content data representing the content (step S78). The data processing unit 69 stores for management, for each conducted event ID received in step S72, the type of content processing, the start date and time of the content processing, the end date and time of the content processing, the content processing ID generated in step S77, and the URL indicating the storage location of the content and generated in step S78 in the content management DB 6005 (see FIG. 10) in association with one another (step S79).

When the type of content processing is "sound-to-text conversion", the start date and time and the end date and time of the content processing correspond to the date and time when conversion of sound data into text data is started and the date and time when the conversion of the sound data into the text data is finished, respectively. In this example, the date and time when conversion of sound data into text data is started and the date and time when the conversion of the sound data into the text data is finished correspond to the date and time when sound data is transmitted by the transmission/reception unit 61 of the sharing assistant server 6 and the date and time when text data is received by the transmission/reception unit 61 of the sharing assistant server 6, respectively. In another example, the date and time when conversion of sound data into text data is started and the date and time when the conversion of the sound data into the text data is finished may correspond to the date and time when sound data is received by the transmission/reception unit 91 of the sound-to-text conversion server 9 and the date and time when text data is transmitted by the transmission/reception unit 91 of the sound-to-text conversion server 9, respectively. Alternatively, when the type of content processing is "sound-to-text conversion", the start date and time of content processing and the end date and time of content processing may be the same as the start date and time and the end date and time of content processing relating to sound data which is to be converted into text, respectively.

When the type of content processing is "recording", "screenshotting", or "transmission of material", the start date and time of content processing and the end date and time of content processing may be set based on the date and time when the transmission/reception unit 61 of the sharing assistant server 6 receives content data (sound data, image data, or file data). In another example, when the type of content processing is "recording", "screenshotting", or "transmission of material", the start date and time of content processing and the end date and time of content processing may be set based on the date and time when the transmission/reception unit 21 of the electronic whiteboard 2 transmits content data. When the type of content processing is "recording", the start date and time of content processing and the end date and time of content processing may correspond to the date and time when the image/audio processing unit 23 starts recording and the date and time when the image/audio processing unit 23 ends the recording. When the type of content processing is "screenshotting", the start date and time of content processing and the end date and time of content processing may be set based on the date and time when the image/audio processing unit 23 captures a screenshot image.

Referring next to FIG. 29, the data processing unit 69 of the sharing assistant server 6 then searches the user authentication management DB 6001 (see FIG. 9A), using the user ID received in step S72 as a search key, to read out the corresponding organization ID (step S91).

The data processing unit 69 then searches the access management DB 6002 (see FIG. 9B) using the organization ID read out in step S91 as a search key, to read out the corresponding access ID and access password (step S92).

Then, the transmission/reception unit 61 transmits conducted event record registration request information indicating a request for registering a conducted event record, to the schedule management server 8 (step S93). The conducted event record registration request information includes the conducted event ID, the user ID of the transmission source, and the content data that are received in step S72, the content processing ID generated in step S77, the URL generated for the content data in step S78, the access ID and the access password that are read out in step S92, and the start date and time and the end date and time of content processing. Consequently, the transmission/reception unit 81 of the schedule management server 8 receives the conducted event record registration request information.

Then, the authentication unit 82 of the schedule management server 8 performs authentication of the sharing assistant server 6 using the access ID and the access password (step S94). Since this authentication is substantially the same as the processing of step S38, description thereof is omitted. Description is continued of the case where the authentication is successful.

The data processing unit 89 then stores for management various kinds of data (information) received in step S93, in the conducted event record management DB 8008 (see FIG. 13B) (step S95). Specifically, the data processing unit 89 stores various kinds of data (information) in the conducted event record management DB 8008 in association with the conducted event ID received in step S93. In this manner, the schedule management server 8 manages data that is substantially the same as the data managed by the sharing assistant server 6.

The generation unit 83 of the schedule management server 8 also generates related information, in which the content data received in step S93 is associated with the content generation time (step S96). The content generation time included in the related information is generated using the event start date and time stored in the event management DB 8005, and the start date and time and the end date and time of the content processing that are stored in the conducted event record management DB 8008. That is, the content generation time indicates an elapsed time counted from the event start date and time up to the time when content is generated during the event being conducted. The data processing unit 89 of the schedule management server 8 stores for management the related information generated by the generation unit 83 in the related information management DB 8010 (see FIG. 14B) in association with the conducted event ID received in step S93 (step S97). In this manner, the schedule management server 8 manages pieces of content data assigned different types of content processing in association with the respective content generation times.

Then, the data processing unit 89 of the schedule management server 8 stores for management, text information including the text data received in step S93 in the text information management DB 8012 (see FIG. 15) in association with the conducted event ID received in step S93 (step S98). Specifically, the generation unit 83 generates text information including the text data and the content processing ID that are received in step S93, the text ID for identifying the text data received in step S93, and the state information. The data processing unit 89 then stores the text information generated by the generation unit 83 in the text information management DB 8012 in association with the conducted event ID received in step S93. In this case, the state information included in the text information is "Original" which indicates that the associated text data has not been edited.

In a manner described above, the electronic whiteboard 2 successfully transmits the conducted event ID of an event being conducted and corresponding content generated during the event, to the schedule management server 8. The schedule management server 8 stores, for each conducted event ID, the received content in the conducted event record management DB 8008. In this manner, the sharing system 1 successfully stores, for each event, content generated during the conducted event.

Figure 30:
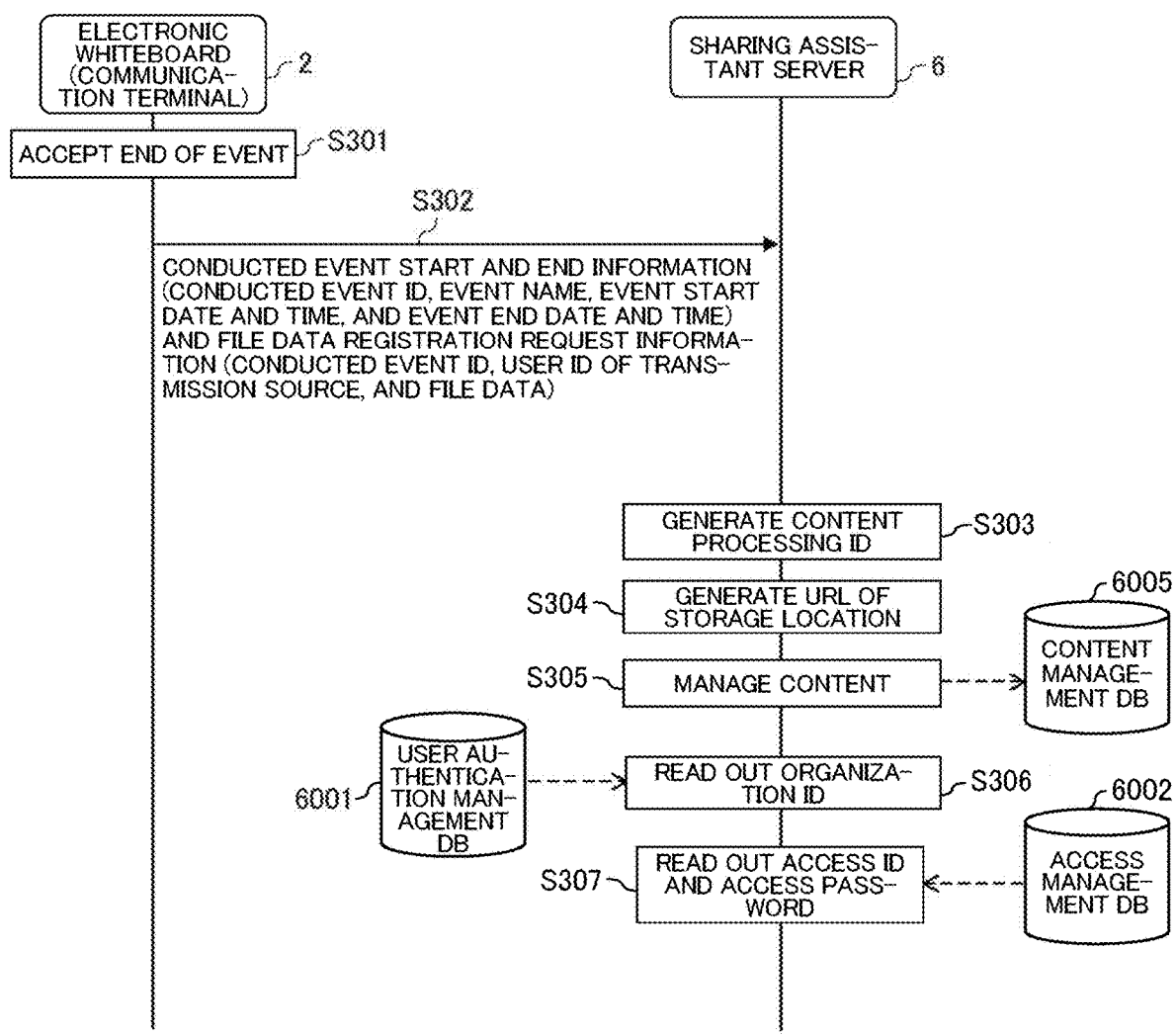
FIG. 30 is a sequence diagram illustrating an event ending process, according to an embodiment of the present disclosure.
Figure 31:
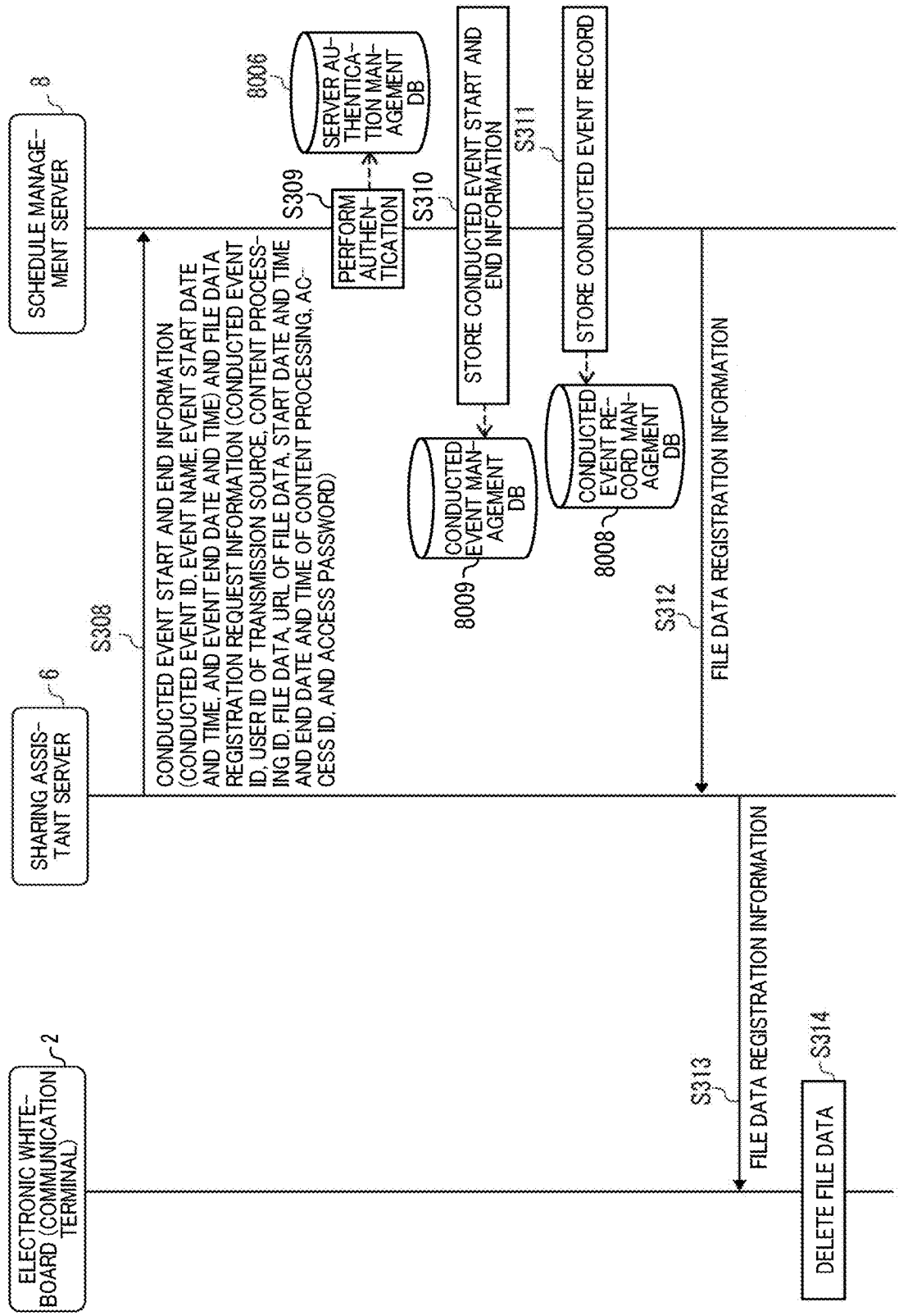
FIG. 31 is a sequence diagram illustrating the event ending process, according to an embodiment of the present disclosure.
Figure 32:
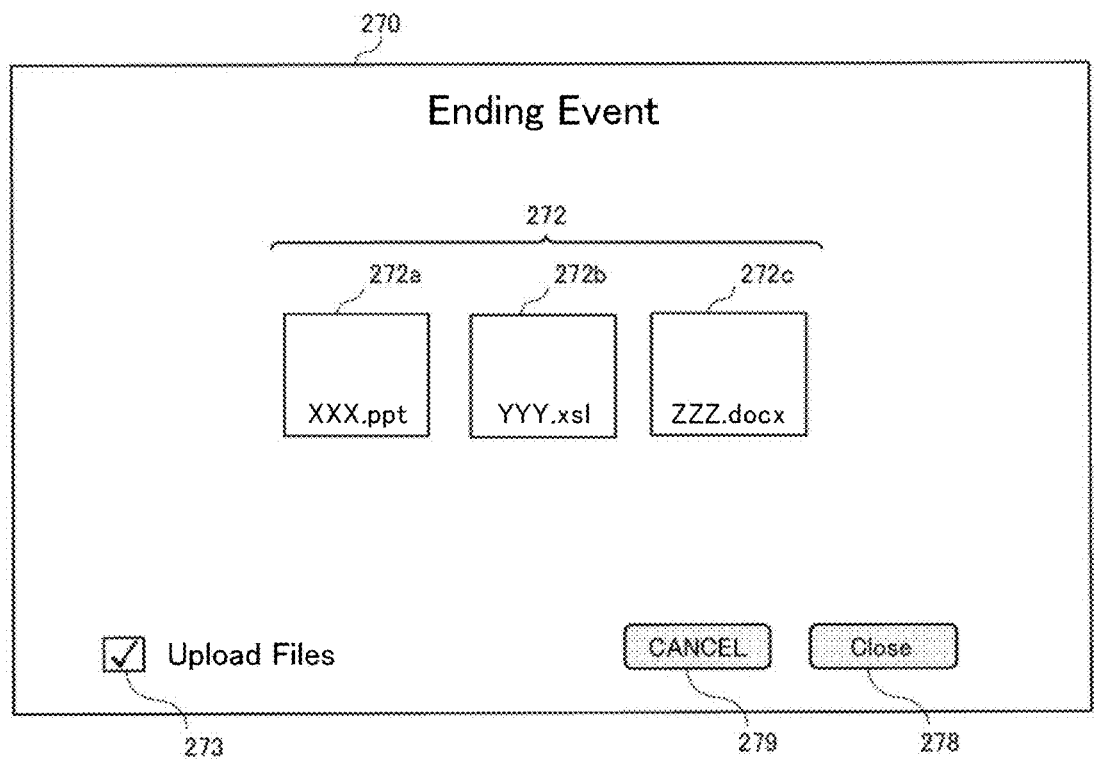
FIG. 32 is an illustration of an example of an event ending screen displayed on the electronic whiteboard, according to an embodiment of the present disclosure.
Figure 33:
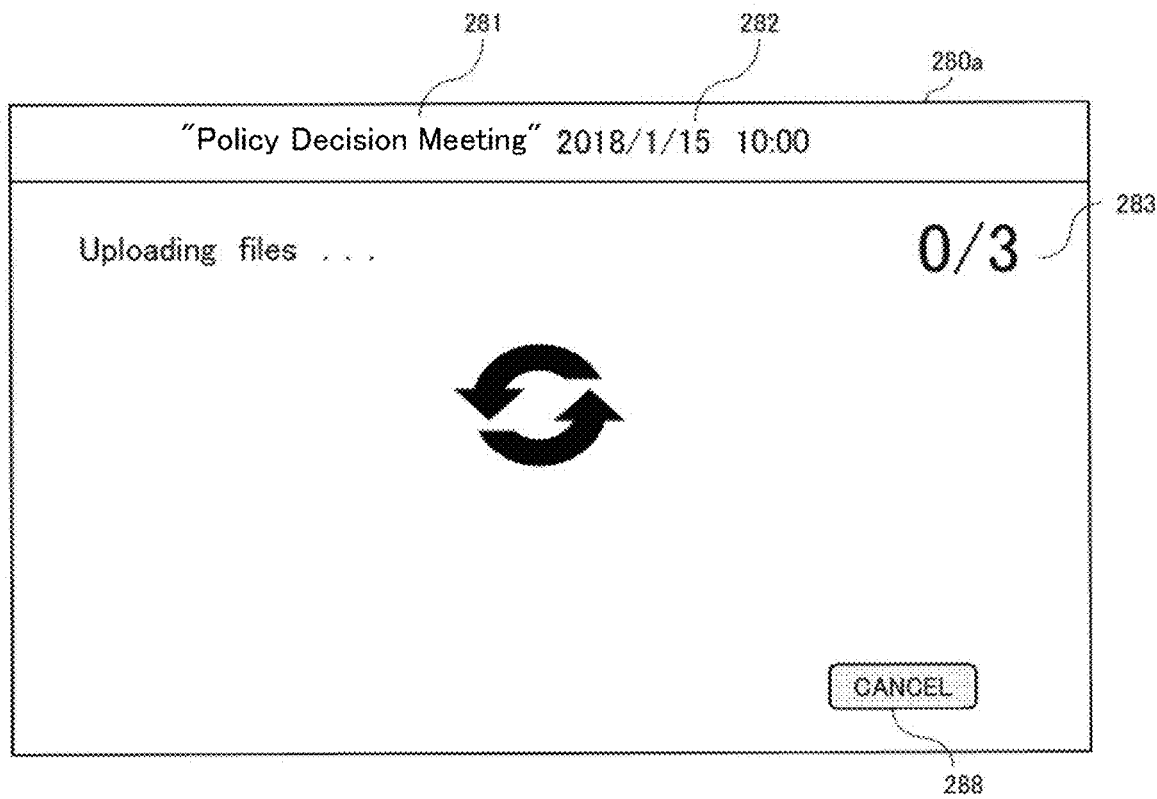
FIG. 33 is an illustration of an example of a file data uploading screen displayed on the electronic whiteboard, according to an embodiment of the present disclosure.
Figure 34:
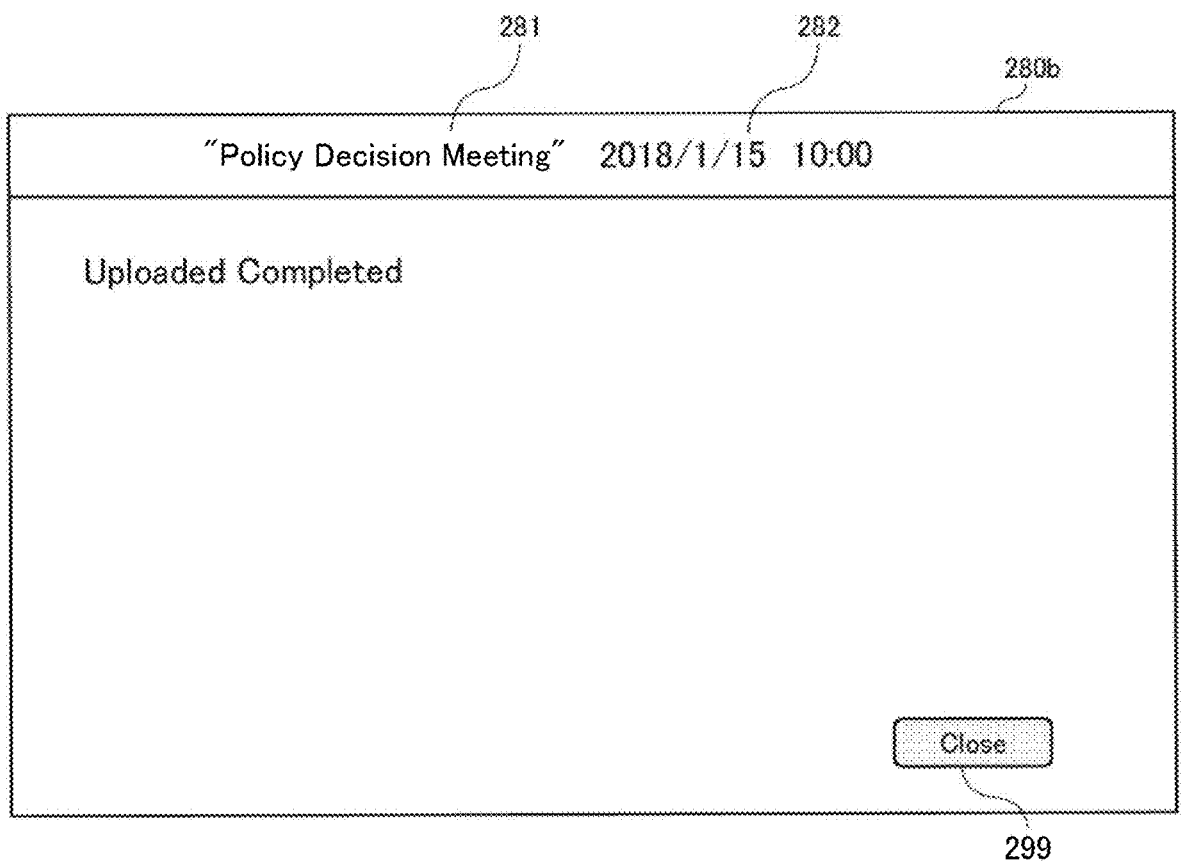
FIG. 34 is an illustration of an example of a file data uploading completion screen displayed on the electronic whiteboard, according to an embodiment of the present disclosure.

Event Ending Process:

Referring next to FIG. 30 to FIG. 34, a process of ending an event being conducted is described. FIGS. 30 and 31 are sequence diagrams illustrating an event ending process. FIG. 32 is an illustration of an example of an event ending screen displayed on the electronic whiteboard 2. FIG. 33 is an illustration of an example of a file data uploading screen displayed on the electronic whiteboard 2. FIG. 34 is an illustration of an example of a file data uploading completion screen displayed on the electronic whiteboard 2.

Referring to FIG. 30, in response to the user A performing an operation to close the screen displayed on the display 220, the accepting unit 22 accepts an instruction to end the event being conducted (step S301).

The transmission/reception unit 21 then transmits, to the sharing assistant server 6, conducted event start and end information indicating the start date and time and the end date and time of the conducted event, and file data registration request information indicating a request for registering file data (step S302). The conducted event start and end information includes the conducted event ID, the event name, the event start date and time, and the event end date and time. The file data registration request information includes the conducted event ID, the user ID of a transmission source, and the file data. Consequently, the transmission/reception unit 61 of the sharing assistant server 6 receives the conducted event start and end information and the file data registration request information.

Then, the generation unit 64 of the sharing assistant server 6 generates a unique content processing ID for identifying content processing that has occurred in the event (step S303). The generation unit 64 also generates a URL of content data representing the content (step S304). The data processing unit 69 then stores for management, for each conducted event ID received in step S302, the type of content processing, the start date and time of the content processing, the end date and time of the content processing, the content processing ID that is generated in step S303, and the URL that is generated in step S304 and indicates the storage location of the content in the content management DB 6005 (see FIG. 10) in association with one another (step S305).

Then, the data processing unit 69 of the sharing assistant server 6 searches the user authentication management DB 6001 (see FIG. 9A) using the user ID received in step S72 as a search key, to read out the corresponding organization ID (step S306).

The data processing unit 69 then searches the access management DB 6002 (see FIG. 9B) using the organization ID read out in step S306 as a search key, to read out the corresponding access ID and access password (step S307).

Referring next to FIG. 31, the transmission/reception unit 61 transmits, to the schedule management server 8, the conducted event start and end information and the file data registration request information indicating a request for registering file data that are received in step S302 (step S308). The file data registration request information includes the conducted event ID, the user ID of the transmission source, and the file data that are received in step S302, the content processing ID generated in step S303, the URL generated for the file data in step S304, the access ID and the access password that are read out in step S307, the start date and time of the content processing, and the end date and time of the content processing. Consequently, the transmission/reception unit 81 of the schedule management server 8 receives the conducted event start and end information and the file data registration request information.

Then, the authentication unit 82 of the schedule management server 8 performs authentication of the sharing assistant server 6 using the access ID and the access password (step S309). Since this authentication is substantially the same as the processing of step S38, description thereof is omitted. Description is continued of the case where the authentication is successful.

Then, the data processing unit 89 of the schedule management server 8 stores the conducted event start and end information received in step S308 in the conducted event management DB 8009 (see FIG. 14A) (step S310). In this case, the data processing unit 89 adds conducted event start and end information of one record, to the conducted event management table in the conducted event management DB 8009.

Then, the data processing unit 89 stores for management various kinds of data (information) received in step S308, in the conducted event record management DB 8008 (step S311). Specifically, the data processing unit 89 stores various kinds of data (information) including file data in the conducted event record management DB 8008 (see FIG. 13B) in association with the conducted event ID received in step S308. In this manner, the schedule management server 8 manages file data that is substantially the same as the file data managed by the sharing assistant server 6.

Then, the transmission/reception unit 81 transmits file data registration information indicating that the file data has been registered, to the sharing assistant server 6 (step S312). Consequently, the transmission/reception unit 61 of the sharing assistant server 6 receives the file data registration information.

Then, the transmission/reception unit 61 of the sharing assistant server 6 transmits, to the electronic whiteboard 2, the file data registration information transmitted from the schedule management server 8 (step S313). Consequently, the transmission/reception unit 21 of the electronic whiteboard 2 receives the file data registration information.

In response to the transmission/reception unit 21 receiving the file data registration information, the data processing unit 29 of the electronic whiteboard 2 deletes the file data stored in the specific storage area of the storage unit 2000 (step S314) The file data that has been transmitted to the sharing assistant server 6 is deleted from the electronic whiteboard 2 in this manner. This can reduce a risk of leakage of confidential information such as information on items discussed in a meeting.

Description is given of transition of the screen displayed on the electronic whiteboard 2 when an event being conducted is ended. In response to the accepting unit 22 accepting an instruction to end the event in step S301, the display control unit 24 controls the display 220 to display an event ending screen 270 illustrated in FIG. 32. The event ending screen 270 includes a file display area 272, a file uploading selection area 273, a "Close" button 278 to be pressed to proceed the event ending process being executed, and a "CANCEL" button 279 to be pressed to cancel the event ending process being executed. The file display area 272 includes file data images 272*a*, 272*b* and 272*c*, each for identifying file data of a corresponding material file stored in the specific storage area of the storage unit 2000. The file uploading selection area 273 includes a checkbox for accepting selection as to whether or not to upload the file data represented by the file data image displayed in the file display area 272 to the sharing assistant server 6.

In response to the accepting unit 22 accepting selection of the "Close" button 278 in a state where the file uploading selection area 273 is selected, the display control unit 24 controls the display 220 to display a file uploading screen 280*a* illustrated in FIG. 33. The file uploading screen 280*a* is displayed on the display 220 when the file data stored in the specific storage area of the storage unit 2000 is being uploaded to the sharing assistant server 6. The file uploading screen 280*a* includes an event name 281 of the event to end, the event end date and time 282, a display area 283 for displaying the progress in uploading of the file data, and a "CANCEL" button 288 to be pressed to stop (suspend) uploading of the file data. The display area 283 indicates the number of file data items to be updated ("3" in FIG. 33, for example), and a number of file data items that have been uploaded ("0" in FIG. 33, for example).

In response to the completion of uploading of the file data, the display control unit 24 controls the display 220 to display an uploading completion screen 280*b* illustrated in FIG. 34. The uploading completion screen 280*b* includes a "Close" button 299 to be pressed to end the event. When the uploading completion screen 280*b* is displayed on the display 220, the data processing unit 29 of the electronic whiteboard 2 deletes the file data, uploading of which has been completed, from the specific storage area of the storage unit 2000 as described above in step S314.

On the other hand, in response to a failure in uploading of the file data with the file uploading screen 280*a* being displayed on the display 220, the display control unit 24 controls the display 220 to display information for identifying the file data for which uploading has failed (for example, the file name). This enables the participants of the event to bring back the file data for which uploading has failed with them by printing the file data that is created or edited during the event or by storing the file data in the USB memory 2600 connected to the electronic whiteboard 2 when a trouble occurs in the communication network 10, for example.

If the file data remains in the specific storage area of the storage unit 2000 after the event ends, the data processing unit 29 of the electronic whiteboard 2 deletes the file data stored in the specific storage area when the following event is started using the electronic whiteboard 2. In this manner, the electronic whiteboard 2 can reduce a risk of leakage of confidential information such as information on items discussed in a meeting.

Figure 35:
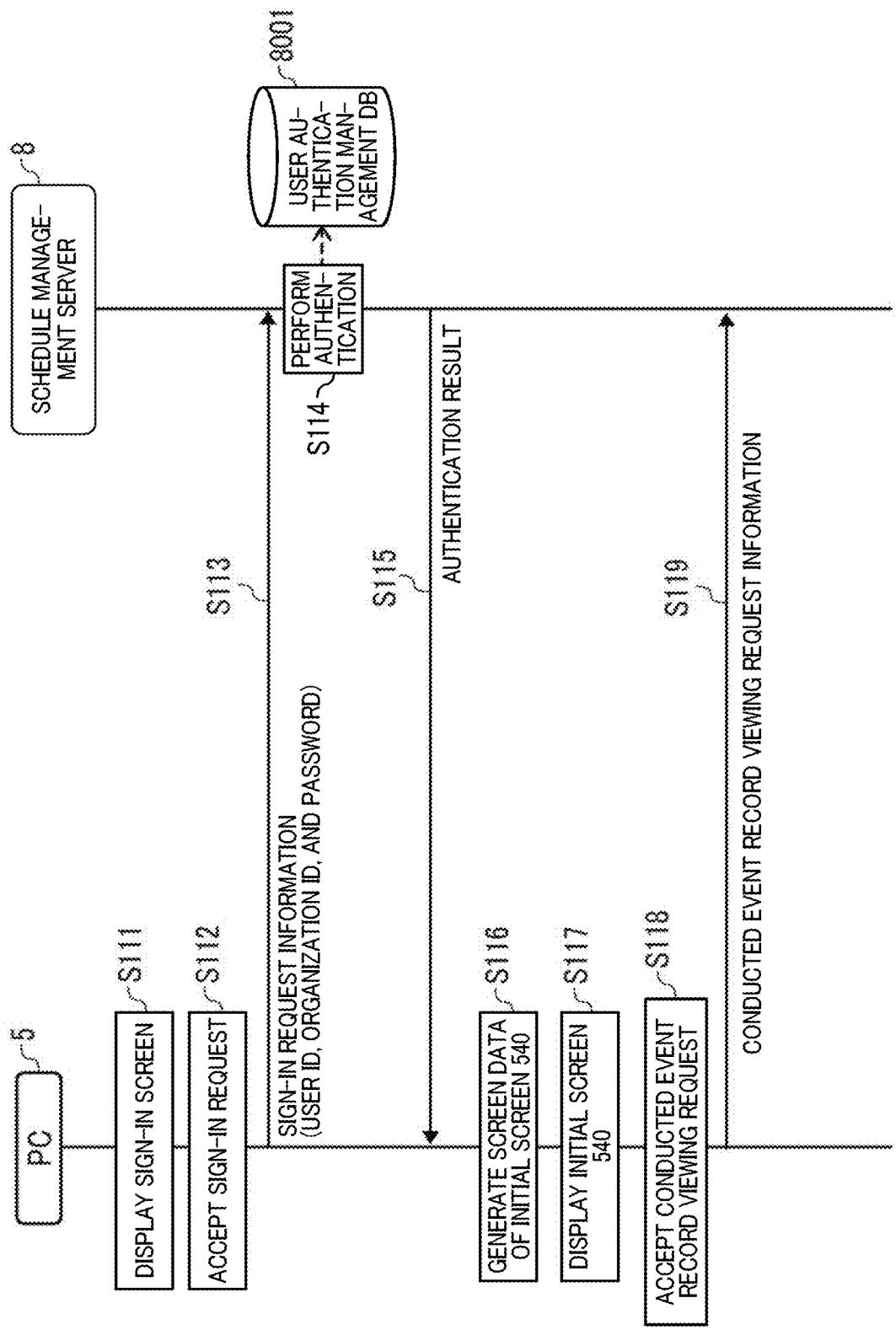
FIG. 35 is a sequence diagram illustrating operation of controlling processing to output a record of the event, according to an embodiment of the present disclosure.
Figure 36:
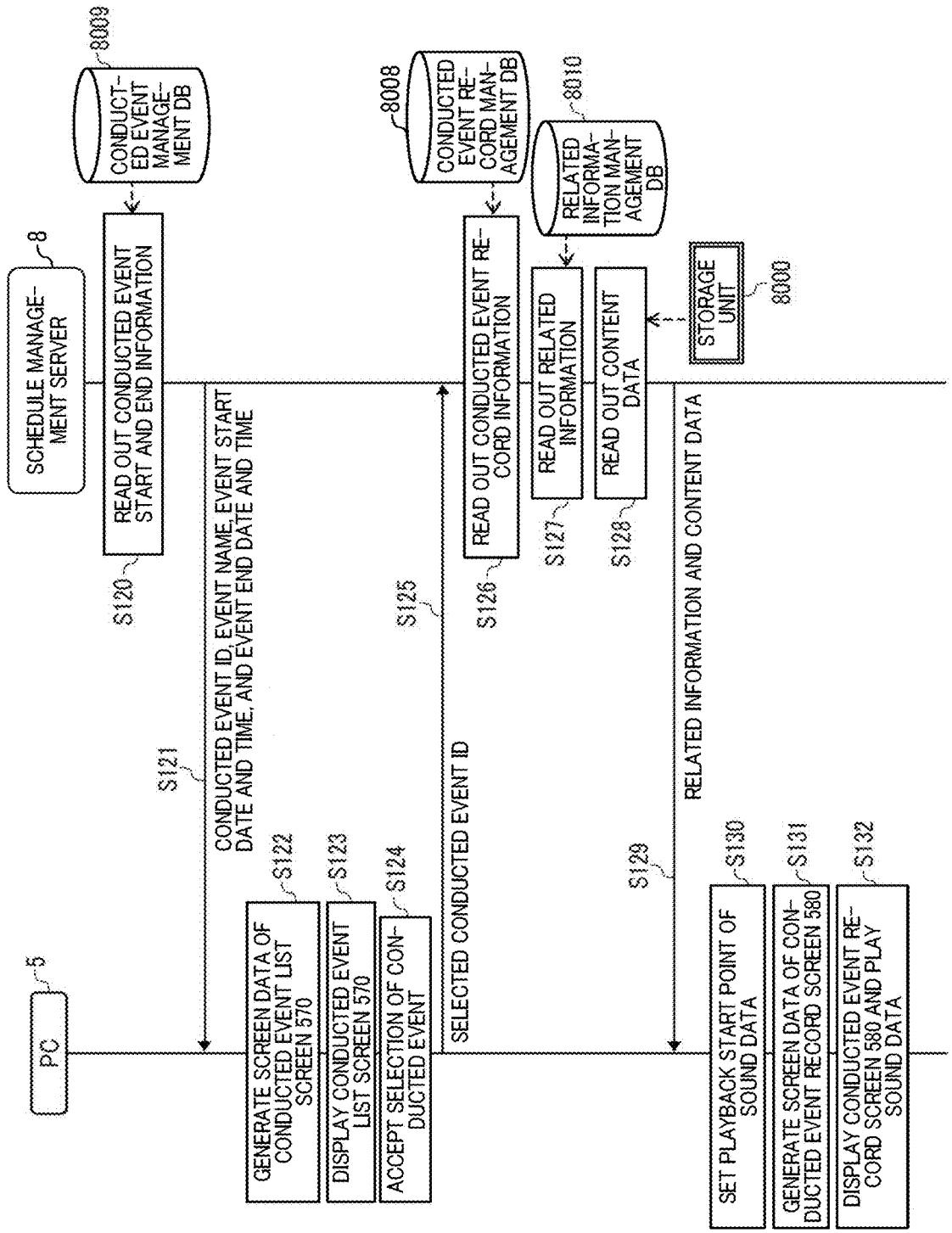
FIG. 36 is a sequence diagram illustrating operation of controlling processing to output a record of the event, according to an embodiment of the present disclosure.
Figure 37:
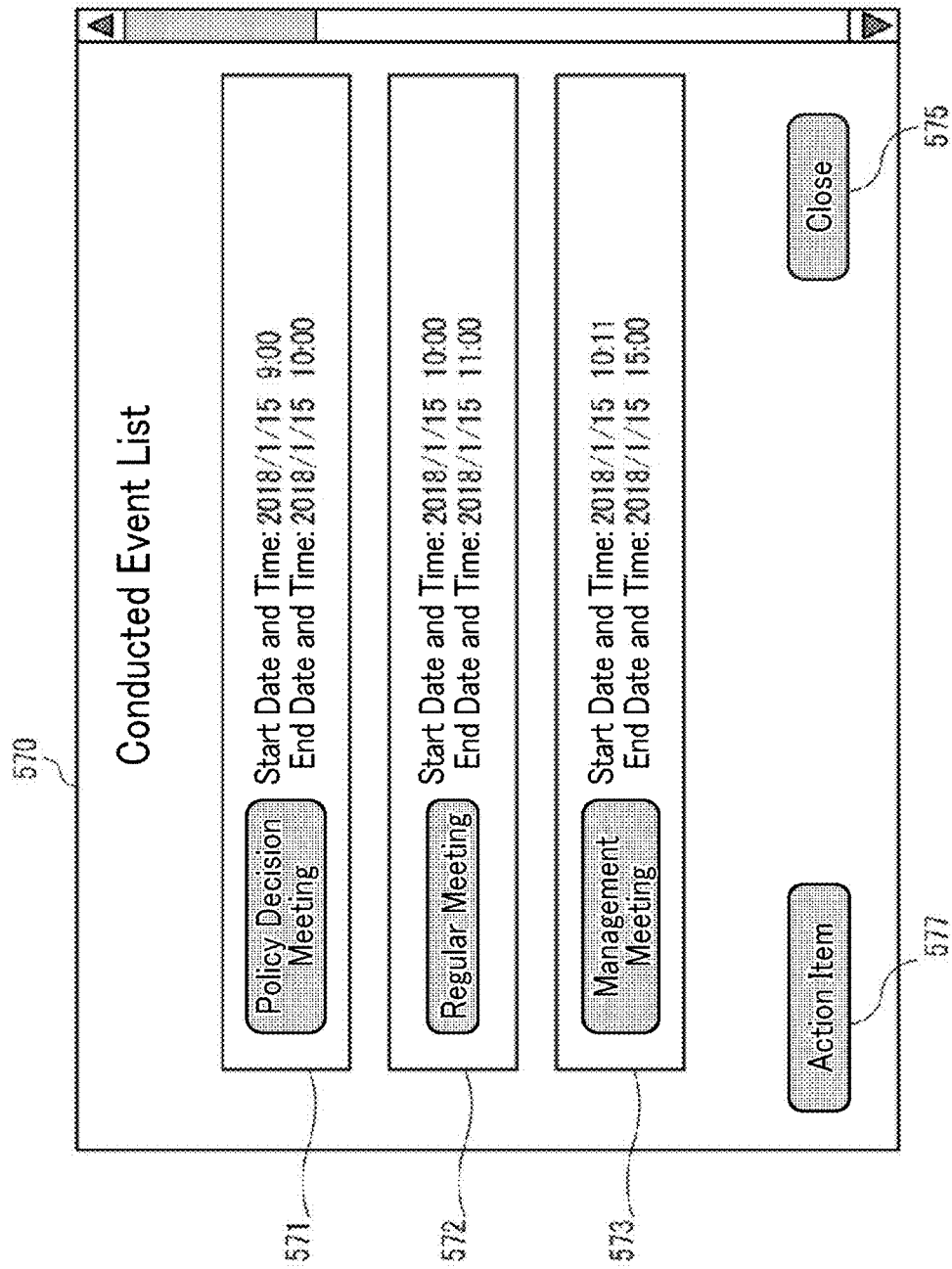
FIG. 37 is an illustration of an example of a conducted event list screen displayed by the PC, according to an embodiment of the present disclosure.
Figure 38:
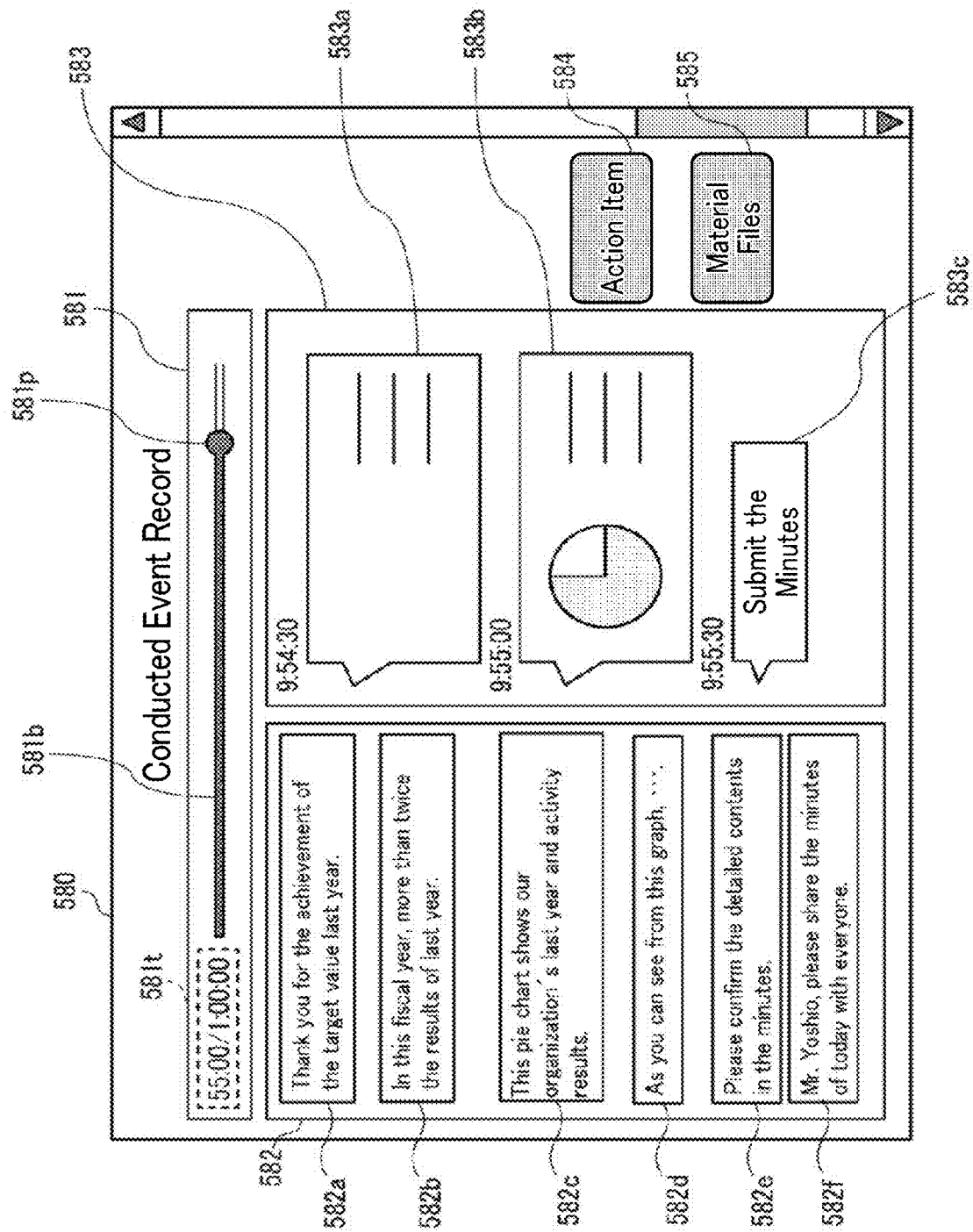
FIG. 38 is an illustration of an example of a conducted event record screen displayed by the PC, according to an embodiment of the present disclosure.

Viewing of Conducted Event Record:

Referring next to FIGS. 35 to 38, a process of viewing a conducted event record is described. FIGS. 35 and 36 are sequence diagrams illustrating the conducted event record display process. FIG. 37 is an illustration of an example of a conducted event list screen displayed by the PC 5. FIG. 38 is an illustration of an example of a conducted event record screen. Since processing of steps S111 to S117 of FIG. 35 is substantially the same as the processing of steps S11 to S17 of FIG. 16, description thereof is omitted.

The user presses the "View Conducted Event Record" button 543 in the initial screen 540 illustrated in FIG. 18. In response to this action, the accepting unit 52 of the PC 5 accepts a request for viewing a conducted event record (step S118).

The transmission/reception unit 51 of the PC 5 transmits conducted event record viewing request information indicating the request for viewing the conducted event record, to the schedule management server 8 (step S119). Consequently, the transmission/reception unit 81 of the schedule management server 8 receives the conducted event record viewing request information.

Then, the data processing unit 89 of the schedule management server 8 reads out the conducted event start and end information stored in the conducted event management DB 8009 (step S120). The conducted event start and end information includes the conducted event ID, the event name, the event start date and time, and the event end date and time.

The transmission/reception unit 81 transmits, to the PC 5, the conducted event ID, the event name, the event start date and time, and the event end date and time that are read out in step S120 (step S121). Consequently, the transmission/reception unit 51 of the PC 5 receives the conducted event ID, the event name, the event start date and time, and the event end date and time.

Then, the generation unit 56 of the PC 5 generates screen data of a conducted event list screen 570 illustrated in FIG. 37, using the data (information) received in step S121 (step S122). The display control unit 54 of the PC 5 controls the display 508 to display the conducted event list screen 570 based on the screen data generated by the generation unit 56 (step S123). As illustrated in FIG. 37, the conducted event list screen 570 includes pieces of event information 571, 572, and 573 each indicating an event that has been conducted. For example, the pieces of event information 571 to 573 each include a name of the conducted event, and the start date and time and the end date and time of the conducted event. Each of the pieces of event information 571 to 573 is an example of a record information selection area for accepting selection of to-be-displayed record information indicating the details of the conducted event. The conducted event list screen 570 also includes a "Close" button 575 to be pressed to close the conducted event list screen 570, at a lower right portion thereof. The conducted event list screen 570 further includes an "Action Item" button 577 to be pressed to view action items, at a lower left portion thereof. The "Action Item" button 577 is an example of an action item selection area for accepting selection of an action item to be displayed.

The accepting unit 52 of the PC 5 then accepts selection of a conducted event in the conducted event list screen 570 (step S124). Specifically, the user selects information indicating a conducted event included in the conducted event list screen 570. In response to this action, the accepting unit 52 accepts selection of the information indicating the conducted event. The transmission/reception unit 51 of the PC 5 transmits the conducted event ID of the conducted event for which selection of the information is accepted by the accepting unit 52, to the schedule management server 8 (step S125). Consequently, the transmission/reception unit 81 of the schedule management server 8 receives the conducted event ID.

Then, the data processing unit 89 of the schedule management server 8 searches the conducted event record management DB 8008 using the conducted event ID received in step S125 as a search key, to read out the corresponding conducted event record information (step S126). The conducted event record information includes the content processing ID, the type of the content processing, the start date and time of the content processing, and the end date and time of the content processing.

The data processing unit 89 of the schedule management server 8 searches the related information management DB 8010 using the conducted event ID received in step S125 as a search key, to read out the corresponding related information (step S127). The related information includes the content generation time, the content processing ID, the type of the content processing, and the sequence number. The content generation time included in the related information is an example of time information.

The data processing unit 89 reads out, from a storage location of the content data representing content of the conducted event record read out in step S126, the content data representing the content of the conducted event record (step S128). The transmission/reception unit 81 then transmits, to the PC 5, the related information and the content data that are read out (step S129). Consequently, the transmission/reception unit 51 of the PC 5 receives the related information and the content data.

Next, the audio control unit 58 of the PC 5 sets a playback start point in sound data that is the content data received in step S129 (step S130). In this case, the audio control unit 58 sets, as the playback start point of the sound data, a point of the sound data associated with the content generation time "00:00" included in the received related information.

The generation unit 56 of the PC 5 generates screen data of a conducted event record screen 580 illustrated in FIG. 38, using the related information and the content data received in step S129 (step S131). More specifically, the generation unit 56 generates the screen data of the conducted event record screen 580 such that images based on text data that is the received content data are displayed in a text data display area 582 in an order of the sequence number included in the received related information. The generation unit 56 generates the screen data of the conducted event record screen 580 such that images based on image data that is the received content data are displayed in a screenshot data display area 583 in an order of the sequence number included in the received related information. Further, the generation unit 56 generates the screen data of the conducted event record screen 580 such that a playback point 581p is displayed in a playback point display area 581 at a position set for the sound data in step S130 in the entire playback period of the sound data.

Then, the display control unit 54 of the PC 5 controls the display 508 to display the conducted event record screen 580 generated by the generation unit 56 (step S132). Further, the audio control unit 58 of the PC 5 starts playing sound based on the sound data from the playback start point set in step S130. As illustrated in FIG. 38, in the conducted event record screen 580, content of data generated in the conducted event is displayed for each type of content processing. Specifically, the conducted event record screen 580 includes the playback point display area 581 for displaying a playback point of sound data, the text data display area 582 for displaying sound-based text, the screenshot data display area 583 for displaying screenshot images, an "action item" button 584 to be pressed to view action items, and a "material files" button 585 to be pressed to view the materials used in the event.

The playback point display area 581 includes the playback point 581p indicating the point being played in the entire playback period, a slider 581b indicating a progress (played portion) of playback of the sound data, and a playback time display image 581t indicating the period of the sound data that has been played in the entire playback period. The playback point 581p and the slider 581b form a seek bar. The seek bar is an operation area for displaying the playback point of the sound data and for accepting an operation to designate the playback point of the sound data. The position of the playback point 581p and the slider 581b allow the user to visually grasp which part of the sound data is being played between the start and the end of the sound data. The user can move the playback point 581p using any input device such as the mouse 512, to instruct to play the sound data from any playback point. The playback point 581p is an example of a playback point selector image. The seek bar including the playback point 581p and the slider 581b is an example of a playback progress display image.

Still referring to FIG. 38, in the text data display area 582, images 582a, 582b, 582c, 582d, 582e, and 582f, each indicating text data, are displayed in an order based on the content generation time. In this example, the images 582a, 582b, 582c, 582d, 582e, and 582f are displayed, from the top to the bottom, in a chronological order based on the content generation time. Similarly, in the screenshot data display area 583, screenshot (captured) images 583a, 583b, and 583c are displayed in an order based on the content generation time. In this example, the screenshot images 583a, 583b, and 583c are displayed, from the top to the bottom, in a chronological order based on the content generation time. Thus, the text data display area 582 and the screenshot data display area 583 are displayed, side by side, in time series. This allows the user to easily grasp the time period in which a pie chart is described in the meeting by viewing the image 583b, and thus to easily find the images 582c and 582d indicating text data displayed side by side with the image 583b. In this case, the images 583a and 583b are each a screenshot image of the entire screen of the display 220. The image 583c is an image of an action item.

In this manner, the sharing system 1 allows members (participants) who participate in an event to easily share a conducted event record generated for the conducted event. The sharing system 1 may register or change a user after the event is conducted to be able to edit a reference right of the user to view the conducted event record.

Figure 39:
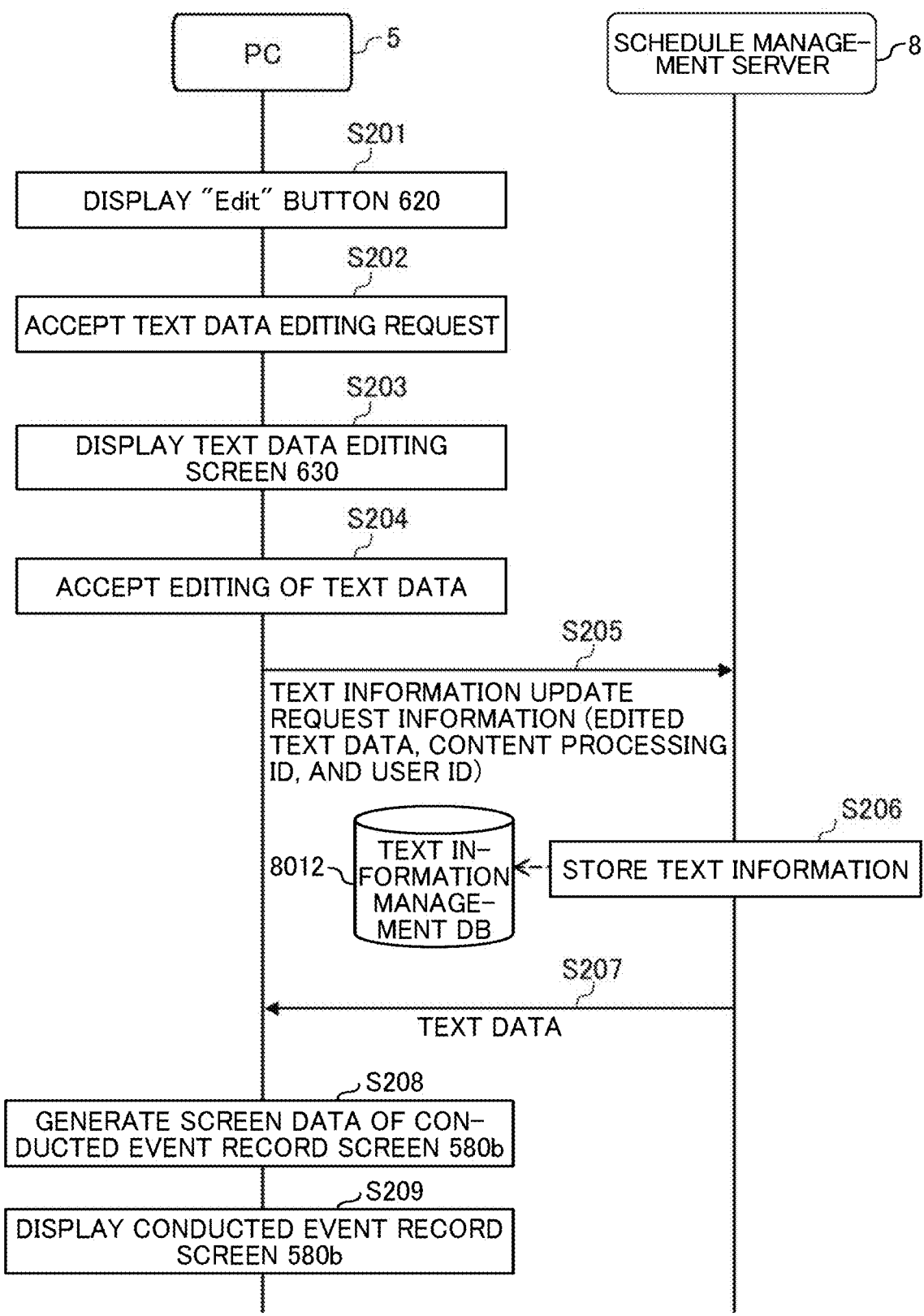
FIG. 39 is a sequence diagram illustrating a text data editing process, according to an embodiment of the present disclosure.
Figure 40:
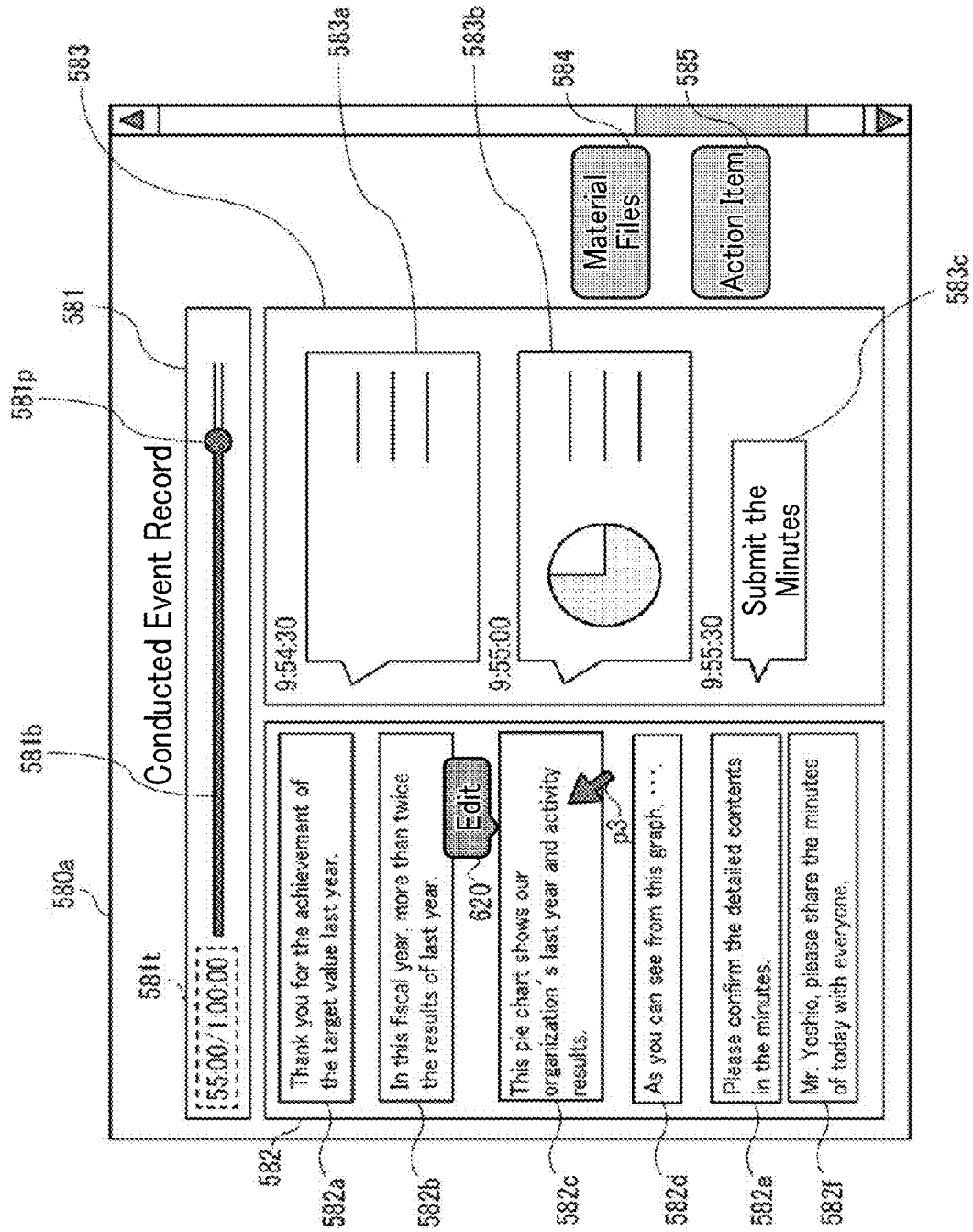
FIG. 40 is an illustration of an example of the conducted event record screen displayed by the PC, according to an embodiment of the present disclosure.
Figure 41:
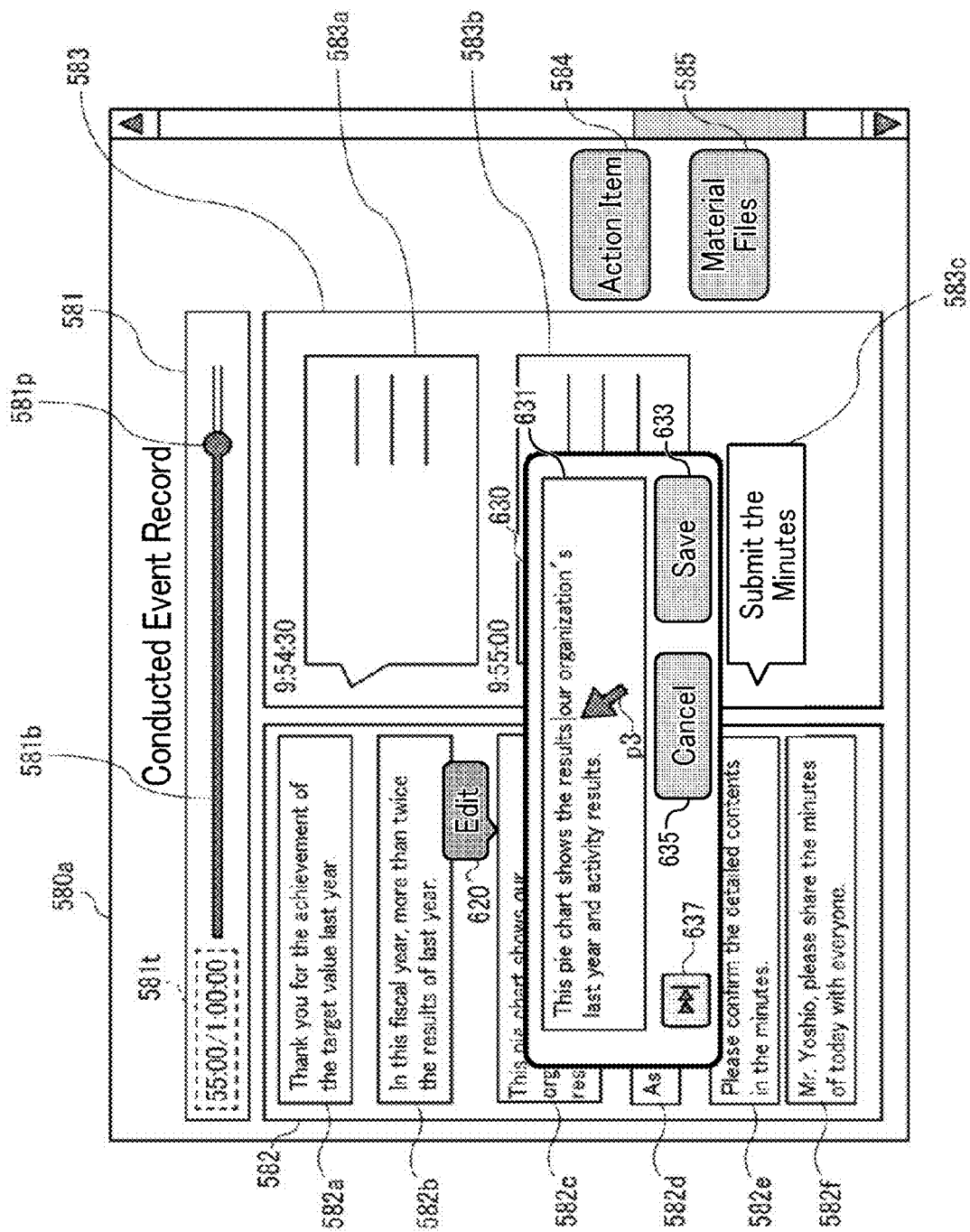
FIG. 41 is an illustration of an example of a text editing screen, according to an embodiment of the present disclosure.
Figure 43:
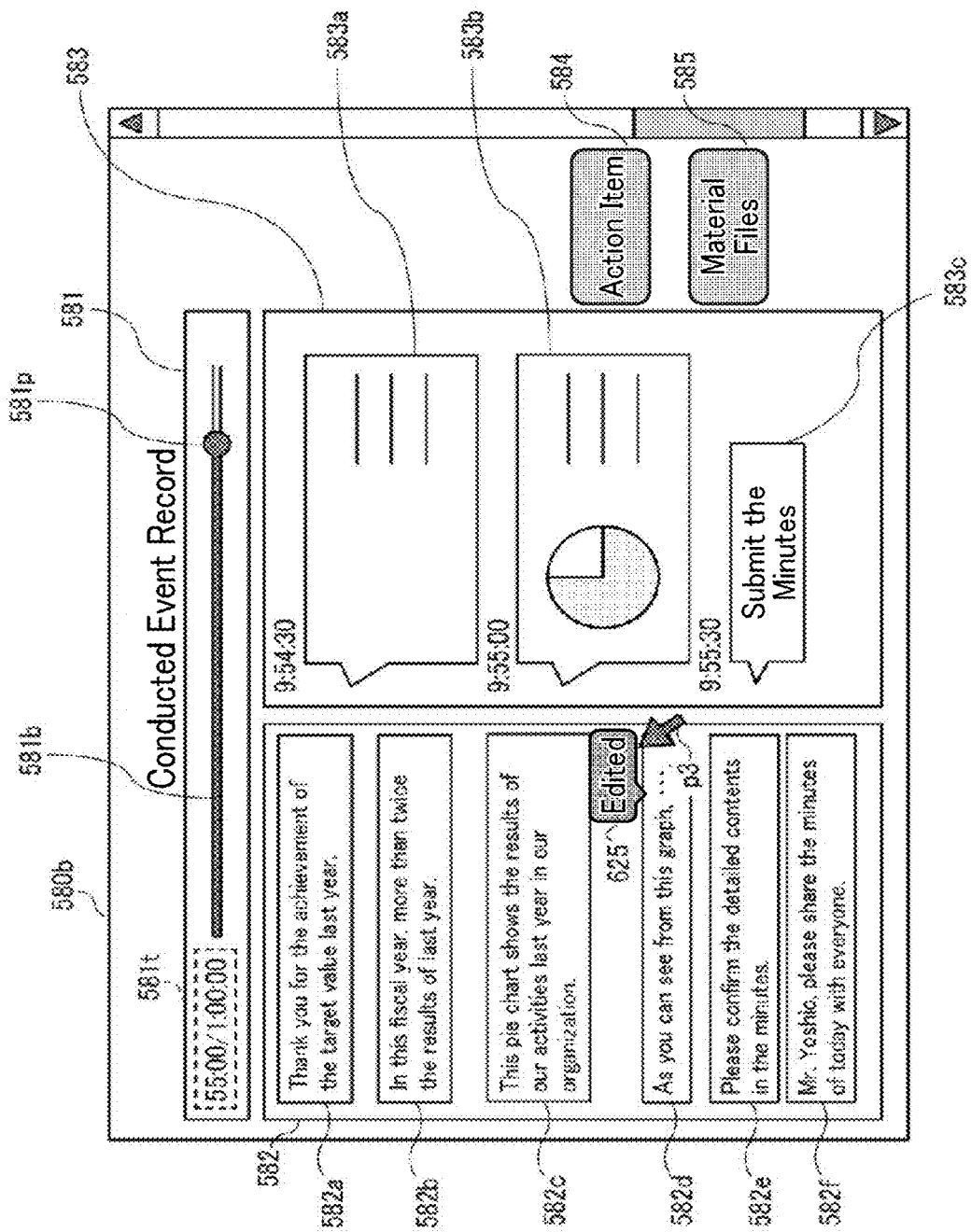
FIG. 43 is an illustration of an example of the conducted event record screen displayed by the PC, according to an embodiment of the present disclosure.

Text Data Editing Process:

Referring next to FIGS. 39 to 43, a process of editing text data displayed in the conducted event record screen is described. FIG. 39 is a sequence diagram illustrating the text data editing process. FIGS. 40 and 43 are each an illustration of an example of a conducted event record screen displayed by the PC 5. FIG. 41 is an illustration of an example of a text editing screen. FIG. 42 is an illustration of an updated text information management table. Description is given on the assumption that the conducted event record screen 580 illustrated in FIG. 38 is displayed on the display 508 of the PC 5.

The user first presses the text data display area 582 using a mouse pointer p3. In response to this action, the display control unit 54 of the PC 5 controls the display 508 to display a conducted event record screen 580a illustrated in FIG. 40 (step S201). Specifically, the user presses an image (for example, the image 582c) indicating particular text data included in the text data display area 582 using the mouse pointer p3. In response to this action, the accepting unit 52 accepts selection of the particular text data. Then, the display control unit 54 controls the display 508 to display the conducted event record screen 580a including an "Edit" button 620 displayed at a position corresponding to the particular text data for which the selection has been accepted. The "Edit" button 620 is pressed to make a request for editing the selected particular text data. The "Edit" button 620 is an example of an editing request image.

The user then presses the "Edit" button 620 using the mouse pointer p3. In response to this action, the accepting unit 52 accepts selection of the "Edit" button 620 to accept a request for editing the text data (step S202). The display control unit 54 then controls the display 508 to display a text editing screen 630 illustrated in FIG. 41 in the conducted event record screen 580a (step S203). The text editing screen 630 is an editing screen that accepts editing of contents of the selected particular text data (for example, text data included in the image 582c). The text editing screen 630 includes an input area 631 in which particular text data is to be edited, a "Save" button 633 to be pressed to save the particular text data edited in the input area 631, a "Cancel" button 635 to be pressed to suspend (cancel) the text data editing process, and a "play" button 637 to be pressed to play sound based on sound data corresponding to the particular text data subjected to editing.

The user performs an input operation in the input area 631. In response to this action, the accepting unit 52 accepts editing of the particular text data (step S204). This allows the user to edit the selected particular text data through an input operation in the input area 631. In response to the accepting unit 52 accepting selection of the "play" button 637, the audio control unit 58 plays sound based on sound data corresponding to the particular text data subjected to editing. This allows the user to edit the text data while listening to the sound based on the sound data corresponding to the particular text data subjected to editing.

In response to the accepting unit 52 accepting selection of the "Save" button 633, the transmission/reception unit 51 of the PC 5 transmits, to the schedule management server 8, text information update request information indicating a request for updating text information (step S205). This text information update request information includes the text data edited in step S204, the content processing ID received in step S129, and the user ID accepted in step S112. The content processing ID in this case is a content processing ID corresponding to the edited text data. Consequently, the transmission/reception unit 81 of the schedule management server 8 receives the text information update request information.

The data processing unit 89 of the schedule management server 8 stores the text data received in step S205 in the text information management DB 8012 (see FIG. 15) (step S206). In this case, the text information management DB 8012 stores a text information management table illustrated in FIG. 42. FIG. 42 is an illustration of an updated text information management table. The text information management table illustrated in FIG. 42 includes text information including the edited text data received in step S205 in addition to the text information stored in the text information management table illustrated in FIG. 15. This text information is associated with a content processing ID that is the same as the content processing ID assigned to the original text data before editing, a text ID (for example, text12.2) whose version is updated from the text ID (for example, text12) of the original text data, and state information indicating that the text data has been edited. Among these pieces of information, the state information includes an editing person's name indicating the name of a person who has edited the text data, and an editing time indicating an editing date and time of the text data.

The transmission/reception unit 81 of the schedule management server 8 transmits the text data stored in step S206, to the PC 5 (step S207). Consequently, the transmission/reception unit 51 of the PC 5 receives the text data transmitted from the schedule management server 8.

Then, the generation unit 56 of the PC 5 generates screen data of a conducted event record screen 580b illustrated in FIG. 43, using the text data received in step S207 (step S208). More specifically, the generation unit 56 generates the screen data of the conducted event record screen 580b in which the original text data included in the conducted event record screen 580a before editing is replaced with the edited text data received in step S207.

The display control unit 54 of the PC 5 controls the display 508 to display the conducted event record screen 580b based on the screen data generated by the generation unit 56 (step S209). As illustrated in FIG. 43, the image 582c including the edited text data is displayed in the text data display area 582 included in the conducted event record screen 580b. The conducted event record screen 580b includes an "Edited" button 625 indicating that the text data included in the image 582c has been edited. The "Edited" button 625 is an example of an edited-indicating image indicating editing has been performed. The "Edited" button 625 allows the user to grasp whether the text data displayed in the text data display area 582 has been edited by checking the "Edited" button 625 included in the conducted event record screen 580b.

As described above, the PC 5 allows the user to edit the text data displayed on the conducted event record screen 580 and also controls the display 508 to display the edited text data instead of the original text data. In this manner, the PC 5 is capable of controlling the display 508 to display the edited text data as part of the meeting minutes. Even when the accuracy of conversion from sound data into text data is low, the PC 5 allows the user to edit the displayed text data. In this manner, the PC 5 allows the user to effectively utilize the conducted event record screen 580 as the meeting minutes. The PC 5 controls the display 508 to display the edited text data to allow the user to play sound based on a portion of the sound data which the user desires to listen to while viewing the edited text data.

Figure 44:
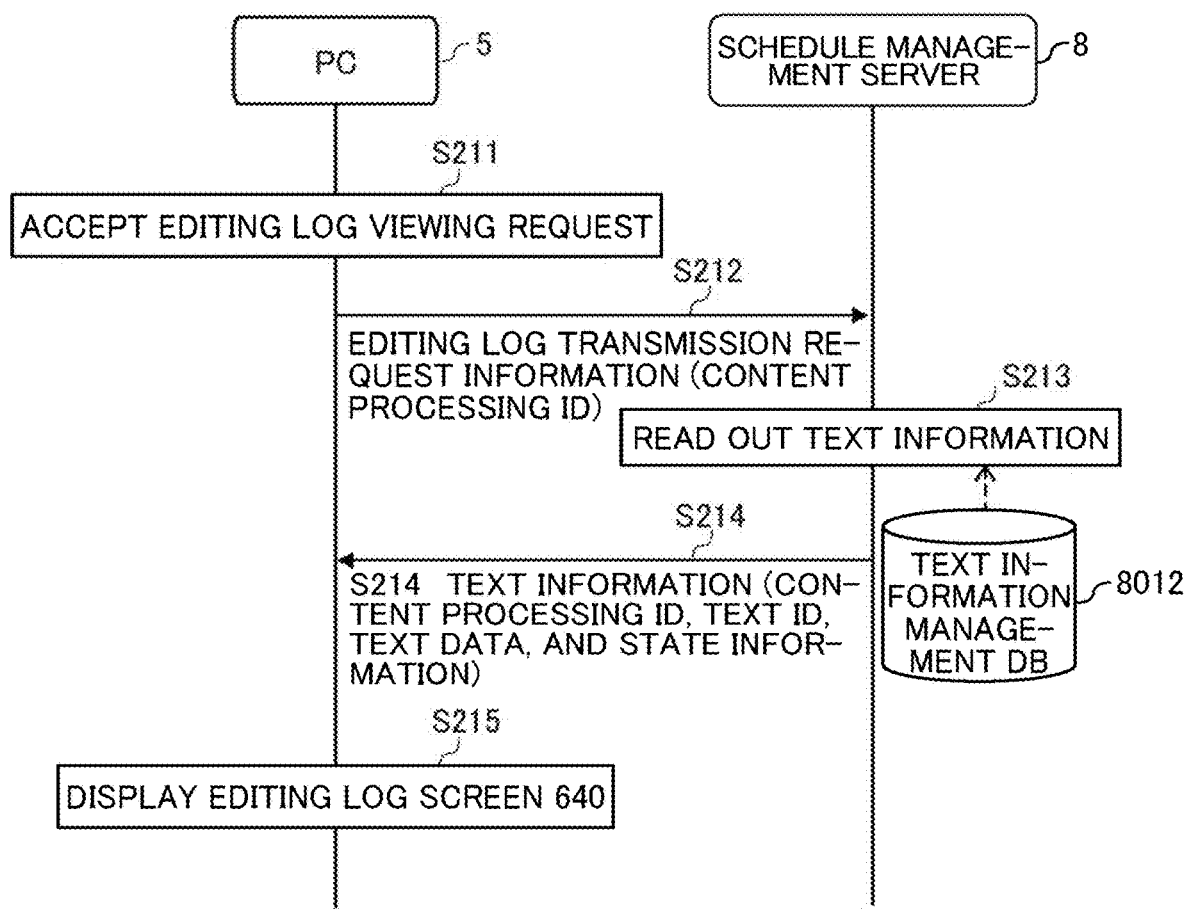
FIG. 44 is a sequence diagram illustrating an editing log display process, according to an embodiment of the present disclosure.

Referring next to FIGS. 44 and 45, a process of displaying a text data editing log in the conducted event record screen 580 is described. FIG. 44 is a sequence diagram illustrating a process of displaying an editing log. FIG. 45 is an illustration of an example of an editing log screen. Description is given on the assumption that the conducted event record screen 580b illustrated in FIG. 43 is displayed on the display 508 of the PC 5.

The user first presses the "Edited" button 625. In response to this action, the accepting unit 52 of the PC 5 accepts selection of the "Edited" button 625 to accept a request for viewing an editing log (step S211). Next, the transmission/reception unit 51 transmits editing log transmission request information indicating a request for transmitting an editing log of text data, to the schedule management server 8 (step S212). This editing log transmission request information includes the content processing ID corresponding to the text data serving as a target of the viewing request. Consequently, the transmission/reception unit 81 of the schedule management server 8 receives the editing log transmission request information.

The data processing unit 89 of the schedule management server 8 searches the text information management DB 8012 using the content processing ID received in step S212 as a search key, to read out the corresponding text information (step S213). In this case, the data processing unit 89 reads out text information included in the updated text information management table illustrated in FIG. 42. For example, when the content processing ID received in step S212 is "c269", the data processing unit 89 reads out text information including the text IDs "text12" and "text12.1". The transmission/reception unit 81 transmits the text information read out in step S213 to the PC 5 (step S214). This text information includes the content processing ID, the text ID, the text data, and the state information. Consequently, the transmission/reception unit 51 of the PC 5 receives the text information transmitted from the schedule management server 8.

The display control unit 54 of the PC 5 then controls the display 508 to display an editing log screen 640 illustrated in FIG. 45 on the conducted event record screen 580*b* (step S215). This editing log screen 640 includes an original data display area 641 in which original text data is displayed, an editing log display area 643 in which text data resulting from editing is displayed, and a "Close" button 649 to be pressed to close this editing log screen 640. The original data display area 641 includes text data associated with the state information of "Original" among the text information received in step S214. The editing log display area 643 includes text data associated with the state information indicating the editing person's name and the editing time among the text information received in step S214. If the corresponding text data has been edited a plurality of number of times, a plurality of pieces of text data resulting from the editing are displayed in time series in this editing log display area 643 on the basis of the editing time indicated by the state information. In addition, in the editing log display area 643, the editing person information (645*a* and 645*b*) indicating a person who has edited text data and editing time information (646*a* and 646*b*) indicating the editing time of the text data are displayed at positions associated with the corresponding text data on the basis of the state information associated with the text data.

In this manner, the PC 5 controls the display 508 to display the conducted event record screen 580*b* to allow the user to confirm that the text data has been edited and check the editing log of the edited text data using the editing log screen 640. The PC 5 also controls the display 508 to display, along with content of text data, information on a person who has edited the text data and editing time to allow the user to confirm the reliability of the edited text data.

The description has been given of the case of viewing the conducted event record using the PC 5 with reference to FIGS. 35 to 45. Alternatively, the conducted event record may be viewed using the electronic whiteboard 2 through a similar process. The examples of the processes and screens illustrated in FIGS. 35 to 45 are not employed exclusively by the PC 5. The similar processes and screens may be performed and displayed by the electronic whiteboard 2, the videoconference terminal 3, or the car navigation system 4.

The description has been given of the case where the generation unit 56 of the PC 5 generates image data of each screen displayed by the PC 5 with reference to FIGS. 35 to 45. Alternatively, such image data may be generated by the schedule management server 8. In such a case, in the schedule management server 8, the generation unit 83 generates image data, and the transmission/reception unit 81 transmits the generated image data to the PC 5.

According to the embodiment, as illustrated in FIGS. 39 to 45, the PC 5 is a display terminal capable of communicating with the schedule management server 8 (an example of a management system) that manages sound data relating content generated during a conducted event and text data converted from the sound data. The transmission/reception unit 51 (an example of a reception unit) of the PC 5 receives sound data, text data, and time information relating to content generation time, from the schedule management server 8. The display control unit 54 (an example of a display control unit) controls the display 508 (an example of a display) to display the received text data in an order of the content generation time in accordance with the received time information. The accepting unit 52 (an example of an editing accepting unit) accepts editing of particular text data (for example, the text data included in the image 582*c*) among displayed pieces of text data. The display control unit 54 then controls the display 508 to display particular text data resulting from editing in place of the received particular text data. In this manner, the PC 5 can display the edited text data as part of the meeting minutes. Even when the accuracy of conversion from sound data into text data is low, the PC 5 allows the user to edit the displayed text data. In this manner, the PC 5 allows the user to effectively utilize the conducted event record screen 580 as the meeting minutes.

In addition, according to the embodiment, as illustrated in FIGS. 39 to 45, the accepting unit 52 (an example of an editing request accepting unit) of the PC 5 (an example of a display terminal) accepts selection of the "Edit" button 620 (an example of an editing request image) used to make a request for editing the particular text data (the text data included in the image 582*c*). In response to accepting of selection of the "Edit" button 620, the display control unit 54 (an example of the display control unit) controls the display 508 (an example of the display) to display the text editing screen 630 (an example of the editing screen) through which editing of the particular text data is accepted. The accepting unit 52 (an example of the editing accepting unit) accepts an input operation performed on the text editing screen 630 to accept editing of the particular text data. This allows the user of the PC 5 to edit the particular text data which the user desires to edit among pieces of text data displayed in the conducted event record screen 580.

Further, according to the embodiment, as illustrated in FIGS. 39 to 45, the display control unit 54 (an example of the display control unit) of the PC 5 (an example of the display terminal) controls the display 508 (an example of a display) to display the editing log screen 640 indicating an editing log of the particular text data (for example, the text data included in the image 582*c*). The editing log screen 640 includes the particular text data received by the transmission/reception unit 51 (an example of a reception unit) and the particular text data resulting from editing. The display control unit 54 also controls the display 508 to display the particular text data resulting from editing in association with an editing person's name indicating a person who has edited the particular text data in the editing log screen 640. The display control unit 54 further controls the display 508 to display the particular text data resulting from editing in association with the editing time indicating time at which the particular text data has been edited in the editing log screen 640. In this manner, the PC 5 controls the display 508 to display the conducted event record screen 580*b* to allow the user to confirm that the text data has been edited and check the editing log of the edited text data using the editing log screen 640. The PC 5 also controls the display 508 to display, along with content of text data, information on a person who has edited the text data and editing time to allow the user to confirm the reliability of the edited text data.

When the accuracy of conversion from recorded sound data into text data is low, the low conversion accuracy makes it difficult for users to grasp the details of the event when the users view the text data displayed as the minutes. Accordingly, the resulting text data is required to be edited. However, editing of the text data displayed as the minutes is not considered in the method of the related art.

According to one or more embodiments of the present disclosure, edited text data is displayed as the minutes.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), system on a chip (SOC), graphics processing unit (GPU), and conventional circuit components arranged to perform the recited functions.

The above-described embodiments are illustrative and do not limit the present disclosure. Thus, numerous additional modifications and variations are possible in light of the above teachings. For example, elements and/or features of different illustrative embodiments may be combined with each other and/or substituted for each other within the scope of the present disclosure.

Any one of the above-described operations may be performed in various other ways, for example, in an order different from the one described above.

What is claimed is:

1. A display terminal communicable with a management system that is configured to manage a plurality of contents of sound data based on content generated during a conducted event and manage a plurality of contents of text data, each of the plurality of contents of text data being converted from one of the plurality of contents of sound data, the display terminal comprising:
   circuitry configured to:
   receive the plurality of contents of sound data, the plurality of contents of text data, and time information from the management system, the time information being information relating to a generation time of each of the plurality of contents of sound data and of each of the plurality of contents of text data;
   control a display to display the received text data in an order of the generation time based on the received time information; and
   control the display to display an editing screen and accept editing of a particular one of the plurality of contents of text data among the displayed text data, the editing screen displaying a play-sound image, which when selected, causes sound based on a particular one of the plurality of contents of sound data, corresponding to the particular one of the plurality of contents of text data as determined from the time data, to be played;
   wherein the circuitry is further configured to control the display to display the edited particular one of the plurality of contents of text data in place of the received particular one of the plurality of contents of text data,
   wherein the circuitry is further configured to control the display to display an editing log screen indicating an editing log of the particular one of the plurality of contents of text data, the editing log screen including the particular one of the plurality of contents of text data received by data exchange and the edited particular one of the plurality of contents of text data, the editing log screen showing the edited particular one of the plurality of contents of text data in association with an editing person's name indicating a name of a person who has edited the particular one of the plurality of contents of text data, the editing log screen showing the edited particular one of the plurality of contents of text data in association with an editing time indicating a time when the editing of the particular one of the plurality of contents of text data has been performed, and
   wherein the circuitry is further configured to:
   control the display to display an edited-indicating image indicating that the particular one of the plurality of contents of text data has been edited;
   accept selection of the edited-indicating image; and
   in response to accepting of selection of the edited-indicating image, control the display to display the editing log screen covering the edited-indicating image and at least partially covering the edited particular one of the plurality of contents of text data.

2. The display terminal of claim 1, wherein the circuitry is further configured to:
   accept selection of an editing request image, which, when selected, requests editing of the particular one of the plurality of contents of text data;
   in response to accepting of the selection of the editing request image, control the display to display the editing screen through which editing of the particular one of the plurality of contents of text data is accepted; and
   accept an input operation on the editing screen to accept editing of the particular one of the plurality of contents of text data.

3. The display terminal of claim 1, wherein the generation time indicates a time of conversion of each of the plurality of contents of sound data into a corresponding one of the plurality of contents of text data.

4. A sharing system comprising:
   the display terminal of claim 1; and
   the management system,
   the display terminal comprising first circuitry to transmit, to the management system, the edited particular one of the plurality of contents of text data resulting from the editing that has been accepted, and
   the management system comprising second circuitry configured to store, in a memory, the edited particular one of the plurality of contents of text data transmitted from the display terminal, in association with the particular one of the plurality of contents of text data that has been transmitted to the display terminal.

5. The display terminal of claim 1, wherein the circuitry is further configured to play the sound based on the particular one of the plurality of contents of sound data while the particular one of the plurality of contents of text data, corresponding to the particular one of the plurality of contents of sound data, is being edited by a user.

6. A display control method performed by a display terminal communicable with a management system that is configured to manage a plurality of contents of sound data based on content generated during a conducted event and manage a plurality of contents of text data, each of the plurality of contents of text data being converted from one of the plurality of contents of sound data, the display control method comprising:
- receiving the plurality of contents of sound data, the plurality of contents of text data, and time information from the management system, the time information being information relating to a generation time of each of the plurality of contents of sound data and of each of the plurality of contents of text data;
- controlling a display to display the received text data in an order of the generation time based on the received time information;
- controlling the display to display an editing screen and accepting editing of a particular one of the plurality of contents of text data among the displayed text data, the editing screen displaying a play-sound image, which when selected, causes sound based on a particular one of the plurality of contents of sound data, corresponding to the particular one of the plurality of contents of text data as determined from the time information, to be played;
- controlling the display to display the edited particular one of the plurality of contents of text data in place of the received particular one of the plurality of contents of text data;
- controlling the display to display an editing log screen indicating an editing log of the particular one of the plurality of contents of text data, the editing log screen including the particular one of the plurality of contents of text data received by data exchange and the edited particular one of the plurality of contents of text data, the editing log screen showing the edited particular one of the plurality of contents of text data in association with an editing person's name indicating a name of a person who has edited the particular one of the plurality of contents of text data, the editing log screen showing the edited particular one of the plurality of contents of text data in association with an editing time indicating a time when the editing of the particular one of the plurality of contents of text data has been performed;
- controlling the display to display an edited-indicating image indicating that the particular one of the plurality of contents of text data has been edited;
- accepting selection of the edited-indicating image; and
- in response to accepting of selection of the edited-indicating image, controlling the display to display the editing log screen covering the edited-indicating image and at least partially covering the edited particular one of the plurality of contents of text data.

7. A non-transitory recording medium storing a plurality of instructions which, when executed by one or more processors, cause the one or more processors to perform the display control method of claim 6.

* * * * *